(12) United States Patent
Lam

(10) Patent No.: US 9,265,310 B2
(45) Date of Patent: Feb. 23, 2016

(54) METHODS, SYSTEMS, AND APPARATUSES FOR INCORPORATING WIRELESS HEADSETS, TERMINALS, AND COMMUNICATION DEVICES INTO FASHION ACCESSORIES AND JEWELRY

(71) Applicant: Bin Lam, San Diego, CA (US)

(72) Inventor: Bin Lam, San Diego, CA (US)

( * ) Notice: Subject to any disclaimer, the term of this patent is extended or adjusted under 35 U.S.C. 154(b) by 45 days.

(21) Appl. No.: 14/067,900

(22) Filed: Oct. 30, 2013

(65) Prior Publication Data

US 2014/0120983 A1 May 1, 2014

Related U.S. Application Data

(60) Provisional application No. 61/720,248, filed on Oct. 30, 2012, provisional application No. 61/745,453, filed on Dec. 21, 2012.

(51) Int. Cl.
| | |
|---|---|
| *H04M 1/04* | (2006.01) |
| *A44C 15/00* | (2006.01) |
| *H04W 84/18* | (2009.01) |
| *H04M 1/02* | (2006.01) |
| *A41D 1/00* | (2006.01) |
| *H04M 1/21* | (2006.01) |
| *H04M 1/725* | (2006.01) |

(52) U.S. Cl.
CPC ................ *A44C 15/00* (2013.01); *A41D 1/005* (2013.01); *H04M 1/0254* (2013.01); *H04M 1/0256* (2013.01); *H04M 1/0283* (2013.01); *H04M 1/21* (2013.01); *H04M 1/7253* (2013.01); *H04W 84/18* (2013.01)

(58) Field of Classification Search
CPC ............... G06F 1/1613; H04B 2001/3861; H04M 1/00; H04M 1/04; H04M 1/0262
USPC ............. 455/90.3, 550.1, 556.1, 574.1
See application file for complete search history.

(56) References Cited

U.S. PATENT DOCUMENTS

| | | | | |
|---|---|---|---|---|
| 6,314,184 | B1 * | 11/2001 | Fernandez-Martinez | H04B 1/385 379/433.1 |
| 8,265,692 | B2 * | 9/2012 | Fish | H04B 5/0006 455/556.1 |
| 8,855,729 | B1 * | 10/2014 | Pattikonda | 455/575.6 |
| 9,024,749 | B2 * | 5/2015 | Ratajczyk | G08B 7/06 340/539.11 |
| 2009/0219788 | A1 * | 9/2009 | Henley, Jr. | G04G 17/083 368/13 |
| 2010/0128916 | A1 * | 5/2010 | Bradford et al. | 381/386 |

* cited by examiner

*Primary Examiner* — Blane J Jackson
(74) *Attorney, Agent, or Firm* — Procopio, Cory, Hargreaves & Savitch LLP; Noel C. Gillespie

(57) ABSTRACT

A wearable communication device including a bracelet including an integrated first power source, and a telecommunications device including a transceiver configured to allow wireless communication, wherein the telecommunications device is configured to couple and decouple with the bracelet, and wherein the telecommunications device is configured receive power from the first power source when coupled with the bracelet.

31 Claims, 37 Drawing Sheets

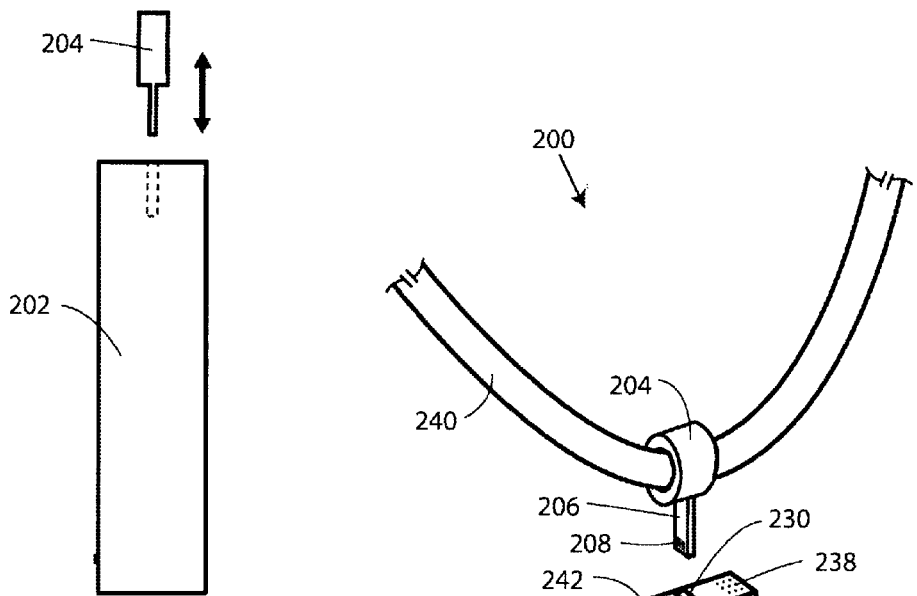
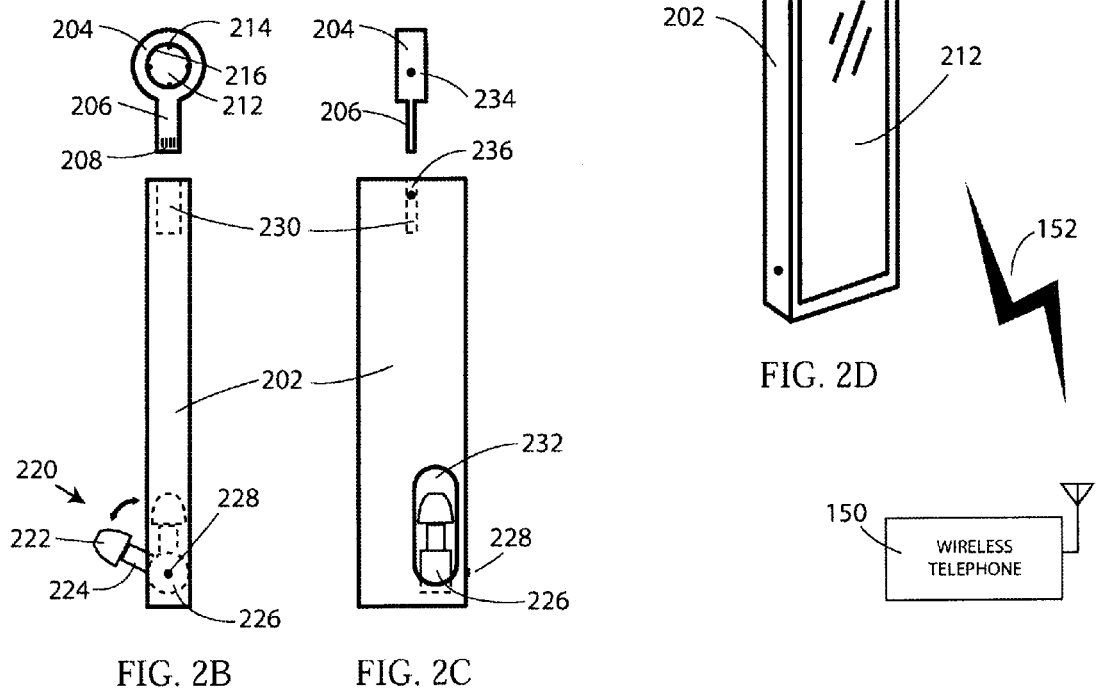
FIG. 2A
FIG. 2B  FIG. 2C
FIG. 2D

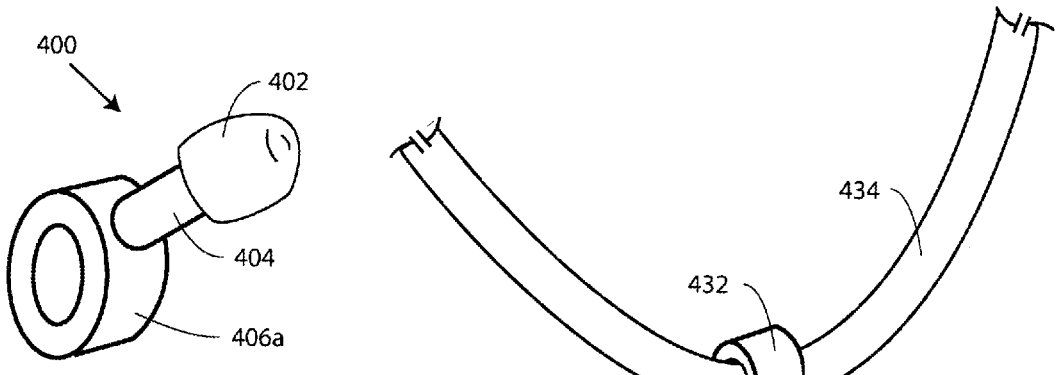
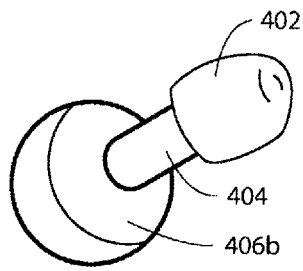
FIG. 4A
FIG. 4B
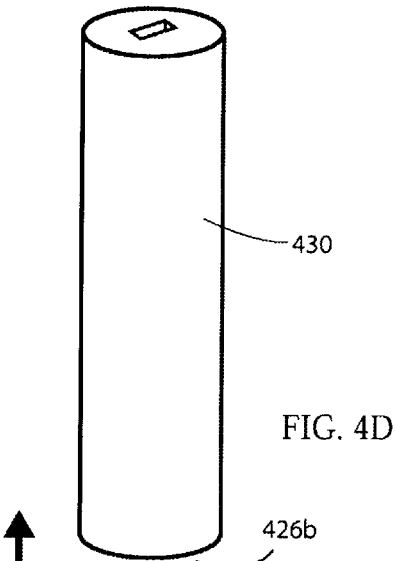
FIG. 4D
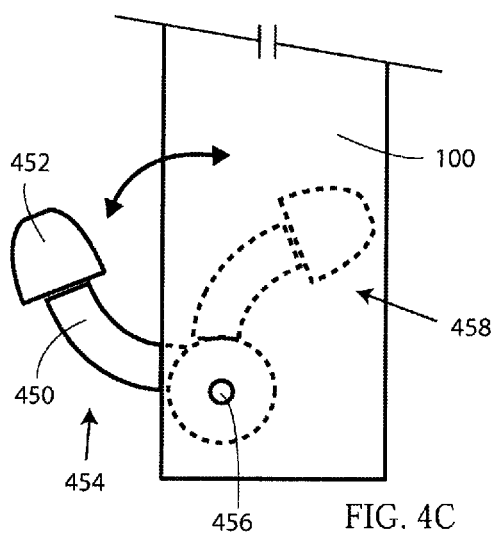
FIG. 4C
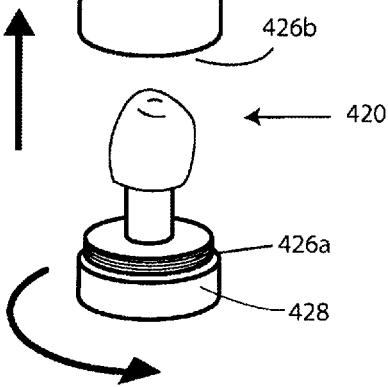

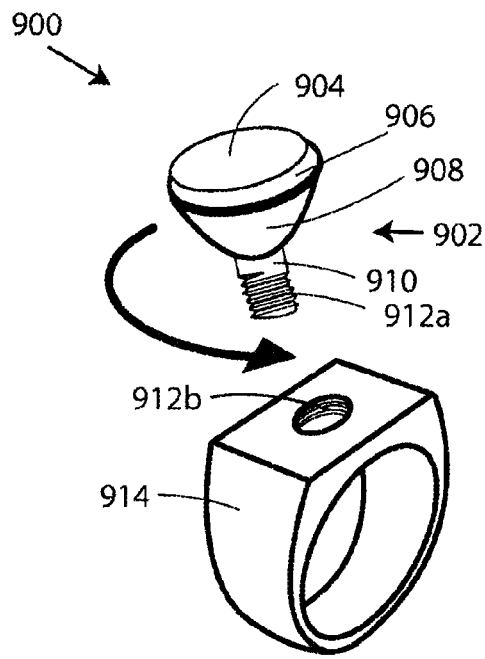
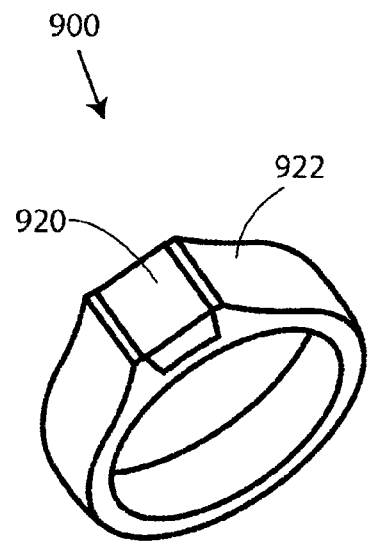
FIG. 9A  FIG. 9B
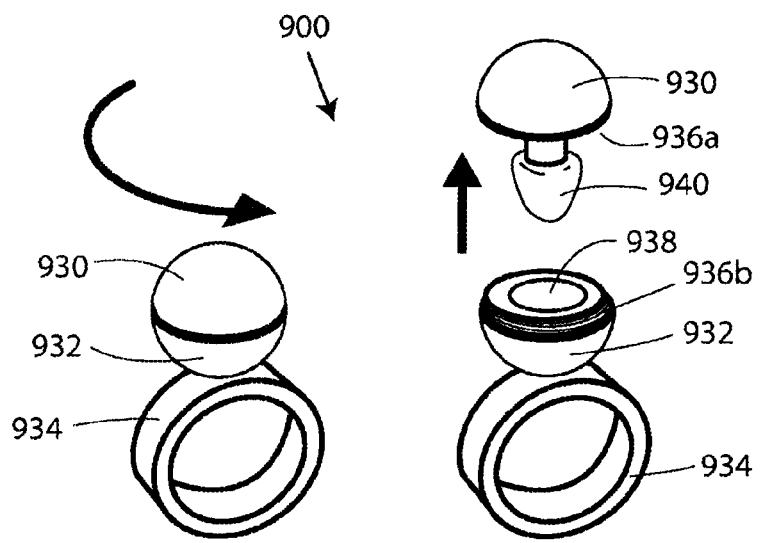
FIG. 9C

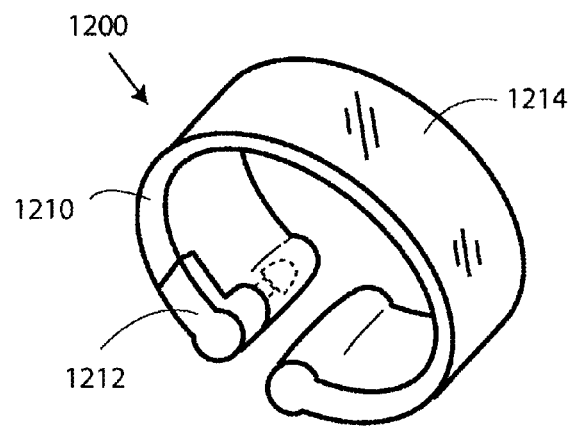
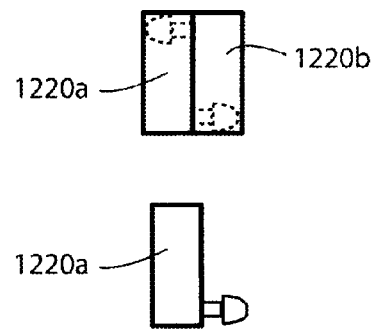
FIG. 12A  FIG. 12B
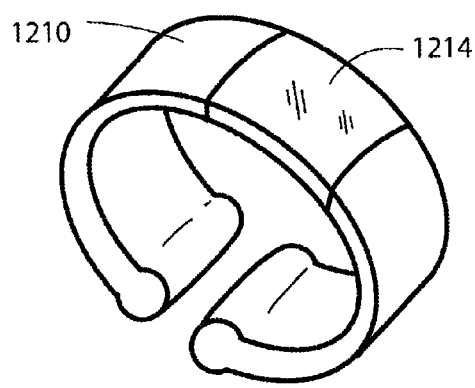
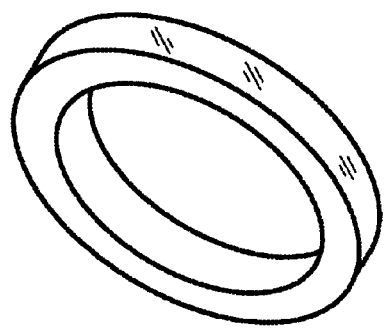
FIG. 12C  FIG. 12D

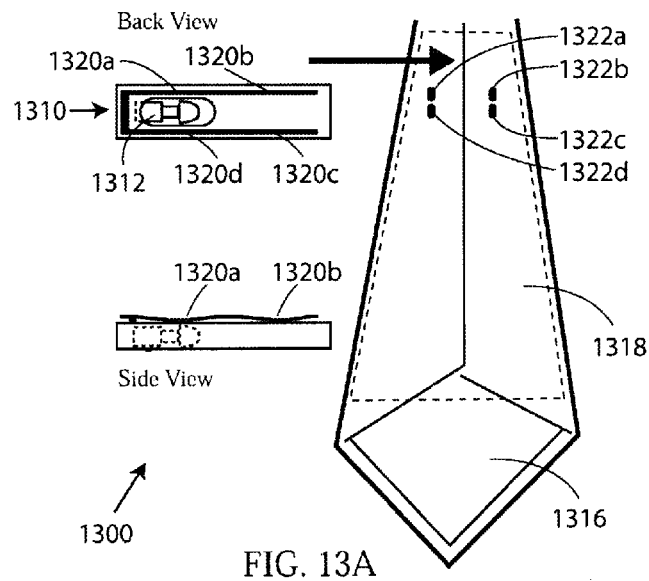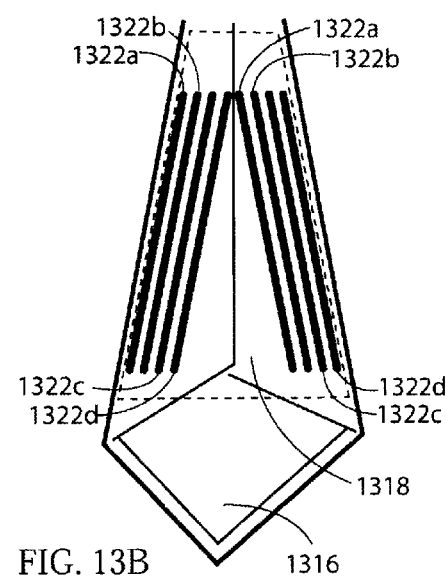
FIG. 13A  FIG. 13B
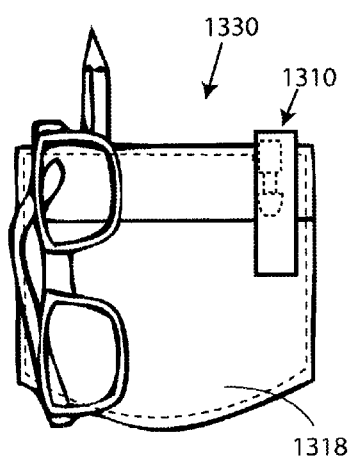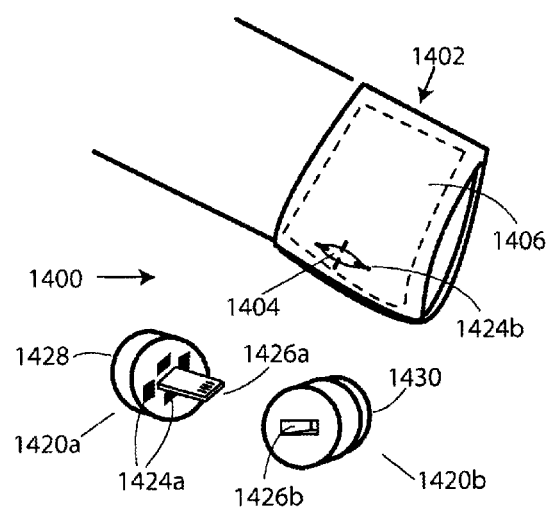
FIG. 13C  FIG. 14

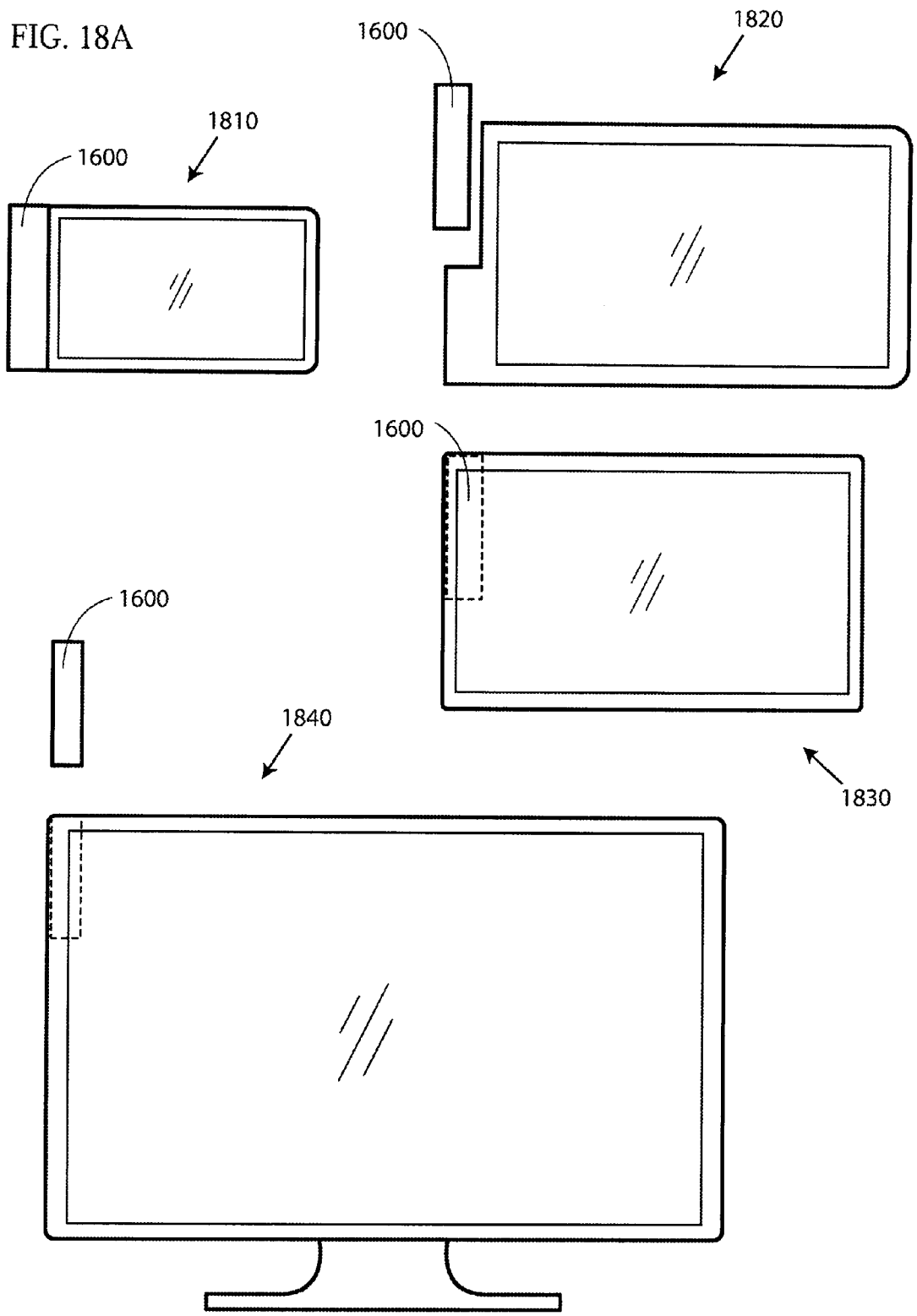

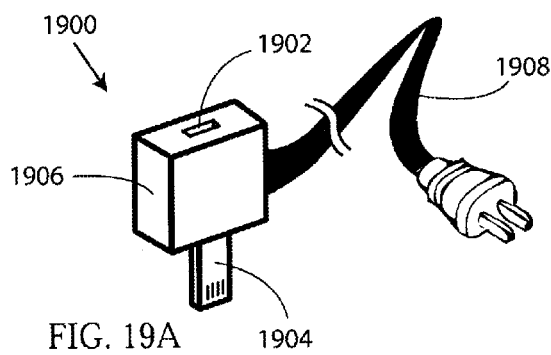
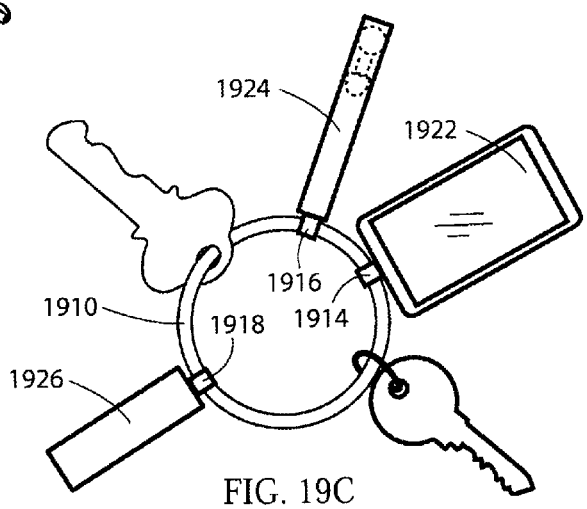
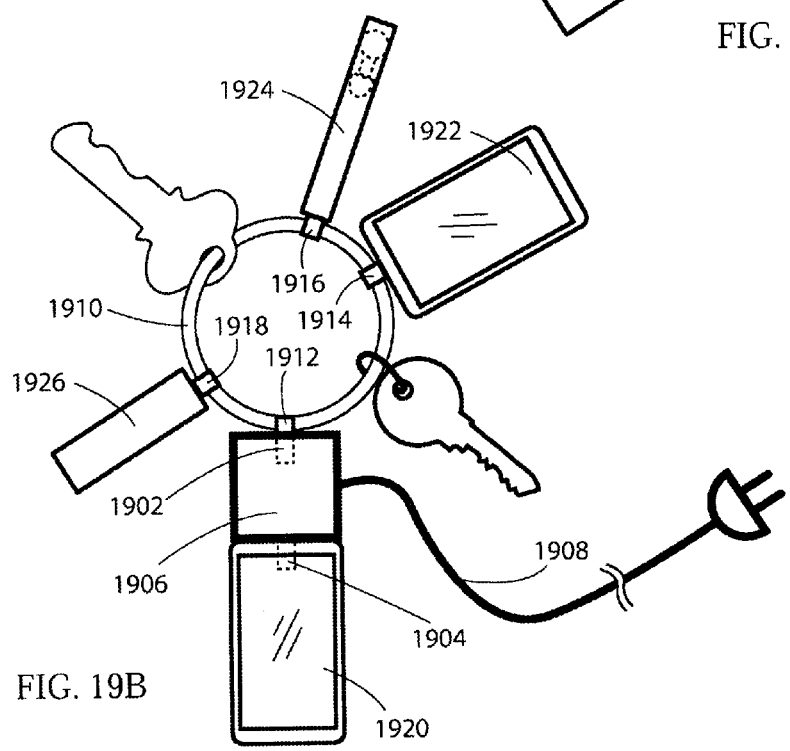

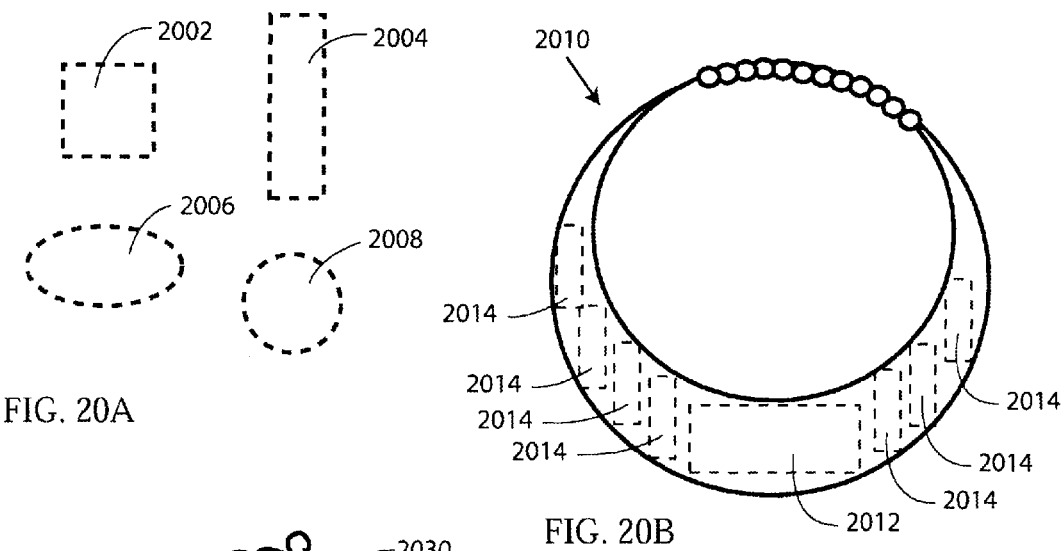
FIG. 20A
FIG. 20B
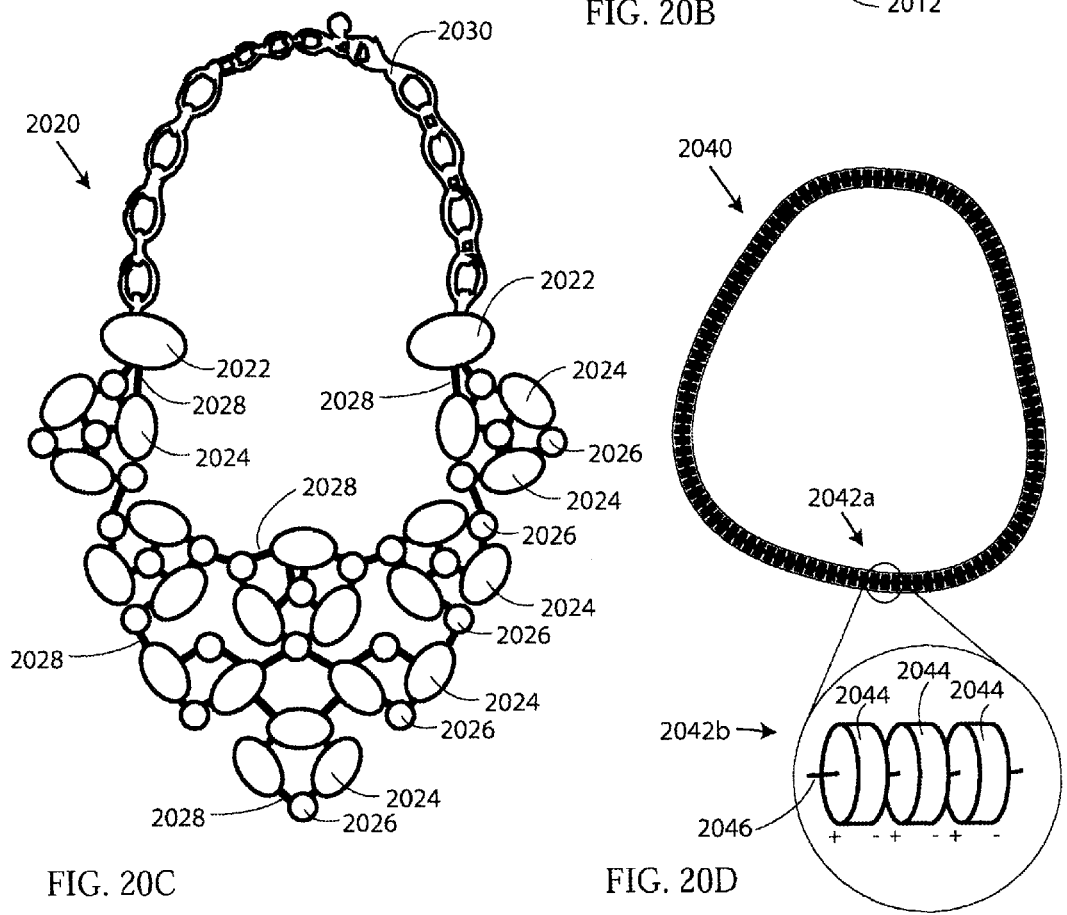
FIG. 20C
FIG. 20D

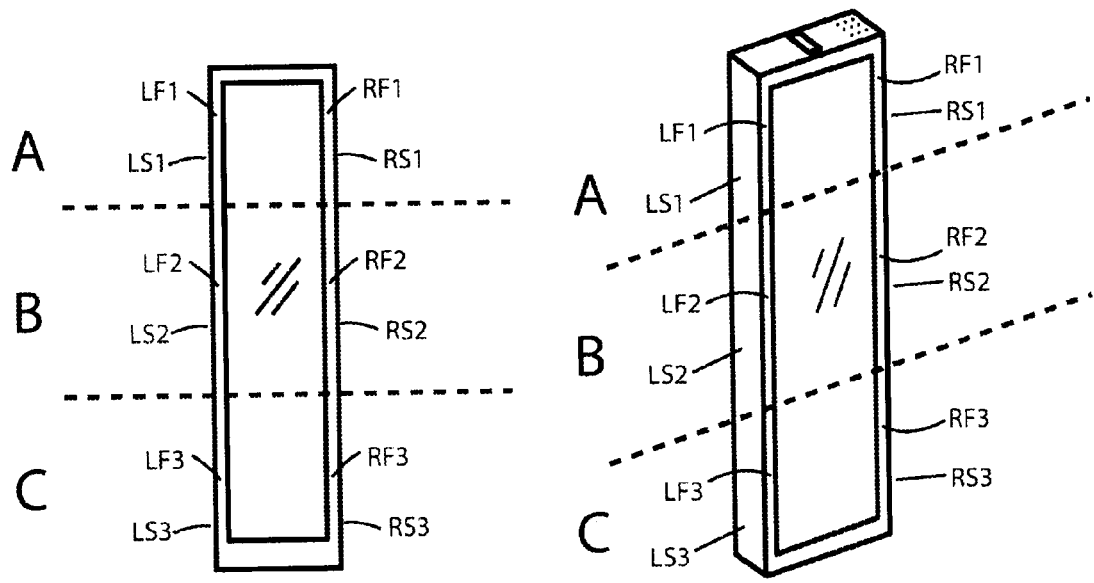
LS = Left Side
RS = Right Side
LF = Left Front edge
RF = Right Front edge
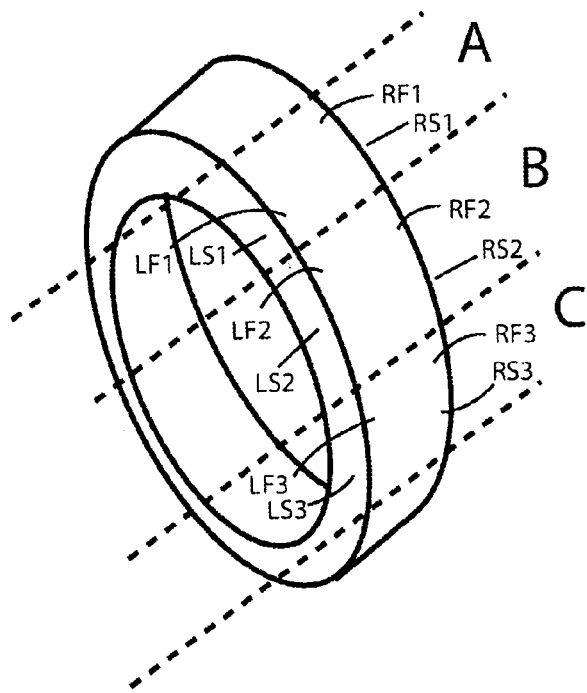
FIG. 22

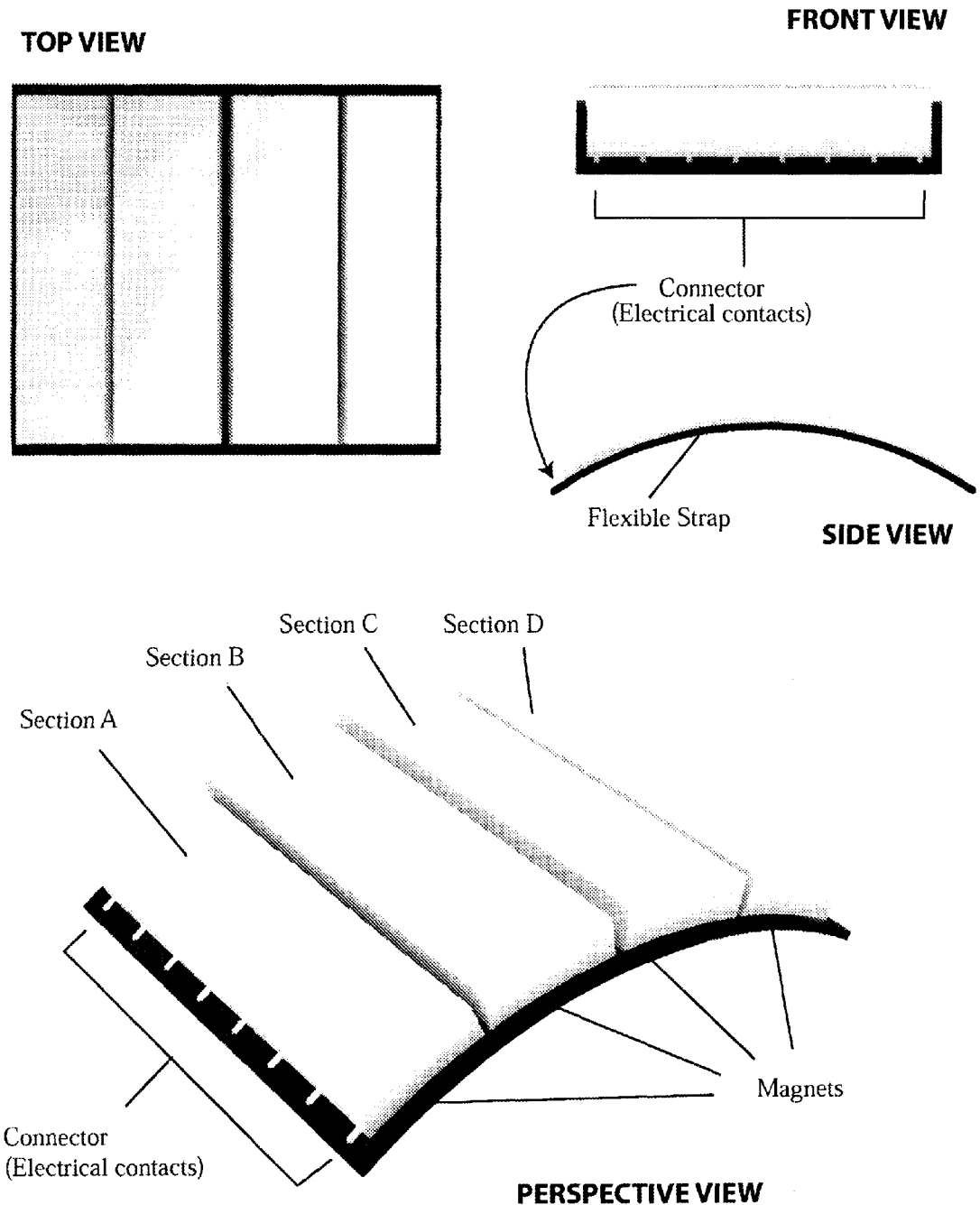
FIG. 24  Device platform already in a arch position

10705

METHODS, SYSTEMS, AND APPARATUSES FOR INCORPORATING WIRELESS HEADSETS, TERMINALS, AND COMMUNICATION DEVICES INTO FASHION ACCESSORIES AND JEWELRY

CROSS-REFERENCE TO RELATED APPLICATIONS

This application claims priority under 35 U.S.C. §119(e) from Provisional Patent Application Ser. No. 61/720,248, filed on Oct. 30, 2012 and Provisional Patent Application Ser. No. 61/745,453, filed on Dec. 21, 2012, the contents of both of which are incorporated herein by reference.

BACKGROUND

In the past 15 years, the mobile telephone industry has grown by leaps and bounds. The market demand for mobile phone accessories such as faceplates, cases, chargers, and Bluetooth® headsets has also proliferated rapidly.

Since the explosion of Apple's iPhone® and its contribution to the phenomenon of app culture, companies large and small are trying to produce devices that facilitate and maximize the use and functionality for consumers and their smartphones. For example, one company has recently introduced a "Smartwatch" that connects to a smartphone and can display Twitter feeds, Facebook updates, SMS, among other things pulled from a smartphone. Other companies have produced devices that measure the energy you exert on a daily basis and send it to a smartphone, while also telling the time. Other devices may track user's daily activity and send the information to a smartphone application. Other devices that can play music and display text, the weather and other information from a phone have also been introduced.

These smart watches primarily serve as a complement to smartphones; for example, they display information such as incoming calls and can control smartphone applications. As a result, the growth of the smartphone market directly influences growth of the smart watch market. The smartphone installed base hence serves as the total available market for smart watches.

However, many of these fitness and health focused accessories are single purpose. Further, even though watch-like devices have attempted to bridge the mobile phone and consumer's informational needs but they are more or less "geek-like" gadgets. Therefore style-conscious consumers, particularly females, do not take advantages of these unfashionable looking smart watches, Bluetooth headsets, etc.

Similarly, in the past decade, Bluetooth headsets have transformed to more than just transmitting voice conversation. In addition to advancing digital signal processing and sound quality, many brands have also attempted to increase battery life, form factor, and design of its wireless headsets. Some headsets come with a mini display (usually one or two liner) integrated for displaying caller ID, SMS, phonebook, song title, etc.

It is also true that most fashion houses and jewelry makers do not have the technical know-how to efficiently integrate their fashion jewelry with digital accessories. If they try to do it at all, they must outsource or partner with engineering service firms and/or Original Equipment Manufacturers (OEMs) to produce such a combination. Thus, none has been able to integrate Bluetooth headsets and wireless communication devices with jewelry and fashion accessories consumers enjoy wearing. It is believed that (1) the capability and technologies to miniaturize electronic and circuitry is possible today but keeping sufficient battery life increases the physical size of device proportionally and (2) other than the battery, the earbud and related components take up most of the real estate of the headset casing and industrial design. Nonetheless, it is a fact that most women and style conscious consumers do not like and want to wear today's Bluetooth headsets and wireless communications devices in the market today are appealing to primarily to geeks, gadget-lovers, and/or fitness fanatics.

Further, these smart watches and headsets are all individually engineered from scratch. This negatively impacts their cost and limits expansion of a full 'line' of accessories unless new devices are built in similar boxy form factors.

What may be needed are ways to hide the earbud or listening device so a wireless headset can seamlessly integrate with fashion accessories and jewelry. Furthermore, devices for wireless terminals may need to be integrated and incorporated in jewelry and fashion accessory design, so consumer's daily digital communication needs is infused with such devices and part of their fashion.

BRIEF SUMMARY

The embodiments described herein may relate to an easily interchangeable, versatile platform to enable the design and incorporation of digital communication functionality in fashion accessories & jewelry, without the need to reinvent the wheel with each new design or develop extensive in-house technical know-how by fashion accessory and jewelry designers. For example, embodiments of the present application may include an interchangeable, versatile electronics package or platform compatible with the design and incorporation of wireless digital communication functionality in a wide variety of fashion accessories and jewelry. This might allow fashion accessory and jewelry designers to not be required to constantly re-design their form-factors or possess extensive technical know-how to participate in the next wave of the wearable mobile communication market.

Additionally, some embodiments may include coupling the device platform with an add-on accessory to transform the combined units into a fully functional wireless terminal device, where users can access and control the interlinked wireless telephone. In some embodiments where other wireless interface/connection (e.g., Wi-Fi, cellular, etc.) is present, a wireless terminal device can be a fully standalone functional apparatus with the capability of transmitting data to and from the 'cloud' (web based) services via the wireless network.

Further, embodiments may also include methods, systems, and apparatuses for incorporating wireless communication into fashion accessories and jewelry allows functional interchangeable wireless headsets and wireless communication devices to be integrated with designer fashioned pendants, necklace earrings, bracelets, rings, key chains & tags, handbag decoration chains & tags, tie clips, cufflinks, belt, etc.

For example, the an embodiment may provide a retractable earbud mechanism where earbud and related components can be hidden or stored for aesthetic purpose in addition to provide greater freedom and flexibility for designers to design. Furthermore, multiple mechanisms for retracting earbud are described to accommodate and incorporate with an endless combination of design, form factors, and sizes of fashion pendants, earrings, bracelets, and many other fashion accessories and jewelry.

Another embodiment may provide a battery powering/charging system. Additional rechargeable battery or batteries can be integrated with fashion accessories and jewelry, where it already comprises a built-in rechargeable battery. In one example, additional rechargeable battery can be housed in the bracelets, bangles, necklaces, necklets, earring elements, key chain and bag decoration charm tags, belt, tie, etc. To achieve a robust and seamless battery charging system, a common removable connector(s) is provided in the present application.

In another example, users can wear a fashion pendant with wireless headset integrated, by plugging it to the connector that is removably attached to the necklace with built-in rechargeable battery. In turn, wireless headset will automatically be charged from the necklace's rechargeable battery. Pendant headset can easily and quickly detach from connector for use. Additional batteries can also be integrated with one or more pendants separately, but can be connected for charging through similar connectors. Similarly, batteries can be distributed in one or multiple elements of necklace, earrings, keychain tags, etc.

In some embodiments, necklaces with the built-in rechargeable battery can integrate with one or two wired headsets that can be used for voice communication or access to audio content on mobile phone/devices when coupled to pendant wireless headset through connector.

Bracelets, rings, earrings, keychain tags, and bag decoration charm tags can house rechargeable battery or batteries with integrated wireless headset. Battery or batteries for earrings, finger rings, key chain tags, and bag decoration tags may utilize and/or charge from external battery sources that are integrated with the accessory/jewelry, through either a removably attached connector or hardwired.

In another example, a tie clip with built-in wireless headset can be charged when it is clipped to a fashion tie, with a thin, flexible rechargeable battery integrated. The same tie clip can be charged when clipped anywhere on the shirt pocket where a thin, flexible rechargeable battery is built-in. Cufflinks with integrated wireless headset can be charged when it is coupled on a cuff of the shirt, where a thin, flexible rechargeable battery is incorporated inside the cuff.

Still another example, a removable wireless headset can be designed as part a belt buckle, and it is charged when docked (attached) from the rechargeable battery or batteries that are integrated inside the belt panel.

Charging may take place when electrical contacts of both the battery source and wireless headset come in contact, be it through removable connectors, hardwired, clip, or in combination. It should be understood more than one type of electrical contacts and connectors can be: plug & pull, magnetize, threaded structure, slider, ball bearing, etc. are described in the present application.

In accordance with some embodiments of the present application, methods, systems, and apparatuses can also provide wireless devices (such as wireless terminals that communicate with a mobile telephone or other computing devices) integrate with fashion accessories and jewelry. For example, a removable, portable wireless terminal with display screen can be integrated with fashion pendants, key chain tags, handbag decoration tags, belt buckle, bracelets, etc. Fashion accessories and jewelry (e.g., bracelets, bag decoration tags, belt buckles, etc.) can be designed with additional or larger displays so users can have a larger viewing real estate when they are coupled with a wireless terminal.

It may be understood, wireless terminals can be fully-functional wireless communication devices with the capability of today's smartphones. Furthermore, in addition to fashion accessories and jewelry (e.g., bracelets, pendants, etc.), wireless devices described herein can be used with companion devices with various display sizes. In one example, phone companion and tablet companion consist of a multi-touch display with built-in rechargeable battery, while some embodiments may comprise storage or just temporary memory (e.g., RAM) and/or removable memory card such as a micro-SD, even though wireless devices have the capability to be coupled with external storage or other needed add-on external peripherals for extra performance and/or functionalities. Companion devices such as desktop monitor and television can also include storage and/or removable memory card with or without multi-touch and/or motion gesture control capability integrated.

Add-on peripherals can be connected to wireless devices in anyway user desired.

Methods, systems, and apparatuses of the present application may provide a powering/charging system where wireless device prioritizes, sets rules, and sends instructions to and from add-on peripherals (e.g., companion devices, additional battery, external storage, special camera, etc.) will instruct how. Batteries, external or internal (built-in with companion devices and fashion accessories & jewelry) will be charged according to rules and instructions set by wireless devices and/or user preference. Similarly, wireless headsets and wireless terminals that are integrated with fashion accessories and jewelry also share the methods of this power and charging system.

Consumers can maximize their investment by leveraging the 'same' interchangeable, adaptive wireless headset, wireless terminal, or wireless communication device for different fashion accessories and jewelry. In one example, the 'same' interchangeable headset or device that is integrated with the pendant can be used on a bracelet or handbag decoration tag. Because of the versatile of wireless device in accordance with the present application, the 'same' wireless device can also be integrated and used with companion devices described above in addition to fashion accessories and jewelry. Hence, methods, systems, and apparatuses of the present application may allow users to seamlessly and easily transform the 'same' wireless headset and wireless device into another device or fashion accessories/jewelry.

Furthermore, with methods, systems, and apparatuses in accordance with the present application, providing retractable mechanisms of earbud and a battery powering & charging system, advantageously, consumer electronics makers as well as fashion accessories & jewelry brands can easily and quickly integrate wireless headset, terminal, and communication devices to fashion accessories and jewelry (e.g., pendants, bracelets, earrings, tie clips, belts, key chain tags, etc.) in this robust platform.

According to an aspect of the present application, a wearable communication device including a bracelet including an integrated first power source, and a telecommunications device including a transceiver configured to allow wireless communication, wherein the telecommunications device is configured to couple and decouple with the bracelet, and wherein the telecommunications device is configured receive power from the first power source when coupled with the bracelet is provided.

BRIEF DESCRIPTION OF THE DRAWINGS

FIGS. 2A, 2B, and 2C illustrate front, side and back view, respectively, of a fashion accessory in accordance with an embodiment.

FIG. 2D illustrates a perspective view of a fashion pendant accessory system 200 in accordance with an embodiment.

FIGS. 4A-4D illustrates different embodiments of earphones.

FIG. 9A-9C illustrates three slightly different embodiments of digital fashion finger ring system having wireless headsets integrated with the ring portion.

FIG. 12A illustrates a system of a digital fashion bracelet in accordance with one embodiment.

FIG. 12B illustrates an embodiment of a pair of wireless headsets coupling together and integrated with a device shown in FIG. 1A.

FIG. 12C illustrates another embodiment of a digital fashion bracelet in accordance to the present application.

FIG. 12D illustrates an example embodiment similar to FIG. 12A but with a bangle form factor.

FIG. 13A illustrates a fashion tie clip system in accordance with an embodiment.

FIG. 13B illustrates another embodiment of a fashion tie clip system.

FIG. 13C illustrates a tie clip or similar designed accessories clipped to a shirt pocket with a battery inside the pocket.

FIG. 14 illustrates a fashion cufflink system in accordance with one embodiment.

FIG. 18A illustrates various ways the unique wireless device of FIGS. 16A and 16B can be used with companion devices in accordance with an embodiment.

FIG. 19A-C illustrates a charging system in accordance with one embodiment.

FIG. 20A illustrates various shapes of internal batteries.

FIGS. 20B-20D illustrates different configurations of internal batteries incorporated into necklace designs.

FIG. 22 illustrates a user interface system in accordance with an embodiment.

FIG. 24 Illustrates various views of the device platform of FIG. 23A.

DETAILED DESCRIPTION

Figure 1A:
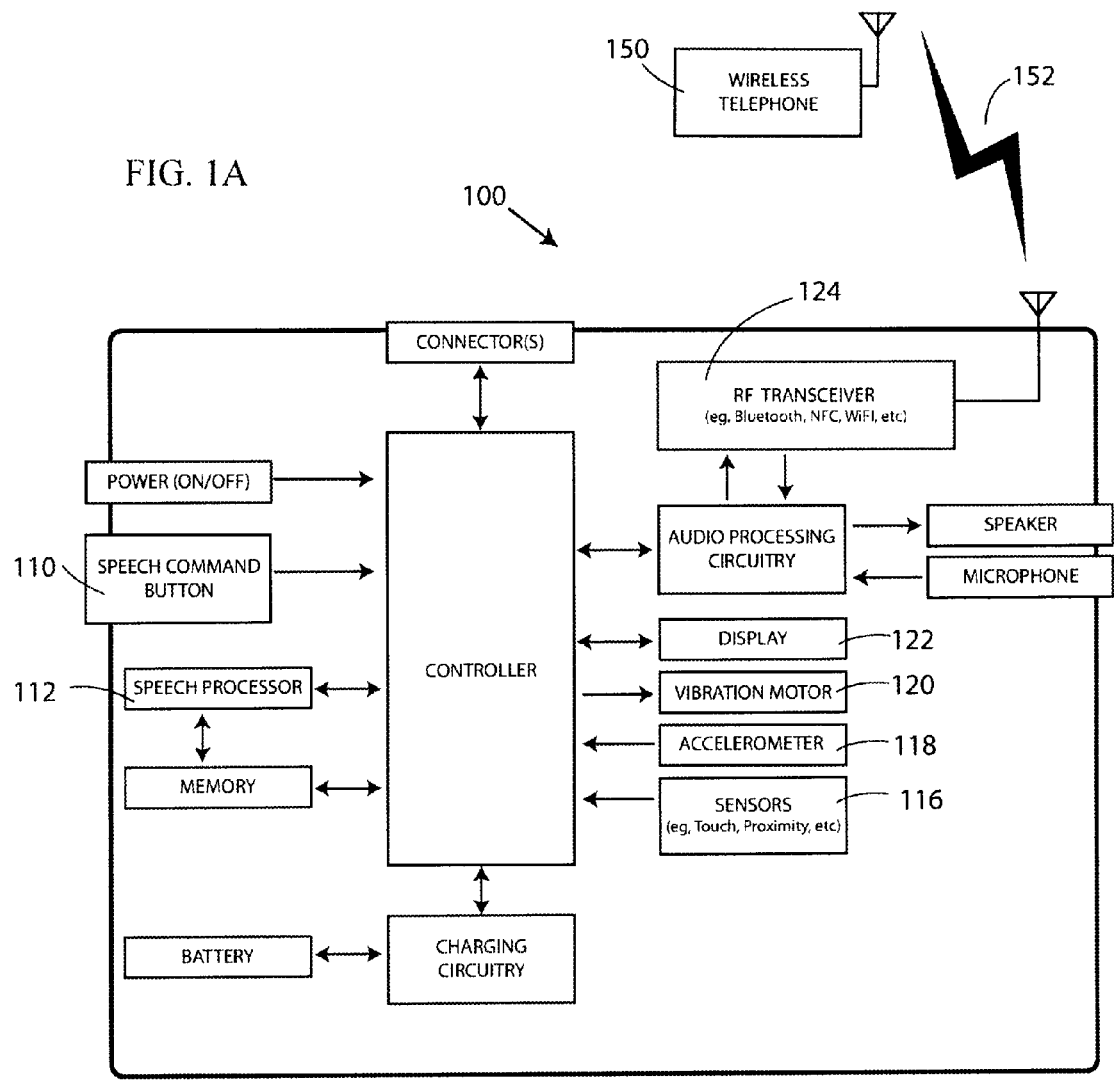
FIG. 1A illustrates shows a high level block diagram of a wireless fashion accessory 100 in accordance with an embodiment.

To assist in the following description, a number of terms used herein will be defined.

Add-on accessory: an add-on accessory is a companion fashion accessory, usually with rechargeable battery integrated while some may or may not have a display. Certain embodiments may include more than one display and/or wireless ear set. Add-on accessory is an interchangeable terminology with "companion accessory", "fashion accessory", and "digital accessory". It can any form factor, size, design style whereas it can be a pendant, bracelet, bangle, necklet, keychain tag, handbag decoration tag, etc.

Communication link: a signal or signals sent to and from one apparatus to another. It can be wirelessly or through physical connector of electrical contacts.

Connector: A set of electrical contacts for transmitting data, power and other electric signals from Device Platform to Add-on Accessory. Such transmission may be from one apparatus to another or from one component to another, etc.

Device platform: An apparatus that is capable of computing and displaying information and graphics, playing video and audio content, etc. to add-on accessory's screen and loud speakers when coupled with an add-on accessory. It may also comprise an accelerometer and other sensors. Generally, it is consists of similar components and circuitry (e.g., processor, memory, etc.) as today's smartphone, smart watch, terminal device, etc. It may be integrated with open-source OS and software such as Google's Android or proprietary software. "Device platform" can be also referred to as "electronics package" and "electronics platform."

Electronics package: also may be referred "Electronics platform" or "Device platform".

Flexible strap: A strap made with silicone, polymer, rubber-like or other materials that provide flexibility characteristics to enable the device platform to bend up or down or any direction to form a compatible curvature when coupled with the desired add-on accessory. As an example, the strap could be similar to an electronic 'ribbon cable' with embedded conductive pathways or traces can be included in which electrical energy can travel from one module or segment of the electronics package to any other module mounted on, or connected to, the strap.

Module: a self-contained, possibly oblong or rectangular, multi-functional package of various electronic components including power sources and conditioners which are mounted on the above referenced 'Flexible strap'. The individual modules (of which four are shown, as an example, to illustrate one of their form-factors on the accompanying Figures) can be mixed and matched depending upon the purpose and functionality of the device platform as well as a particular piece of designer jewelry such as a bangle or bracelet which might vary from a wireless ear-set or key chain. "Module", "Segment", and "Section" are interchangeable terms and are the same herein.

Smart watch: Generally it is a terminal device that receives data from interlinked smartphone. Primarily serve as complementary to smartphones to display information such incoming calls and to control smartphone applications. Data such as emails, social network updates, alerts, news, etc. can be pushed from interlinked smart device to smart watch.

Wearable: In the technology and wireless world, wearable is generally referred to an apparatus is having advanced circuitry, wireless connectivity and independent processing capability and being worn by users for an extended period of time, with the user experience significantly enhanced as a result.

Wireless ear set: A headset (typically only consisting of one earbud but could also comprise dual earbuds) that can receive and transmit voice and/or data wireless to and from a communication device such as a mobile telephone where users can listen and talk to one another in a group phone conversation.

Wireless terminal device: An apparatus with similar capabilities of a computer or "dumb" terminal where data can be transmitted to and from it to another computer or device and process or re-direct user or network commands to various components of the device. Generally user interface is provided for users to interact and control certain applications or functionality of the interlinked computer, device, local network, or carrier network.

With reference to FIGS. 1A-22, embodiments of the present application may be described. Examples are illustrated in the accompanying drawings. While the application will be described in conjunction with preferred embodiments, it will be understood that it is not intended to limit the application to only the described embodiments or visual representations. To the contrary, it is intended to cover alternatives, modifications, and equivalents as may be included within the spirit and scope of the application.

FIG. 1A shows a high level block diagram of a wireless fashion accessory 100 in accordance with an embodiment where it transmits data to and from mobile phone 150 or other computing devices with wireless communication interfaces 124. For a fashion accessory without a display screen (or sufficient real estate screen space for displaying 10-20 characters, up to a maximum of 1 or 2 short sentences, such as caller ID, phone number, calendar alert, email subject line, song title, etc.) will generally be referred to "wireless headsets" hereafter. If a fashion accessory comprises a larger display (e.g., at least 1"×1" or 1"×3") sufficient to show minimal graphics and/or content, it will generally be referred to as "wireless terminal device". "Wireless headset" and "Wireless terminal device" may be used interchangeable—in such a case, it will generally be referred to as "device" or "fashion accessory."

Unlike any existing Bluetooth devices in the market, the wireless device 100 described in accordance with the present application may include a push-to-talk button 110 or a touch sensor 116 to empower users to activate the speech command functionality through the built-in speech processor 112. Touch sensor (single point or multi touch) 116 allows users to control the headset without a traditional button. Furthermore, wireless headset 100 in accordance with an embodiment may include an accelerometer 118, and proximity or other sensors 116 in addition to a vibration motor 120 and display screen 122, in addition to all the required electronic components for a functional Bluetooth headsets, known in prior arts. Display 122 may be a touch or non-touch LCD, OLED, or flexible e-paper in some embodiments, while other embodiments may comprises a combination of these display technologies (e.g., part OLED and part e-paper) in accordance with the present application.

In addition to Bluetooth, fashion accessory may also consist of other wireless interfaces 124 such as Near Field Communication (NFC) and Wide Area Local Network IEEE 802.11 standards (e.g., Wi-Fi).

In some embodiments, fashion accessory 100 may be transmitting and receiving data 152, to and from other fashioned digital accessories 100 such as bracelets, key chain tags, belt buckles, etc. which will be exemplified on the next figure diagram.

Figure 1B:
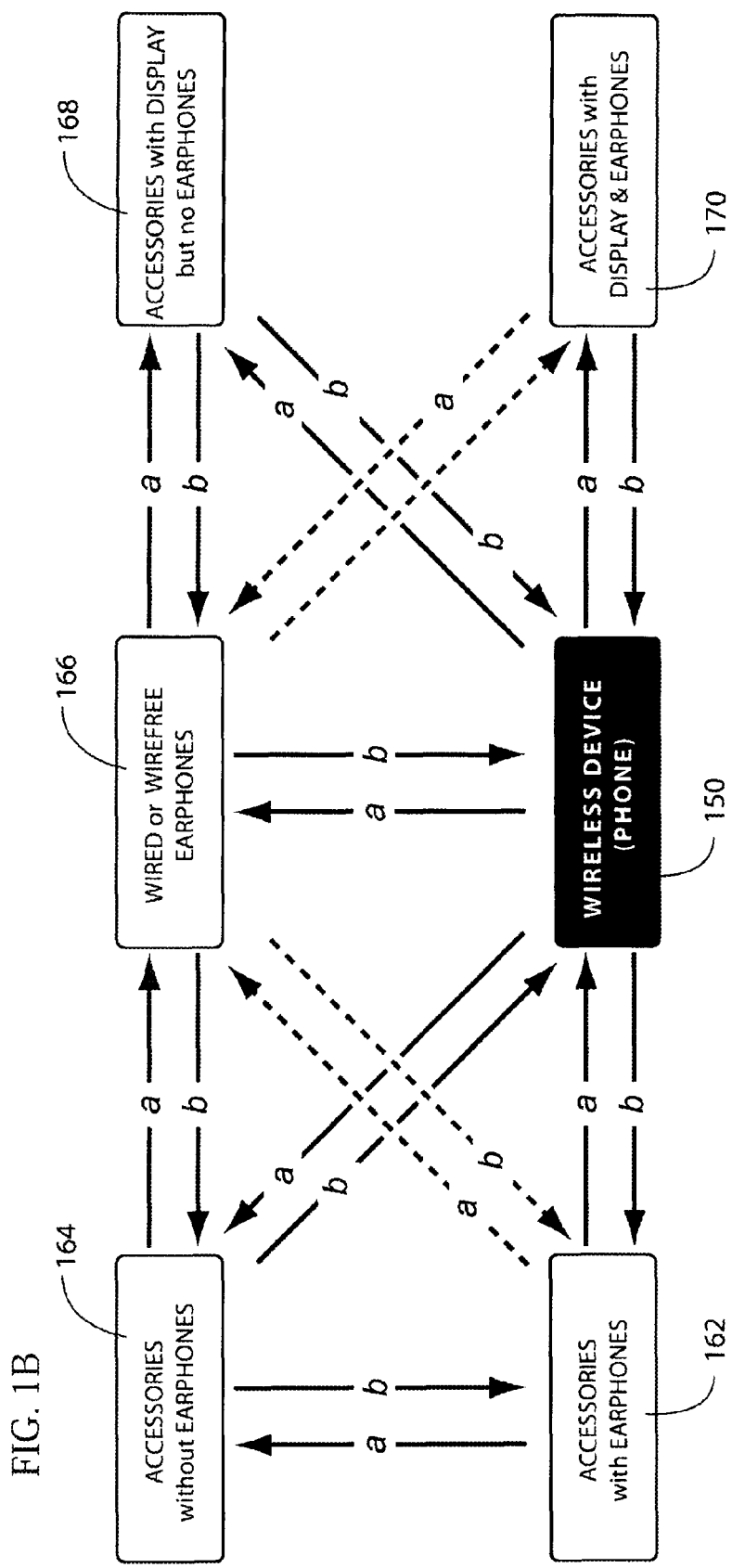
FIG. 1B illustrates a diagram of connection relationships of fashion accessories, in accordance with an embodiment.

FIG. 1B shows a diagram of connection relationships of fashion accessories 100 in accordance with the present application. Any wireless telephone or wireless computing device 150, so long it comprises the same wireless standards (e.g., Bluetooth) as the wireless fashion accessories 162, 164, 166, 168, 170 is compatible with the wireless fashion accessories.

As shown on this diagram, in accordance with the present application, mobile phone 150 can transmit to and from accessory with headset 162 such as a fashion pendants, bracelets, or earrings, to name a few, with built-in retractable earphones. Concurrently, while this accessory 162 is in operation (via connections a & b) with mobile phone 150, this accessory 162 can also communicate with another accessory without headsets 164 or just the headset 166 via connections a & b.

Communications between accessories can be direct or through mobile phone 150 as a hub. For example, mobile phone may be used to communicate with accessory without headset 164 (e.g., bangle or keychain tag, etc.), in turn, this specific accessory 164 may be used to communicate with an accessory with headset 162 (e.g., earrings or pendant with headset built-in, etc.) where first accessory 164 serves an informational display while second accessory 162 may function as a listening device.

In another configuration, while mobile phone 150 is in operation with fashion accessory without headset 164 such as a pendant, bag decoration tag, or bracelet, simultaneously mobile phone 150, during the same operation, can also communicates with headsets that are built-in to fashion earrings 162 or a third party Bluetooth headset 166. Similarly, while mobile phone 150 is communicating with accessory with display but without headset 168 or accessory with display and headset 170, headset 166 can also be used in conjunction—communicating directly with mobile phone 150 or directly with connected accessory.

FIGS. 2A, 2B, and 2C show front, side and back view, respectively, of the fashion accessory 202 in accordance with an embodiment, show the respective views of the connector 204. In this particular embodiment, the fashion accessory 202 is a wireless headset 100 (e.g., Bluetooth headset) with retractable earphone 220. In addition to the necessary components of today's functional Bluetooth headset, this embodiment is also equipped with a voice recognition chipset, and a touch sensor with the appropriate firmware. Electrical connector 204 is used to hang the pendant-like fashion accessory 202 to battery-integrated necklace 240.

FIG. 2A illustrates the front view of the device 202, without a display in this specific embodiment, whereas connector 204 is detached to device 202.

FIG. 2B shows a side view of the device 202. In one embodiment, connector 204 comprises a concave cavity 212 with one or more electrical contacts 214 along the concave wall 216 and an attached shaft 206. At the end of the shaft 206 contains reciprocal electric contacts 208 to the contacts 214 for connections to and from the contacts of the connector receptacle 230 housed inside the device 202. Part of the device 202, a retractable earphone 220 consists of a gel-like earbud 222, a neck 224, and wheel 226. A spring is integrated in the wheel 226 as a flip mechanism. Thus the earphone 220 can spring out from the device 202 with a press of the release button 228. A sensor can be built in the connector receptacle housing 230 or the earphone flip mechanism for auto answering an incoming phone call when the male connector 204 is disconnected from the connector receptacle 230, or when the release button 228 is triggered prior to answering an incoming phone call.

Similarly, the user can disconnect an active phone call by pushing the earphone 220 back into the storage cavity 232 built-in the device 202 which shown on FIG. 2C. To end a call, user can also simply plug the device 202 back to the connector 204 where male contacts 208 and contacts in connector receptacle 230 are mated.

In addition to the pendant-like device 202, it should be understood that this answering and disconnecting call operation also can be employed to all jewelry and fashion accessories described hereafter.

FIG. 2C shows the back view of the device 202, in accordance with the present application. In one embodiment, an ON/OFF switch 234 for enabling or disabling the battery recharging from necklace's battery source 240 to device 202. An optional device release latch 236 is also included for securing the device 202 to the connector 204.

Device 202 allows a user to communicate with other users through a mobile telephone device 150 or Voice-over-1P enabled device, without the need to speak directly into or hear sound directly from mobile phone 150 or any other wireless communication device.

FIG. 2D shows a perspective view of the fashion pendant accessory system 200 in accordance with an embodiment. The system 200 includes a wireless pendant-like device 202 and electrical connectors 204 which can be electrically coupled to the battery-integrated necklace 240, for transmitting electric currents, data, or both to the device 202 for powering and/or sending data to device 202, and/or recharging internal battery of the device 202 by connecting male connector 204 to connector receptacle 230 of the device 202. Connector 204 consists of a shaft 206 which include one or more contact points 208 to transmit power, data, or both.

In this particular embodiment, the device 202 includes a display screen 212, which can display information and content transmitted 152 to and from the mobile phone 150 or other computing devices with wireless communications (e.g., Bluetooth, Wi-Fi, etc.). The screen 212 can be a touch e-paper (e.g., e-ink), OLED display, or other display technology or combination (e.g., part e-paper, part OLED).

Users may have an option to conveniently use the loud speaker phone 238 in lieu of the integrated retractable earphone 220 for listen to audio or phone conversation with the ability to talk directly into its built-in microphone 242 without having to decouple the device 202 from the connector 204 that is attached to the necklace 240, while it's worn on user's neck.

Hereafter, "device" 202 may refer to all embodiments regardless of form factor, finishes, color, and built materials—and with or without a display. For instance, device 202 can be shaped like a hexagon, circular, or silhouette of Mickey Mouse® or Hello Kitty®. Device 202 can be a wireless headset 100 (e.g., Bluetooth hands-free earphone) or a wireless terminal device 100 or any form of fashion jewelry & accessories where data can be transmitted 152 to and from a mobile telephone 150 or other wireless computing devices with complementary wireless standards (e.g., Bluetooth or Wi-Fi).

FIG. 3A-3G show a variety of connectors 300 which can be any shape, size, and form factors, design, with different electrical contacts in accordance with some embodiments while in other embodiments, connectors (male plug and connector receptacle) may be eliminated in lieu of integration of wireless connector interfaces. A latch for keeping fashion accessory 100 (e.g., the pendant device 202) and connector 300 in a locked position could be integrated to any or all of the connectors described hereafter in accordance with the present application.

Figure 3A:
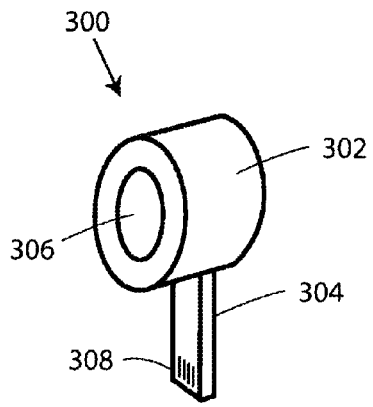
FIGS. 3A-3G illustrate a variety of connectors in accordance with some embodiments.
Figure 3B:
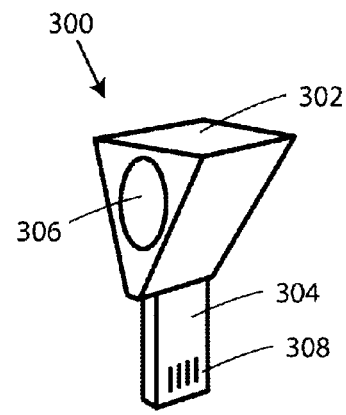

FIG. 3A shows a drawing of a connector 300 with a circular head 302 and the shaft facing sideway 304 while FIG. 3B illustrates an embodiment comprised of a triangular head with shaft 304 facing straight with electrical contacts 308 at the bottom but both of these connector heads 304 consist of an opening 306 with electrical contacts integrated to the concaved wall of the opening slot 306.

Figure 3C:
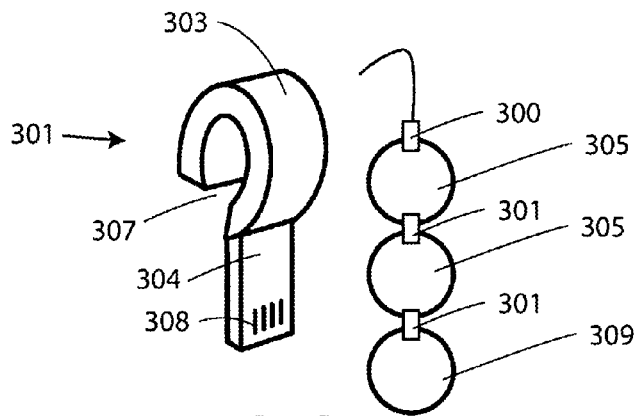

FIG. 3C is an embodiment where connector 301 consists of an open-looped head 303 rather than close-looped 302 as exhibited on FIG. 3A, but also comprises a shaft 304 and contacts 308. Electrical contacts are also housed on the concaved wall of the cavity 307. Advantageously, opened connector head 303 offers flexibility for add-ons if users desire.

For instance, users could string battery-integrated earrings 305 with built-in wireless headset 309 by hooking the opened connector 301 to one another; therefore this allows more battery source should users desire it. This configuration may also benefit fashioned wireless pendants, handbag decoration tags, key chain tags, and the like.

Figure 3D:
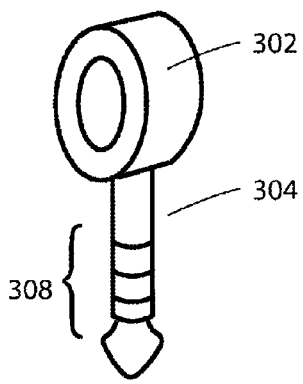
Figure 3E:
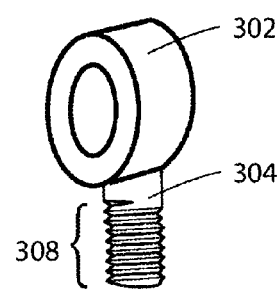

FIGS. 3D and 3E illustrate two different types of shaft 304 with identical function as they comprise similar electrical contacts for power, data, or both. Connector shown on FIG.

3D comprises a 3.5 mm jack like shaft where electrical contacts 308 are distributed vertically on the shaft 304. Connector shown on FIG. 3E consists of the same head 302 but shaft 304 resembles a bolt with threads as electrical contacts 308.

Figure 3F:
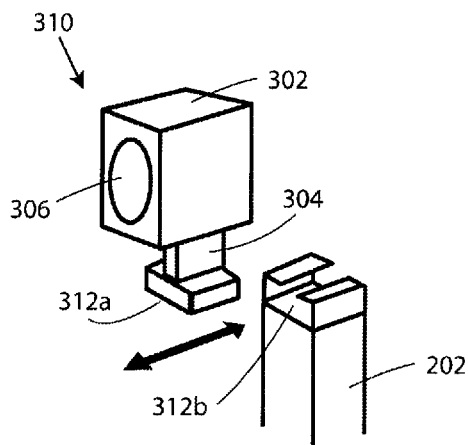

FIG. 3F reveals different embodiment connector 310, in which consists of a slightly different form of shaft 306 and base 312a with corresponding contact points in the cavity 306. This connector 310 incorporates a slider mechanism for coupling the connector 310 with the device 202, where ball bearing or other contact points are employed on the bottom of the base 312a and reciprocal part 312b of the device 202.

Figure 3G:
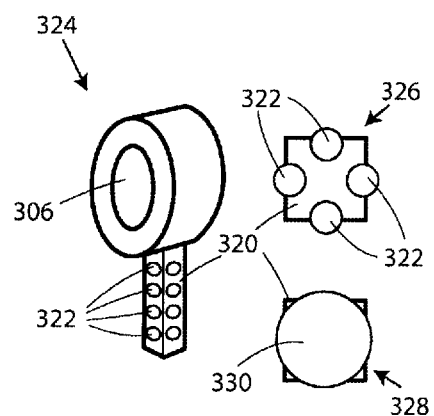

FIG. 3G shows another example of a connector 324 employing different shaft body 320 and contacts 322. On cross-section of one embodiment 326, contains a ball bearing for contacts 322 on each of the four sides of the shaft 320 while another embodiment 328, also on cross-section, illustrates a single ball bearing 330 that serves as contacts on all four sides of the shaft 320.

Figure 3H:
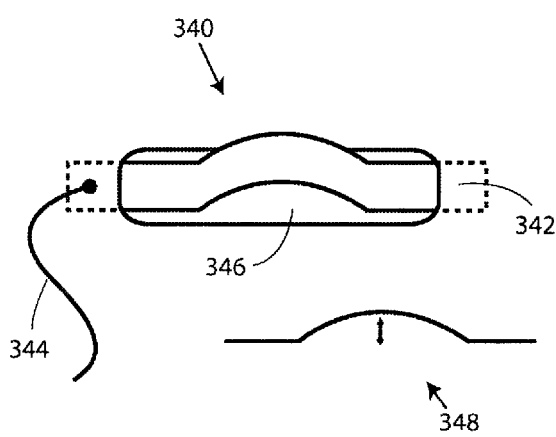
FIG. 3H illustrates an embodiment of an electrical contact on a connector.

FIG. 3H is an example of electrical contact 214 on the concave wall 216 of the connectors 300. This particular type of contact 340 comprises an orifice 346 where a thin metal-like 342 strip with a wire 344 connected to the corresponding contact in the shaft 304. The side view 348 of the metal-like strip reveals the elasticity characteristic of the strip 342 for pushing against the electrical contacts of the inbuilt-battery necklace 240 while giving the connector 300 an ability to efficiently glide on the necklace 240. When all metal strips 342 in the concaved cavity of the connector head 302 in contact with the corresponding contacts on the necklace with inbuilt-battery 240, electrical currents and/or data signals will be transmitted.

Figure 3I:
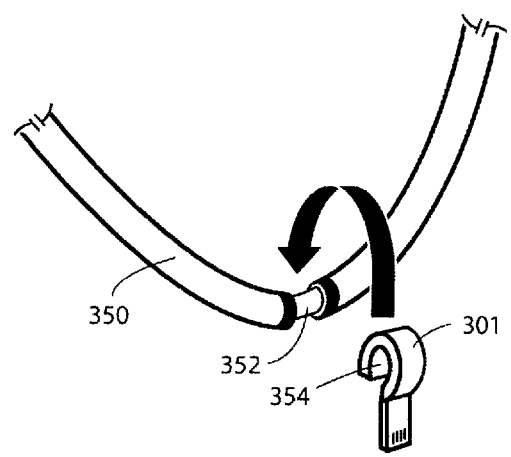
FIG. 3I illustrates an embodiment of an inbuilt-battery necklace.

FIG. 3I is another embodiment of the inbuilt-battery necklace, where opened connector 301 (shown on FIG. 3C) can easily be hooked for battery source when contacts 354 on connector 301 coupled with corresponding contacts 352 on the necklace 350. Such connector 301 can be easily removed from or rejoined the necklace 350, earrings, bag decoration chain, etc. This opened connector 301 may allow for interchangeable and reuse of the connectors in accordance with embodiments for fashion earrings, pendants, bag decoration tags, or key chain tags, etc.

Figure 3J:
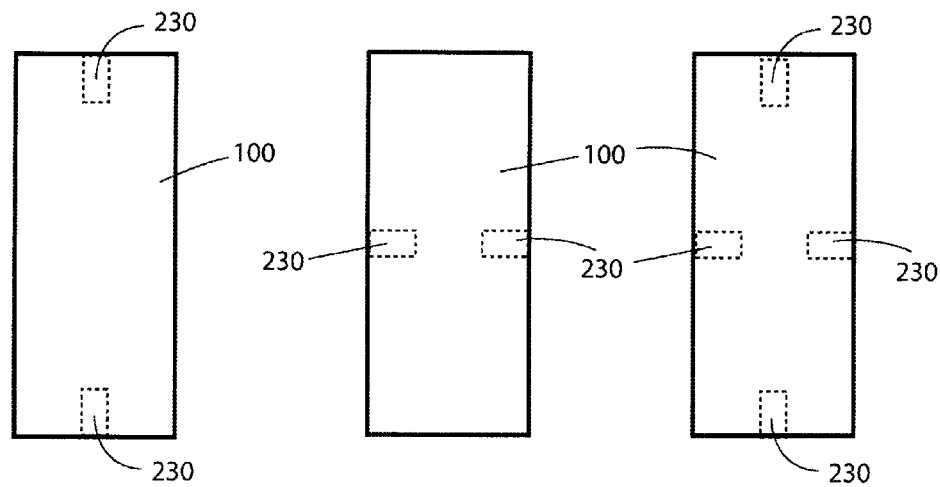
FIG. 3J illustrates examples of where connector receptacles may be housed in some embodiments.

FIG. 3J shows front view of examples of where connector receptacle 230 can be housed in the device 100, and it's not restricted to only the top of the device 100 as shown on FIG. 2A-D. Connector receptacles 230 can be integrated in more than one location and in any location of the device 100 as illustrated here.

Figure 3K:
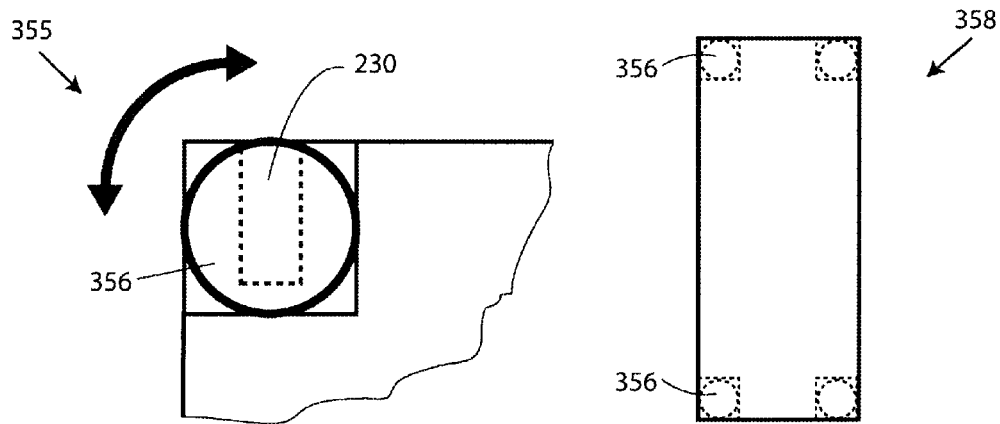
FIG. 3K illustrates another embodiment 355, of the connector receptacle 230.

FIG. 3K exemplifies another embodiment 355, of the connector receptacle 230. The connector receptacle 230 is integrated with a rotatable circular housing 356 which provides the connector receptacle 230 with the flexibility to rotate within 90 degrees. In some embodiments, the connector receptacle 230 can rotate up to 180 or 360 degree depending on the form factor and profile of device 100. This embodiment is advantageous when other add-on devices are better suited or needed for coupling on the sides rather than top or vice versa. Unlike the restriction of housing the connector receptacle 230 on the top of devices 202 shown on FIG. 2A-D, integrating such unique design 355 on the four corners as shown on 358 provides the flexibility for coupling another add-on device on any side, especially when add-on device comprises two male connectors for better stability.

To avoid electrical contact or signal complications, only contacts of one connector receptacle will be active while the other connector receptacle will temporarily disabled should device 100 detects both connectors are from the same add-on device unless contacts provides different signals or different use cases.

Figure 3L:
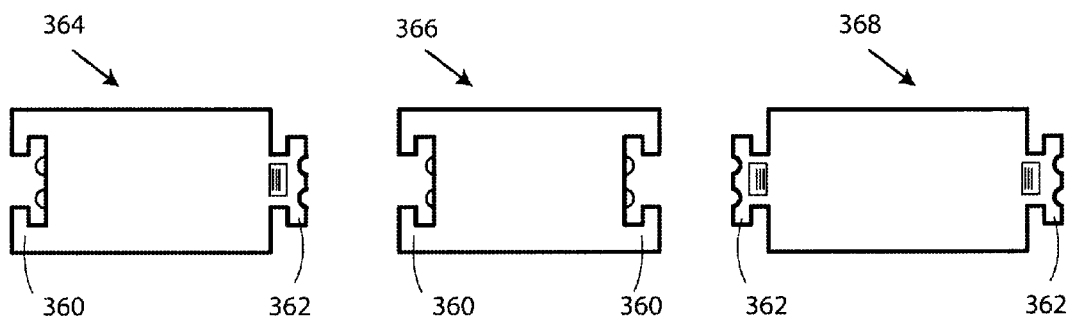
FIG. 3L illustrates several embodiments of male & female connectors.

FIG. 3L illustrates few embodiments of male & female connectors. Similar to the slider connector shown on FIG. 3F, it integrates with one or more sides of the device 100 and connectors 312a, 313b. The device or connector can provide one female 360 while the other side provides one male 362 (as shown on 364), or both sides provide females 360, or both males 362 as illustrated on 366 and 368, respectively. This is advantageous for device 100 to couple with more than one connector, therefore more add-on devices or battery packs are possible with this embodiment in accordance with the present application. In some embodiments, such connectors 360, 362 can be incorporated to one or more sides, not restricted to a mandatory or maximum of two sides.

FIGS. 4A-4D illustrate different embodiments of earphone 400. Shown in a perspective view, the earphones 400 on FIGS. 4A and 4B are very similar, both consisting of an earbud 402 and neck 404 connecting to the base 406a, 406b where FIG. 4A shows a wheel 406a while the base for another embodiment in FIG. 4B is a spherule 406b. Both bases 406a, 406b enable earbud 402 to be retraction with their rotating nature. These retractable earphones are integrated with devices 100 in accordance with embodiments of the present application.

FIG. 4C provides a side view of an earphone 400 similar to that shown in FIG. 4A, yet with a different form factor of the neck 450, with an ear tip 452 for easier use and comfort with an angled or curved form factor in some embodiments. Lengths of the neck 450 may vary while it curves.

To use the wireless headsets 100, the earphone 400 will be sprung out 454 when the release button 456 is pressed. The release button 456 may be an integral part of the flip mechanism similar to many of today's automobile remote controller with flip key mechanism built-in. Earphone 400 can be restored 458 back inside the device 100 simply pushing it toward the device 100.

FIG. 4D illustrates another embodiment of wireless headsets 100 where the entire headset 420 can be detached by twisting the base 428 counter-clockwise. This unique headset design 420 comprises the same components of wireless headset described on diagram 100 in FIG. 1A. When headset 420 is not in use, a user can conveniently store it away by placing it back at the end of the inbuilt-battery circular pendant 430, then twisting the headset 420 clockwise to fasten. While headset 420 is fastened with the battery-integrated pendant 430, internal battery of the headset 420 can be charged through its electrical contacts 426a and 426b coupled, providing headset's battery source is less than 100% full. Similarly, integrated battery of pendant 430 is also charging when it's connected to connector 432 which in turn is connected to the battery-integrated necklace 434 only when both conditions applies: (1) battery source of inbuilt-battery on pendant 430 is less than 100% and (2) inbuilt-battery of necklace is greater than 0%. Otherwise, no charging activity occurs between batteries of pendant 430 and necklace 434. If battery level of pendant 430 is 0% or near zero while headset 420 is coupled with device 430 which coupled to the battery-integrated necklace 434, headset 420 will be charged via battery source of necklace 434.

FIG. 5A-5D details various retractable earphone systems in a cross-sectional view in accordance with embodiment of the present application.

Figure 5A:
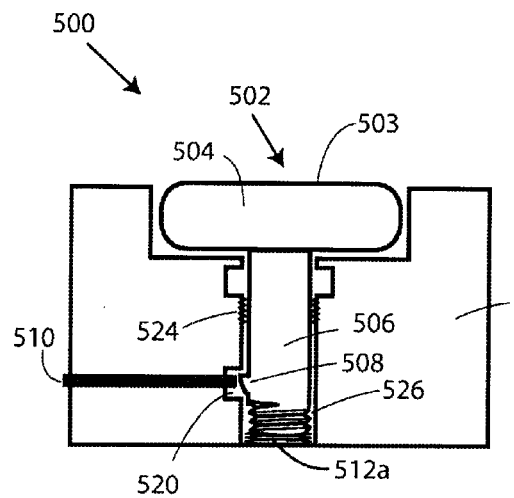
FIG. 5A-5D illustrates various retractable earphone systems in a cross-sectional view in accordance with embodiments.

FIG. 5A shows a retracted earphone 502 housed in the wireless headsets 500 which can be integrated to a fashion pendant, earrings, cufflink, and any other wearable fashion accessory. Earphone 502 contains the speaker portion with transducer 504 and neck 506 where parts or all electronic circuitry and internal rechargeable battery are housed. In some embodiments, the speaker portion with transducer 504 and/or parts or all electronic circuitry, microphone, and internal rechargeable battery are housed in other sections 514 of the wireless headsets 500. The cylindrical neck 506 contains an elastic tap 508 that latches to the lower slot 520 to keep the spring compressed 512*a* and earphone 502 remains retracted.

To use the earphone, a user simply presses the release button 510 to allow earphone 502 to spring out from the wireless headsets 500. Then earphone is pulled slightly outwards and twisted clockwise to fasten earphone 502, where the threads 526 that are convexly integrated around the bottom of the cylindrical neck 506 are interlocked with the outer threads 524 of the concaved wall that uniformly houses the cylindrical neck 504 so earphone 502 is in stable and locked position as shown on the next Figure. The speaker portion 504, includes a faceplate 503 with a pattern of apertures for allowing sound to pass through from transducer to the user's ear, placed into eardrum—users can use wireless headsets 500 for voice communication (hearing and speaking) with connection to mobile telephone 150 or simply enjoy audio content that is transmitting 152 directly from mobile phone 150 to wireless headsets 500 be they a fashion pendant or earrings.

Figure 5B:
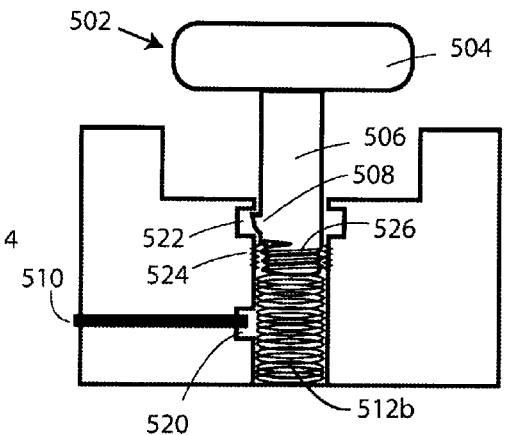

FIG. 5B illustrates an earphone 502 is ejected and in a locked position where spring is reinstated 512*b*. To retract and restore earphone 502 back inside the wireless headset 500, user must twist earphone 502 counterclockwise to unlock threads 526 that are interlocked with the threads 524 of the housing of the earphone 502, then push earphone 502 in until a 'click' sound, whereas the elastic tap 508 is moved from upper slot 522 to lower slot 520 where earphone 502 is now in a locked and retracted state. When earphone 502 is ejected, a large circular orifice that houses the earphone 502 is visible and, with the neck extension, it creates sufficient space for earphone 502 to comfortably fit in one's ear canal with the outer wall of the wireless headsets 500 being in the way.

Figure 5C:
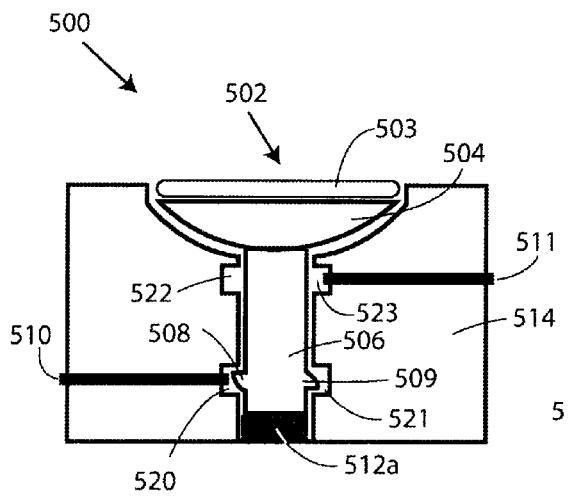
Figure 5D:
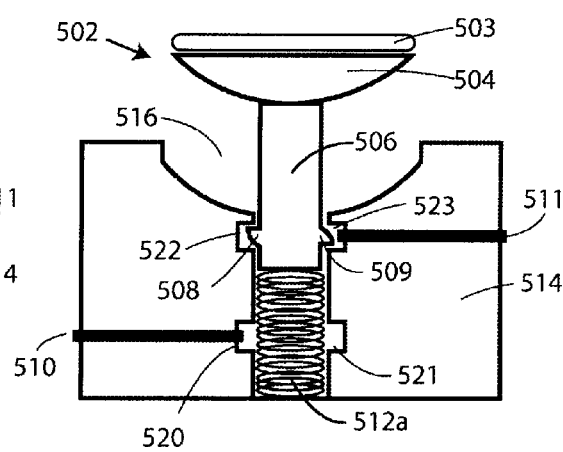

FIGS. 5C and 5D represent slightly different embodiments.

FIG. 5C illustrates an embodiment with speaker portion 504 that includes a faceplate 503 with a pattern of apertures for allowing sound to pass through from transducer to the user's ear. Faceplate 503 is used to direct sound from transducer toward the user's eardrum, regardless of whether earphone is in user's right ear or left ear. Speaker portion 504 is operably coupled to the neck 506 of earphone 502 where neck portion 506 can be cylindrical, squared, or in another shape. This embodiment does not have threads 526 on the earphone neck like the example shown on FIGS. 5A and 5B, but instead the neck 506 consists of a first elastic tap 508 and a second elastic tap 509. The matching lower slot 620 is for locking first tap 508 so earphone 502 can be retracted and in a locked position while storing earphone 502 on a large circular cavity 516 inside the wireless headsets 500. When lower release button 510 is pressed, the compressed spring 512*a* causes the earphone 502 to be ejected.

FIG. 5D shows the earphone 502 in an ejected state with first elastic tap 608 is stopped by upper left slot 522 so earphone 502 is not ejected much further, which may cause earphone 502 to be departed from housing 514 of wireless headsets 500 while second elastic tap 509 secures the neck 506 via upper right slot 523. Earphone 500 is ready for use when it's ejected. To retract the earphone 502, user simply presses the upper release button 511, while simultaneously pushing the earphone 502 in (downwards) until the second elastic tap 509 is latched with lower right slot 521 in time, when the "clicking" sound is present.

A sensor or mechanism may be employed on this embodiment where an incoming phone call is automatically answered when lower release button 510 is pressed or spring is fully reinstated 512*b*, and an active phone call automatically disconnected if upper release button 511 is pressed or spring is fully compressed 512*a* as part of the detection mechanism.

Reduced profile form factor of wireless headsets 500 shown on FIG. 5A-5D may allow integration with jewelry and fashion accessories, where the ability to hide the earphone 502 or wireless headset 500 entirely is beneficial.

It should be understood that the embodiments described here in accordance with the present application are not limited to a specific and any appropriate designs of earphone and engineering of retractable mechanism. Examples shown on FIGS. 5A-5D can be integrated in a round, square or any shaped housing with various thickness, length, and width.

Figure 6A:
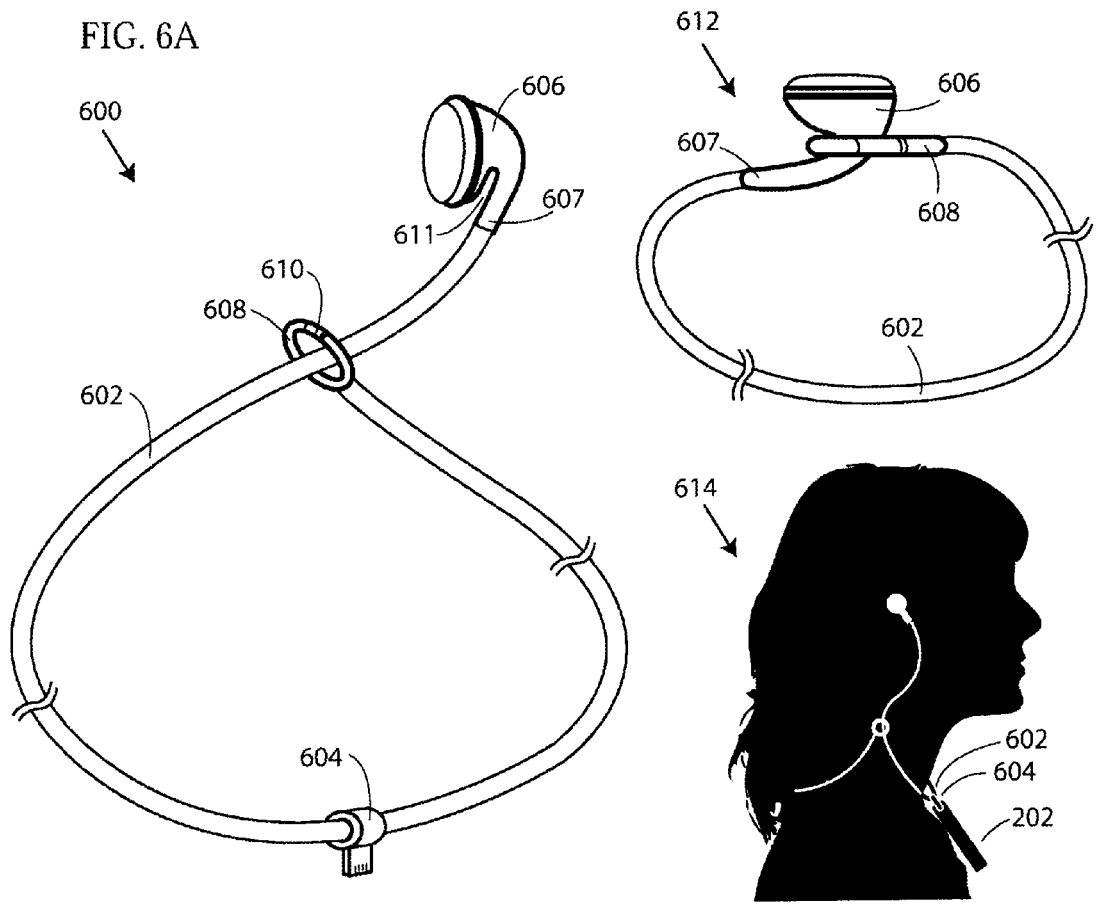
FIG. 6A illustrates a wired earbud-style headphone integrated with a fashioned necklace.

FIG. 6A illustrates a wired earbud-style headphone 600 that is integrated with a fashioned necklace, where necklace 602 comprises a built-in battery and electrical contacts for transmitting power, data, or both when it is connected to the device 202, 100 through the connector 604. In one embodiment, the wired headphones 600 contains one earphone 606 with microphone 607 integrated and, on the other end, it provides a round ring 608 with non-locking gate mechanism 610. In some embodiments, ring 608 may be integrated without non-locking gate mechanism 610. When fashioned headset necklace 600 is hanging on user's neck, it is slightly pulled by the pendant-like device 202, the earphone 606 and ring 608 pull again each other to create an interlocking result of the necklace 600 due to the uniquely tailor-made concave-shaped neck 611 of the earphone 606 as shown on drawing 612.

When connector 604 from the wired headset necklace 600 is attached to the fashion pendant-like device 202, the microphone and speaker that are integrated with the device 100 will be disabled while other functionalities of the device 100 are still operable and device 100 still communicates 152 with the mobile telephone 150 or other computing devices with wireless communications such as Bluetooth.

An example of this embodiment is more apparent with the drawing 614, showing the wired headset 600 is worn by a user with earphone plugged into her right ear and the fashion pendant device 202 attached to the battery-integrated necklace 602 or lanyard via connector 604.

Figure 6B:
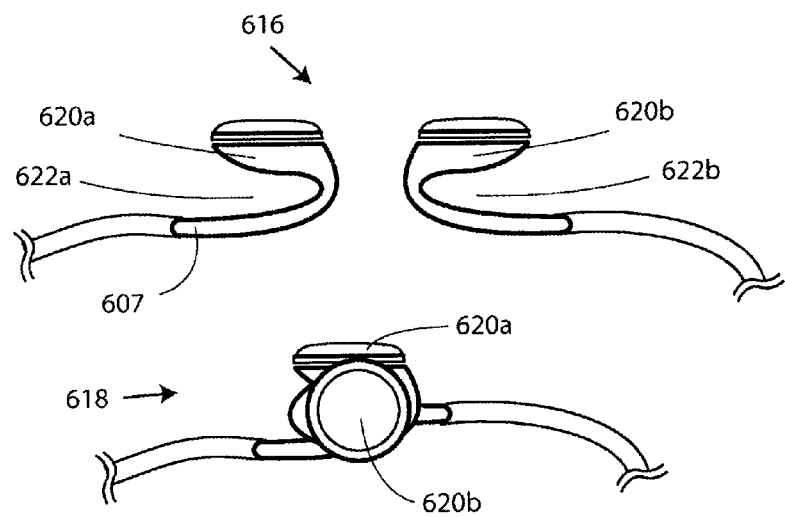
FIG. 6B illustrates another embodiment of the wired earbud-style headphones.

FIG. 6B shows another embodiment of the wired earbud-style headphones, where both left earphone 620*a* and right earphone 620*b* have identical form factors with identical concave-shaped necks 622*a*, 622*b* except one has a microphone 607 integrated to the earphone 620*a* while the other earphone 630*b* does not. Drawing 618 shows the two earphones 620*a*, 620*b* of the wired headphones 616, fastened to each other like Ying & Yang to form a closed loop, inter-locking necklace.

Figure 7A:
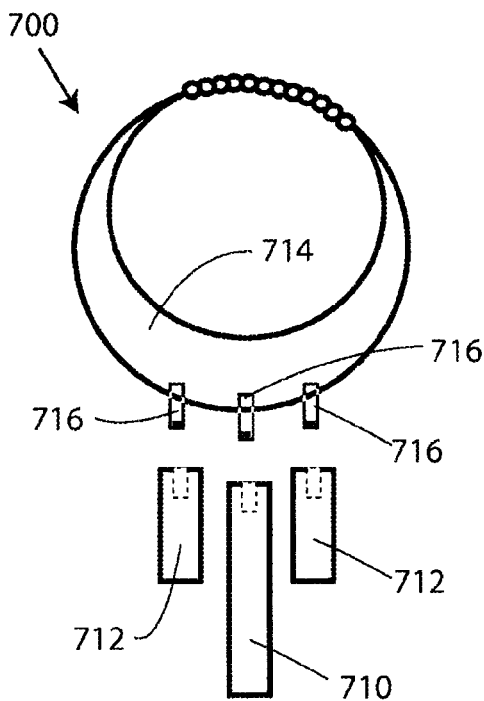
FIGS. 7A and 7B illustrate a digital fashion necklace & pendant system in accordance with two embodiments.
Figure 7B:
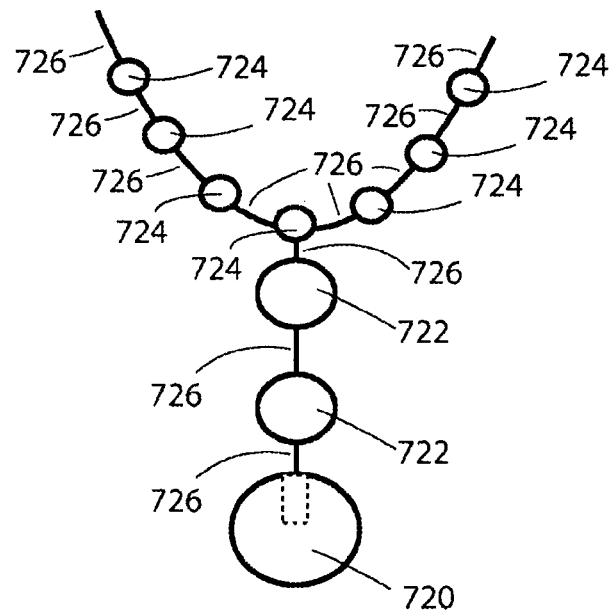

FIGS. 7A and 7B exemplify the digital fashion necklace & pendant system 700 in accordance with two embodiments of the present application. Shown on FIG. 7A, the first embodiment illustrates the device 710 and two additional pendant-like rechargeable batteries 712 that are not attached to the necklet 714. Fashioned necklace or necklet 714 provides built-in internal rechargeable battery and at least one connector 716 for connecting device 710 to necklace, for wearing in concurrent to recharging the device 710 when coupled. In this embodiment, the fashioned necklet 714 comprises three connectors which one is for the device 710 and the other two connectors 716 are for pendants with internal rechargeable battery integrated 712.

FIG. 7B reveals similar system 700 with rounded pendant-like device 720 and rounded battery pack 722 that are connected by chains 726. The other decorative elements 724 may contain built-in internal rechargeable battery for powering and/or recharging the device 720. In some embodiments, device 720 may incorporate retractable earphone mechanism such as the ones shown on FIGS. 5A-5D especially for embodiments that provide thinner profiles of device 720.

Figure 8A:
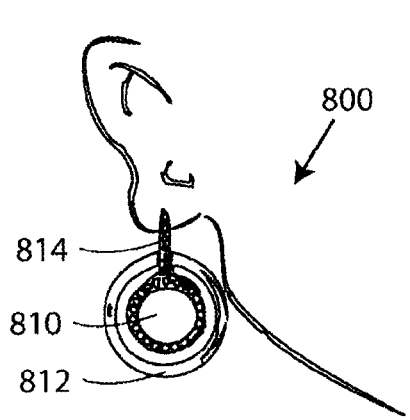
FIGS. 8A and 8B illustrate a system used as earrings in accordance with embodiments of the present application.
Figure 8B:
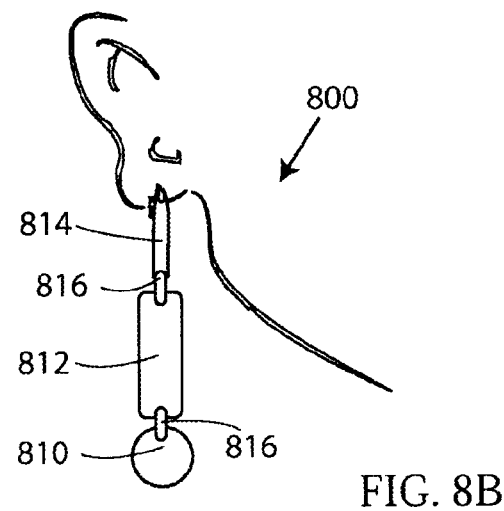

FIGS. 8A and 8B illustrate the system 800 used as earrings in accordance with embodiments of the present application which consist of the earphone 810 with integrated rechargeable battery, and the additional battery 812 connected by a chain 814, where electric current can be transmitted to earphone 810 of the earring system 800. While it's hardwired, chain 814 provides the flexible characteristic so earphone 810 can be moved and/or rotated for earbud to be placed in user's ear canal easily and conveniently when wireless headsets 100 is in use. In another embodiment, earphone 810 is attached to chain 814 through a thin, retractable wire where a battery source can be drawn from internal rechargeable housed on earring element 812 or other ornament elements. This retractable wire allows users to pull and place earphone 810 in the ear canal easily and comfortably to use the wireless headset 100. The Earphone may employ a push-to-retract or pull twice to retract mechanism.

Electronic components and circuitry can be housed with the earphone 810 or battery pack 812 or in both enclosures 810, 812. In another embodiment, a battery may not be integrated with earphone 810, and therefore power must be drawn from battery pack 812 through chain 814. As shown on FIG. 8B, in certain earrings design, a smaller version connector 816 like the device connector 300 shown on FIG. 3A-G may be employed for allowing users to add or remove earring elements if desired while serving as contacts for passing electrical currents and/or transmit electrical/digital signals for voice calls.

It should be understood that the pendants, earrings, necklace, and any jewelry and fashion accessories that are integrated with wireless headsets 100 or wireless terminal devices 100 in accordance with the present application, can be decorated and created with built-materials such as silver, gold, germs, etc. or in combination with plastics or the like and can be in any design and form factor—not limited to the examples shown here.

FIG. 9A-9C show three slightly different embodiments of digital fashion finger ring system 900 having wireless headsets 902 integrated with the ring portion 914.

FIG. 9A shows one embodiment, where the entire wireless headset 902 is housed in a single ornament element with faceplate 904 covers the speaker portion 906 where transducer is located along with other electronic components and rechargeable battery integrated in the lower portion 908 of the earset and neck 910.

The system 900 contains a wireless headset 902 which can be fastened to the ring portion 914 by twisting the headset 902 clockwise. Electrical current are transmitted from the ring portion 914 to charge the internal battery housed in wireless headset 902 through contacts 912a, 912b. Headset 902 can be quickly and easily removed by twisting counter-clockwise direction when there's an incoming phone call or whenever user need want to use the wireless headset 902. The ring portion 914 of the system 900 also include a port for recharging the internal battery that is integrated with the ring portion 914, simultaneously it also recharges the built-in battery of the headset portion 902 when it is coupled with the ring portion 914 when the charging adapter (not shown) is plugged into the ring portion 914 and power outlet (not shown).

In another embodiment, the charging port is not built into the ring 914 but instead the system 900 includes a charging adapter that comprises a male connector and connector receptacle that is comparable to 912a and 912b where 912b can be fastened to the male connector for charging and 912a can be fastened to the connector receptacle for charging. Yet, in another embodiment, wireless charging may be employed.

FIG. 9B is a drawing depicting another embodiment of the ring system 900 in accordance with the present application, where wireless headset 920 can be easily and quickly slide out from the ring portion 922 for use and may further include a release button and latch to secure the headset 920 while it's on the ring portion 922. The electrical contacts on both the headset 920 and ring 922 which not shown here are required mechanisms for transmitting electrical signals. Similar to the embodiment illustrated on FIG. 9A, the ring may comprise a charging port, and a charging adapter is required for charging the batteries integrated with the ring 922 and headset 920.

An internal rechargeable battery is integrated in both the wireless headset 920 and ring 922. When wireless headset 920 is not in use, a user can easily slide the headset 920 back to the ring portion 922 for charging. Wireless headset 920 houses all required electronic components that shown FIG. 1A (with or without a display while some advanced components such as certain sensors may be omitted in some embodiments), along with an integrated retractable earphone similar to the embodiments shown on FIG. 5 facing at the bottom of the headset 920.

FIG. 9C illustrate another embodiment of the digital fashion ring system 900 in accordance with the present application. It also comprises two parts: the wireless headset 930 and ring portion which further consists of the cap 932 and the ring portion 934. Headset 930 can be easily detached for use by twisting it counter-clockwise then pull up to access the gel-like earbud 940. When the headset 930 is detached, the cavity 938 in the cap 932 is visible where it is used for housing the earbud 940. The threads 936b around the cap 932 compliment with the threads 936a (not shown) inside the headset 930 which allows the headset 930 to interlock with the cap 932. In one embodiment, electronic circuitry that makes up the device 100 with internal rechargeable battery can be housed within the headset 930, while another rechargeable battery can be integrated with the cap 932 or ring 934 or both. In some embodiments, this headset 930 may comprises a small display screen on a flat or curved surface.

Figures 10A, 10B:
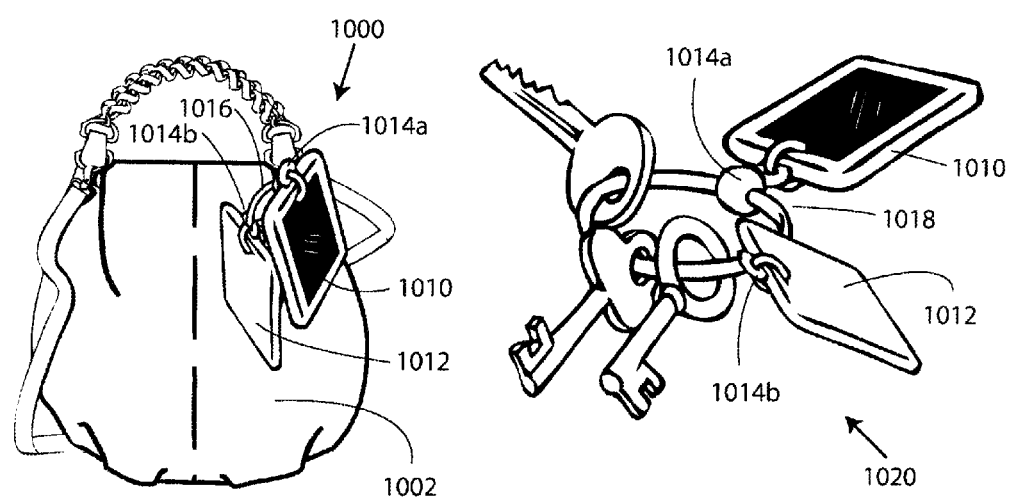
FIG. 10A illustrates a fashion bag decoration charm tag system 1000 in accordance with an embodiment that can be incorporated in a handbag or purse decoration charms.
FIG. 10B illustrates a keychain system in accordance with an embodiment.

FIG. 10A shows the fashion bag decoration charm tag system 1000 in accordance with an embodiment where it can be incorporated in handbag or purse decoration charms. In one embodiment, the device 1010 is connected to an optional battery bar 1012 through connectors 1014a, 1014b that are joined by wired chain or lanyard that straps on the handbag 1016, where electric currents passes from connector 1014b of battery bar 1012 to the connector 1014a of device 1010 in turn charges the internal battery of the device 1010 and/or power the device 1010. A user may use the device 1010 by simply pull it off the connector 1014b and plug device 1010 back to connector 1014b, for recharging or hanging when it's not actively in use.

In some embodiments, additional battery 1012 for powering or charging device 1010 can be integrated inside the handbags 1002 or purses. Advantageously, this integration has the option to offer user with higher volume battery source as well as hiding the physical battery, will provide the flexibility for aesthetical and design purpose.

FIG. 10B exemplifies a keychain system 1020 in accordance with an embodiment. The same device 1010 and optional battery pack 1012 can be used in a keychain 1020 scheme. When device 1010 is attached to connector 1014*a* in conjunction of additional battery pack 1012 which is also attached to second connector 1014*b*, electric currents therefore transmits form optional battery pack 1012 to device 1010 via key ring 1018. Users may use a bigger battery pack or more than one battery pack as long as connectors are present. In some embodiments, Key rings and key chains provide with more than two connectors and device 1010 may be incorporated in various keychain charms, key fobs, etc. where form factors, ornaments, design, size, finishes, etc. may vary—and should not be restricted to only the illustrations presented here.

Figures 11A, 11B, 11C:
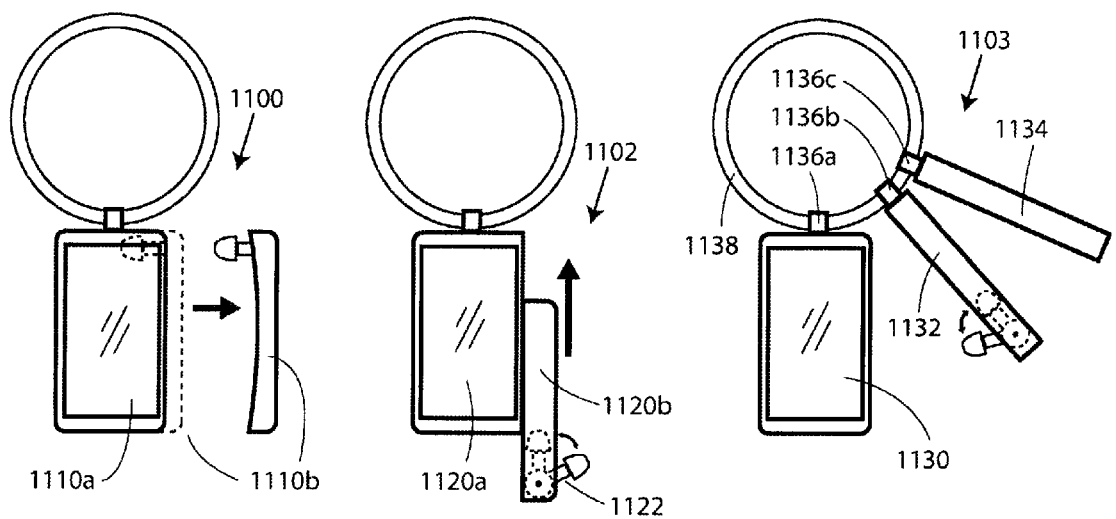
FIGS. 11A-11C illustrates several different embodiments of devices according to the present application.

FIG. 11A-11C exemplify several different embodiments in accordance with the present application.

FIG. 11A shows the wireless headsets 1110*b* is integrated with the device 1110*a* as part of the system 1100 in accordance with the present application where it can be hung and connected on a keychain, handbag decoration chain, necklace or any other fashion accessories. To use wireless headset 1110*b*, user simply and easily pulls the headset 1110*b* out from the device 1110*a*. When the headset 1110*b* is not in use, users may store it away simply by pushing it back to the designated slot mold on the device 1110*a* where wireless headset 1010*b* can be charged by the internal rechargeable battery of device 1110*a* when device 1110*a* and headset 1110*b* are coupled providing electrical contacts on incorporated on both sides. When headset 1010*b* and device 1110*a* are attached as one unit 1100, both headset 1110*b* and device 1110*a* can be charged simultaneously through a power adapter or additional battery pack(s) (not shown here) that are attached via the keychain, bag chain, necklace or other wired fashion accessories.

FIG. 11B shows another embodiment of the system 1102 in a slider mechanism where the wireless headset 1120*b* can be slid out from or slide in to the device 1120*b*. In this configuration, the headset 1120*b* houses a retractable ear set 1122 similar to the embodiment shown on FIGS. 2B and 2C. To use wireless headset 1120*b*, user can pull headset 1120*b* downward until it is separated from device 1120*a*.

On both systems 1100, 1102, an auto-detect mechanism for auto answering and auto disconnecting of phone calls can be employed as previously described in FIGS. 2B and 5C.

FIG. 11C exemplifies another system 1103 in accordance with an embodiment of the present application where the device 1130, wireless headset 1132, and additional (optional) battery pack 1134 are separate units. Battery packs 1134 can be used to charge device 1130 and headset 1132 when they all are coupled through respective connectors 1136*a, b, c* where electricity passes via the special-made key ring 1138. More than one battery pack 1134 can be attached and used so long as it is accommodated with a connector 1136.

To use the device 1130 and/or the headset 1132, a user simply pulls them out from the connectors 1136*a*, 1136*b*, respectively. When finished using device 1130 and/or headset 1132, user simply plug them back to the interchangeable connectors 1136*a, b, c* for storing and recharging.

A User has an option to use the device 1110*a*, 1120*a*, 1130 for information viewing while simultaneously talking on the phone via the complementary headset 1110*b*, 1120*b*, 1132 OR the fashion pendant headset or earring-integrated headsets shown on FIGS. 7 and 8. Wireless headsets 1110*b*, 1120*b*, 1132 may communicate directly with their respective device 1110*a*, 1120*a*, 1130 which in turn transmits 152 data to and from mobile phone 150. Headsets 1110*b*, 1120*b*, 1132 also could communicate 152 directly with mobile phone 150 that is concurrently communicating with device 1110*a*, 1120*a*, 1130 as shown on FIG. 1B.

FIG. 12A illustrates a system of digital fashion bracelet 1200 in accordance with one embodiment of the present application, where a wireless headset 1212 is integrated with the digital bracelet device 1210 which in turn transmits 152 data to and from the mobile telephone 150 or other computing devices wirelessly. While headset 1212 consists a female receptacle connector, bracelet device 1210 has a male connector built-in with an orifice for storing the headset's earbud and its neck that are part of the wireless headset 1212.

To use the headset 1212, user can quickly and easily pull it out away from the bracelet 1210. If this action is taking place during an incoming call waiting to be answered, by pulling the headset 1212 off the bracelet 1210, the incoming call is automatically picked up. When a user is finished with the phone call, the user can plug headset 1212 back to the bracelet 1210 to disconnect or end the call.

When headset 1212 is plugged in the bracelet 1210, headset's internal rechargeable battery is automatically recharged from the internal battery of the bracelet 1210, providing the electrical contacts of both the bracelet 1210 and headset 1212 are coupled.

In some embodiments, the device 100 is integrated with the fashion bracelet 1210 where it provides a touch display 1214 that covers parts of or the entire bracelet's convex surface for a user to interact with for content or functionality access. A segment of the display 1214 may be a flexible OLED while other segment(s) can be e-paper or the entire bracelet could be flexible OLED or e-paper or other display technologies.

In certain embodiments, the digital bracelet device 1210 has one ear set 1212 or a pair of ear sets 1220*a*, 1220*b* integrated with the bracelet 1210 as shown on the next Figure.

FIG. 12B shows one embodiment of pair of wireless headsets 1220*a*, 1220*b* coupling together as they're integrated with devices 100. In addition to fashion bracelet, this arrangement certainly can apply to the digital pendant, keychain tag, and handbag tag as well.

FIG. 12C exemplifies another embodiment of the digital fashion bracelet 1210 in accordance with the present application, where it comprises a display 1214 and all the components described in FIG. 1A but without an integrated headset 1212. Therefore this particular embodiment allows for viewing and accessing content via 152 the mobile phone 150. It may include a microphone and loud speaker phone as described in mentioned diagram 100 while connecting bracelet 1210 or mobile phone 150 with another fashion accessory such as pendant-like headset (like the one shown on FIG. 7), earring headsets (like the one shown on FIG. 8), or third party Bluetooth headset for accessing audio content and/or performing verbal telephone communication.

FIG. 12D shows a similar example of 12A but in bangle form factor—and may or may not have a built-in wireless headset—yet the display could be wrapped a full circumference of the bangle or only portion of it. The display can be OLED, e-paper, or other display technologies or in a combination and bangle can be closed loop or opened loop.

The mentioned embodiments are in accordance with the present application therefore it should be understood that these examples are not limited to only ladies jewelry and fashion accessories. The present application can also benefit men ladies jewelry and fashion accessories as shown on FIG. 13-15.

FIG. 13A illustrates fashion tie clip system 1300 in accordance with an embodiment of the present application. Retractable headset 1312 is integrated with the digital tie clip device 1310 which consists all components of a typical wireless headset (as shown on FIG. 1A) in addition to the clip itself 1314 where it functions as electrical contacts for the device.

When clipping the tie clip 1310 to the fashion tie 1316 that comprises a removable battery integrated 1318. Battery 1318 is thin, flexible, and rechargeable which can be inserted inside the tie with partial or no battery visible even viewing from the back of the tie 1316. In one embodiment, integrated battery provides four contacts 1320a, b, c, d to correspond with the electrical contacts 1322a, b, c, d of the tie 1316. When these contacts are in contact, recharging from tie's integrated battery 1318 to the internal rechargeable battery housed inside tie clip 1310 to power the fashioned tie clip headset 1310 for communication.

In some embodiments, the electrical contacts 1320, 1322 could be more or less than four and could be used to transmit data in addition to power source on the tie clip system 1300. Electrical contacts on the tie's integrated battery are not restricted to four small apertures shown on 1322a, b, c, d, they can be slits that run parallels on the edge of the tie on one or both side as shown on FIG. 13B.

FIG. 13B illustrates another embodiment of a fashion tie 1316 that provides four slits to complement the four electrical contacts of the battery 1318 and the corresponding contacts (four separates contacts in single line) on the tie clip 1310. Advantageously, having longer slits of electrical contracts gives users a greater area to attach the tie clip 1310 onto the fashion tie 1316 and still have electrical contacts, without having to clip the exact place with precision and it can be clipped on either left of right side of the tie 1316 deem to user's preference.

FIG. 13C illustrates the same tie clip 1310 or similar designed accessories can be clipped to a shirt pocket 1330 where it provides a built-in removable battery inside the pocket similar to tie's integrated-battery 1318. This thin, flexible rechargeable battery also provides the equivalent contacts (in terms of number of contacts and positioning) that run from left to right on the top of the end of the shirt pocket. In similar embodiments, wireless headsets can be designed in similar ways where they can be easily & quickly clipped inside a purse or other type of storage or bags for charging when additional power supply is needed.

FIG. 14 exemplifies a fashion cufflink system 1400 in accordance with one embodiment of the present application. Like the battery used for the fashion tie shown on FIG. 13A, the shirt cuff 1402 provides a thin, flexible and yet rechargeable and removable battery 1406 that wraps perfectly around the cuff 1402 from the inside, with two or more electrical contacts 1424b near or through the buttonholes 1404 where battery 1406 is not visible.

In one embodiment, a fashioned digital cufflink headset consists of two parts 1420a, 1420b to form a capsule-like cufflink. First part 1420a of the cufflink contains the electrical contacts 1424a for transmitting power, data, or both when in contact with shirt cuff's battery contacts 1424b around the buttonholes. First part 1420a may houses all electronic components and circuitry for a functional wireless headset 100 along with an optional small display screen on the outer surface 1428 to display minimal information such as caller ID, time, alarm & calendar alerts, etc. It also consists of a male plug 1426a with corresponding electrical contacts to charge second part 1420b of the cufflink when it's plugged into the connector receptacle 1426b. Second part 1420b houses the speaker portion of the cufflink headset 1420b with faceplate 1430 facing outward for transmitting sound to user's ear canal when placed in user's ear, when coupled with the first part 1420a.

In another embodiment, all required components and circuitry for a functional wireless headset 100 are housed in the second part 1420b of the cufflink, therefore it is not necessary for both parts 1420a and 1420b to couple in order for a functional wireless headset.

It should be understood that form factors, design, surface materials & finishes (gems, gold, etc.), color, and ornaments of the cufflink headset can varies for different embodiments, but all must house the components and circuitry of a functional wireless headset 100 with or without a small display screen and internal rechargeable battery on first part 1420a, second part 1420b, or distributed on both parts 1420a, 1420b. It should contain at least one electrical contact 1424a, let it be through the cufflink's shank, chain, bar or other means, thereby to transmitted electric currents from the corresponding contact(s) 1424b of wearable battery 1406 that is integrated on the cuffs of the shirt.

Figure 15A:
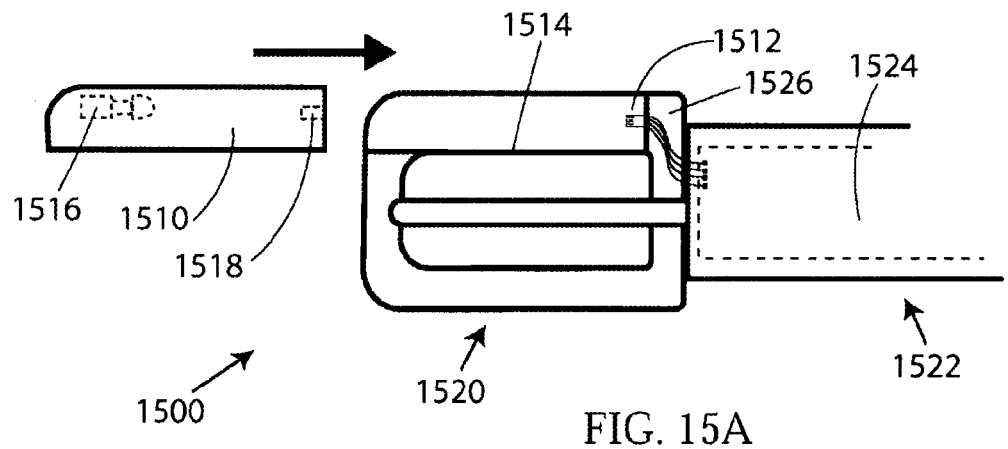
FIGS. 15A and 15B illustrate a digital fashion belt system 1500 in accordance with an embodiment.
Figure 15B:
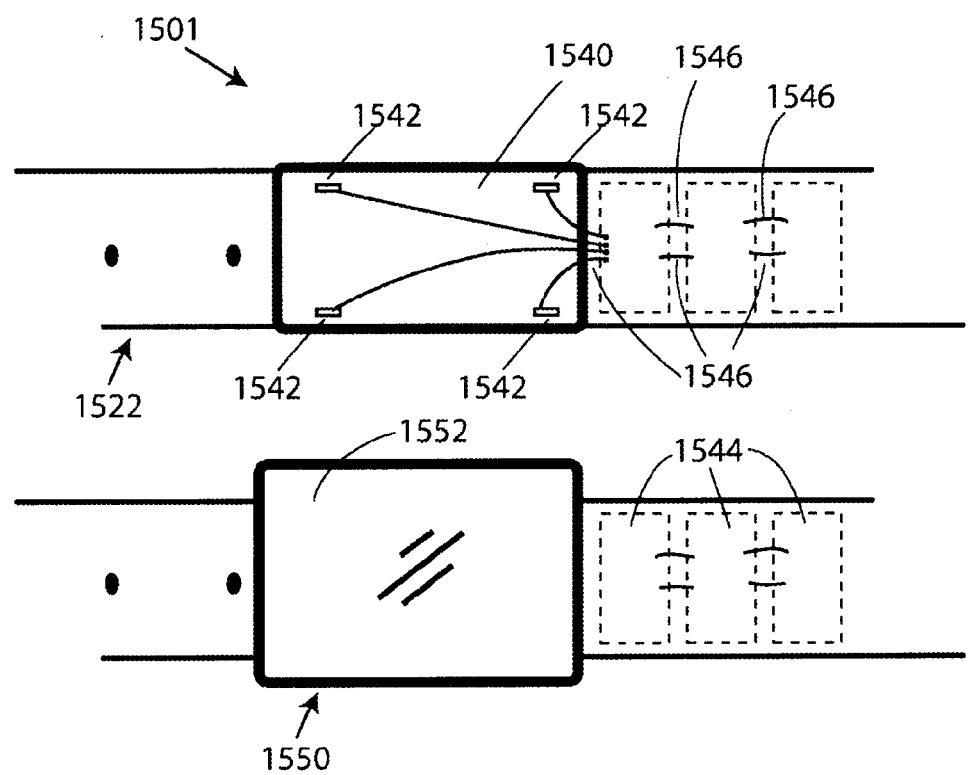

FIGS. 15A and 15B show a digital fashion belt system 1500 in accordance with an embodiment of the present application.

FIG. 15A illustrates an embodiment that consists of a removable wireless headset 1510 with retractable earbud 1516 and belt buckle 1520 where connector 1512 is anchored along with a battery-integrated belt panel 1522. The thin, flexible, rechargeable battery 1524 is integrated inside the belt panel at part or full length of the belt. Wires 1526 run from the battery 1524 at the belt panel end that is secures the belt buckle 1520 to the contacts of the connector 1512 to supply power charging of the wireless headset 1510 when they are coupled by simply sliding headset 1510 along the slider 1514 on the upper part of the belt buckle 1520 until the connector receptacle 1518 interlock with the male connector 1512. To use the wireless headset 1510, users can easily slide it out in the reverse direction.

FIG. 15B shows another fashion belt system 1501 of one embodiment, where the belt buckle is a dock 1540 of the terminal device 1550. It provides flexible fingers 1542 with locking tabs to secure the device 1550. These flexible fingers 1542 also function as electrical contacts for charging the wireless terminal device 1550 when they are snapped into with electronic contacts integrated with finger receptacle orifices (not shown here), on the back of the device 1550 where the front houses a display screen 1552 (e.g., OLED, e-paper, etc.). Belt panel 1522 may house a panel of battery 1524 as shown on FIG. 15A or a slightly different embodiment where smaller battery bars 1544 are integrated and joined by wires 1546, as exemplifies in FIG. 15B, to provide electric currents to connectors 1542 for recharging device 1550 when device 1550 coupled on the dock 1540. Users may use wireless terminal device 1550 for information viewing or media consumption while using a third-party Bluetooth headsets or a separate wireless headset that is integrated with a fashion pendant, ring, tie clip or other fashion accessories.

In addition to flexible finger and orifice mechanism that secure the device 1550 to the belt buckle dock 1540, slider mechanism or other appropriate mechanism for coupling the device 1550 to the belt buckle 1540 can be employed.

In some embodiments, wireless headset 1510 is integrated with wireless terminal device 1550, providing a retractable earbud for voice communication or listening to audio content streamed 152 from mobile telephone 150 or wireless computing devices.

Figure 16A:
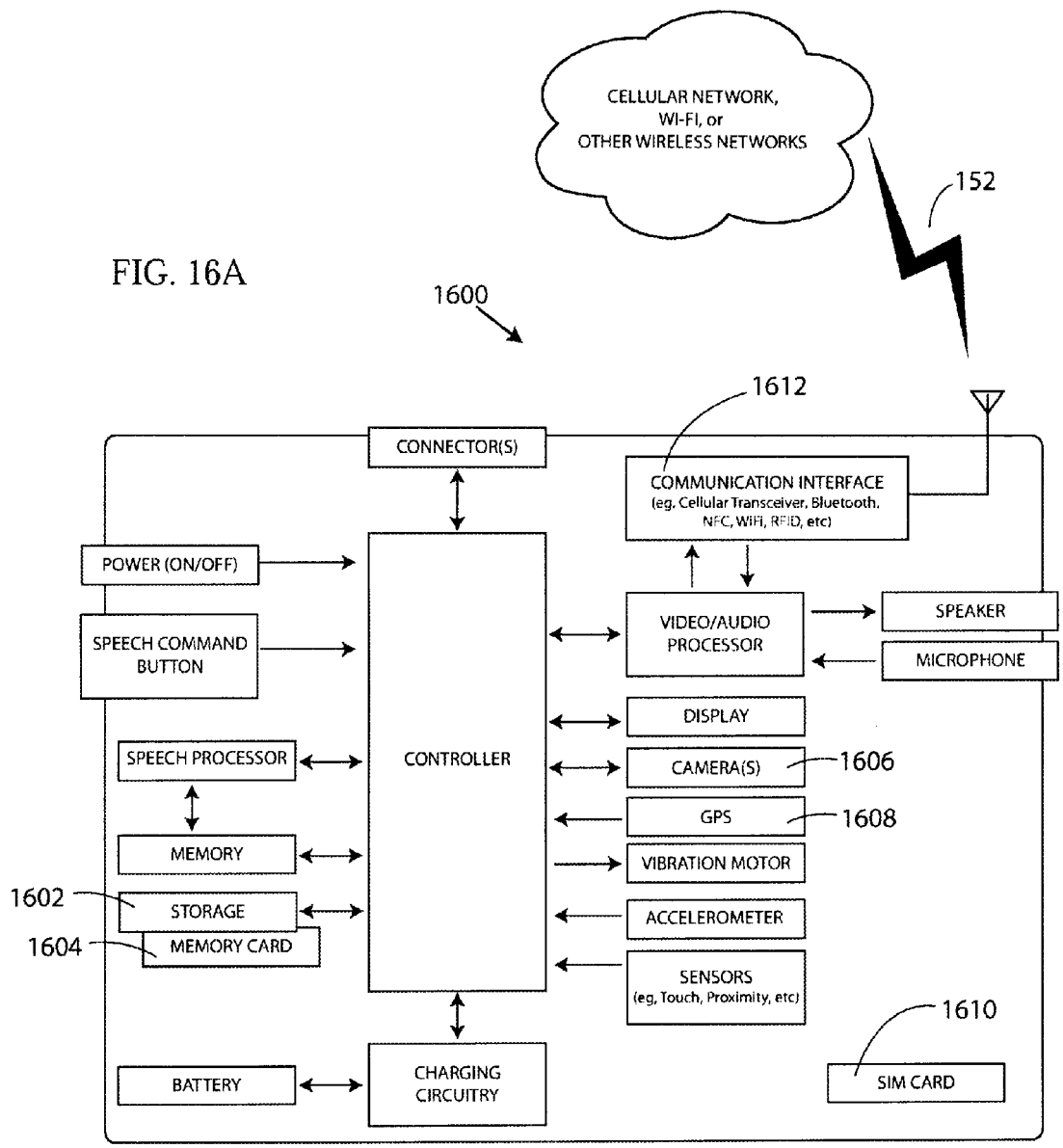
FIG. 16A illustrates a high level block diagram of an enhanced wireless device.

FIG. 16A shows a high level block diagram of an enhanced wireless device 1600. It is an enhanced version of embodiment 100 shown on FIG. 1A. The addition includes storage 1602, slot for optional memory card (e.g., micro SD) 1604, cameras 1606 (e.g., front and back), and GPS chip 1608, slot for SIM card 1610, and cellular chip 1612 for device 1600 to communicate with cellular networks. Hereafter, this device 1600 will be referred to as "Wireless Device."

Figure 16B:
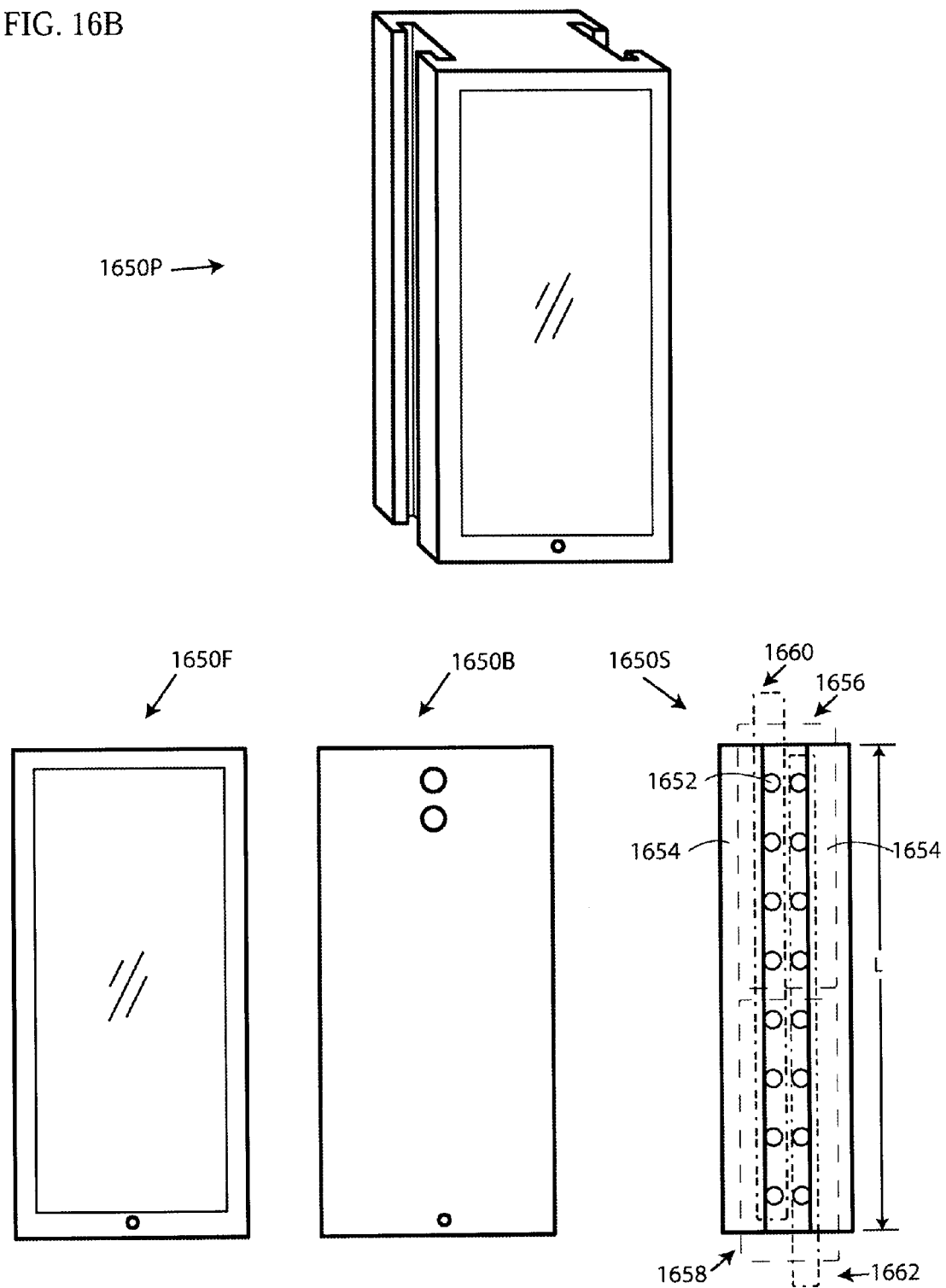
FIG. 16B illustrates various views (perspective, front, back, and side views) the wireless device of FIG. 16A.

FIG. 16B exemplifies the wireless device 1600 in various views, which include the perspective view 1650P, the front view 1650F, back view 1650B, and the side view 1650S. Perspective view 1650P of the wireless device 1600 consists of slider connectors, one on both sides in one embodiment, while the straight side view 1650S shows the ball bearings 1652 with sliders similar to the mechanism shown on FIG. 3F with connectors 312a, 312b but, in addition to width and depth, the length L of the connectors also varies and the sides may incorporate male and female connectors as shown on 364, both female or male connectors are illustrated on 366 and 368, respectively, as shown in FIG. 3L in one embodiment.

In accordance with an embodiment of the present application, the ball bearing connectors as illustrated on the side view 1650S of the wireless device 1600 consists of sixteen ball bearings 1652 as electrical contacts with eight side by side, with the slider bar 1654 (one on each side for female connector 366 as shown on FIG. 3L). For example, each ball bearing contact represents a certain signal.

In this particular embodiment, electrical contacts 1652 may include: Power, Data +/−, Sense, Ground, Video, Audio, and bi-directional bus. The groupings of the eight contacts may be as follows: set of eight on the top (four side by side) 1656, of eight on the bottom (four side by side) 1658, set of eight on left side (eight in a vertical row) 1660, and set of eight on right side (eight in a vertical row) 1662. Advantageously, these groupings allow male connectors to mate in a reversible position (upside down) or two smaller male connectors (one on top while other on bottom).

Figure 17A:
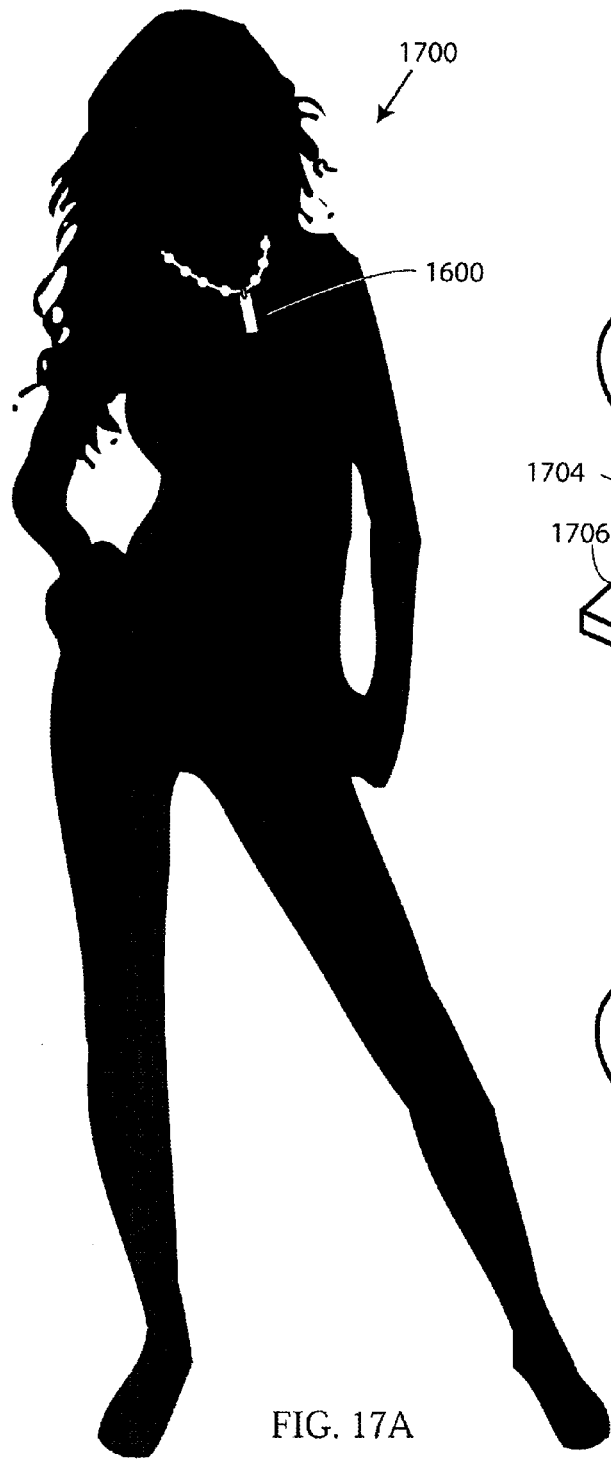
FIG. 17A illustrates the wireless device of FIGS. 16A and 16B worn by a user.
Figure 17B:
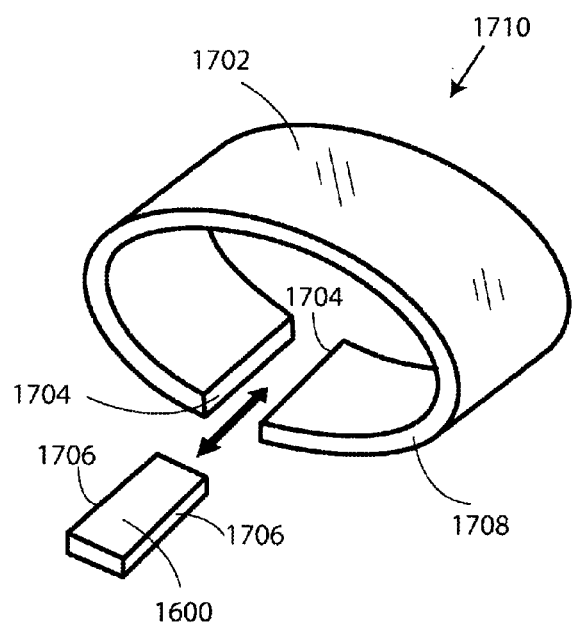
FIG. 17B illustrates a fashioned digital bracelet with a display screen on its surface, in accordance with one embodiment.
Figure 17C:
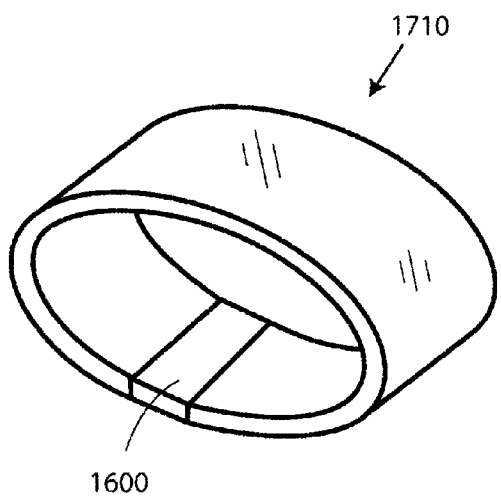
FIG. 17C illustrates the wireless device of FIGS. 16A and 16B incorporated with the fashioned digital bracelet of FIG. 17B.

FIG. 17A illustrates the wireless device 1600 that was worn by user 1700 while FIG. 17B exemplifies a fashioned digital bracelet 1710 with a display screen 1702 on the convex of its surface, in accordance with one embodiment of the present application, while the thickness, length and width may vary from one embodiment & design to another. This bracelet 1710 houses one or more internal rechargeable batteries and all required circuitry and firmware with or without integrated removable wireless headsets 1212 such as those shown FIGS. 12A and 12B. Wireless headset with or without retractable earbud(s) can be housed in any segment of the body 1708 of the fashioned bracelet 1710. On both ends 1704 of the bracelet 1710 comprise slider connector receptacles where the mating connectors 1706, on the sides of the wireless device 1600 can easily slide in and electrical contacts can be mated. Display 1702 can be OLED, LCD, flexible e-paper, or in combination and display 1702 can be a segment, multiple segments, or full length of the bracelet 1710. FIG. 17C illustrates when the wireless device 1600 is incorporated with the fashioned digital bracelet 1710.

Figure 17D:
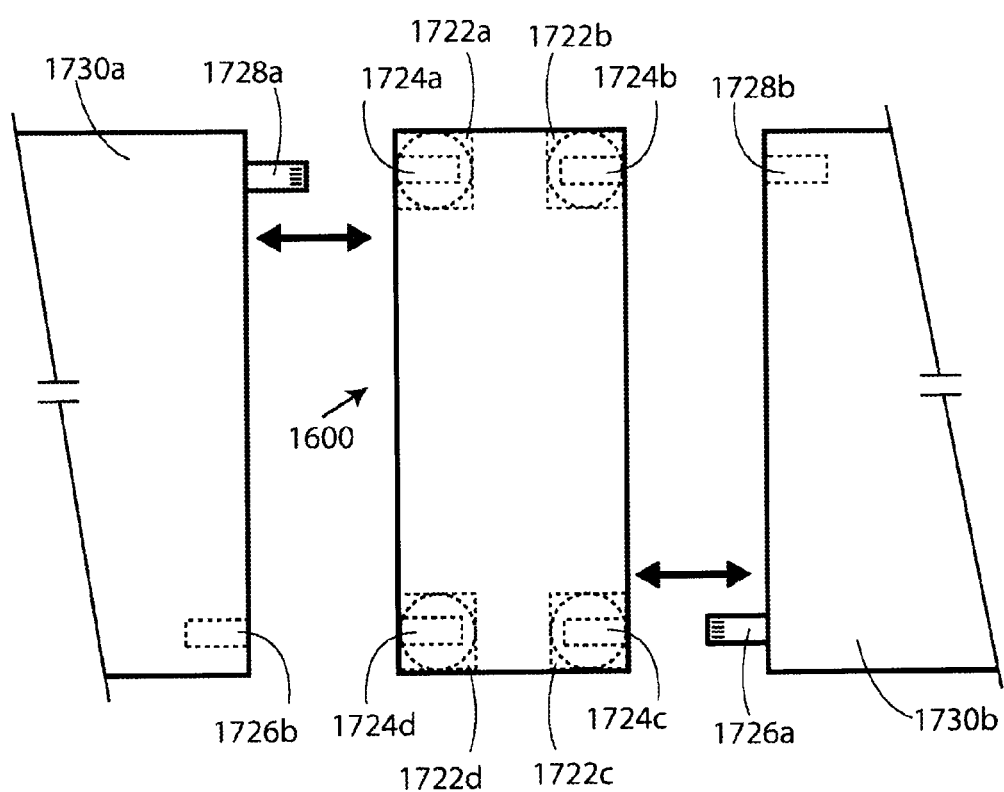
FIG. 17D illustrates the wireless device of FIGS. 16A and 16B with adaptive connectors such as those with mechanism shown on FIG. 3K and incorporated with the digital bracelet of FIG. 17B.

FIG. 17D shows the wireless device 1600 with adaptive connectors such as those with mechanism shown on FIG. 3K can be incorporated with the digital bracelet 1710 and other digital fashion accessories & jewelry. In this embodiment, the device 1600 consists of four rotatable connectors 1722a, b, c, and d, with one on each corner. One end 1730a of the bracelet 1710 comprises a male connector 1728a and one port 1726b while the other end 1730b of the same bracelet 1710 includes one port 1728b and male connector 1726a. When bracelet 1710 is not coupled with the wireless device 1600, the male connector 1728a of the bracelet 1710 can be inserted to the port 1728b while the other connector 1726a inserted to port 1726b for coupling both ends to fasten the bracelet 1710. The wireless device 1600 can be coupled with the digital bracelet 1710 by inserting the male connector 1728a from the bracelet 1710 into the connector receptacle 1724a integrated in the device and inserting the other connector 1726a to the other connector receptacle 1724c of the device. Therefore built-in battery of the digital bracelet 1710 can be used to power and/or charge the wireless device 1600. At the same time, a user can use the digital bracelet 1710 like a mobile phone taking user's input via bracelet's integrated and curved multi-touch display 1702. In another embodiment, the connectors 1728a, 1726a integrated with the bracelet 1710 and the four rotatable connectors 1722a, b, c, d integrated with the wireless device 1600 can be arranged differently. Also, it is not restricted to two male connectors 1728a, 1726a and four rotatable connectors 1722a, b, c, d. The number of connectors and connector receptacles can be varied.

FIG. 18A exemplifies various ways the unique wireless device 1600 can be used with companion devices 1810, 1820, 1830, 1840 in accordance with an embodiment of the present application. Like the digital fashioned bracelet shown on FIGS. 17B and 17C, all of these companion devices 1810, 1820, 1830, 1840 consists of a display (e.g., OLED) and internal rechargeable battery with the necessary circuitry and firmware a long with slider connector receptacles on the sides such as those shown on FIG. 3L.

In one configuration, the connectors (on both sides) of the wireless device 1600 are both female 360 such as example 366 shown on FIG. 3L while companion device 1810, 1820, 1830, 1840 may contain one or more connectors (a male 362 or female 360).

When wireless device 1600 coupled with a phone companion device 1810, tablet companion device 1820, another tablet companion device 1830, or desktop flat panel monitor 1840, wireless device 1600 may use its own internal battery for powering or drawing battery from companion devices 1810, 1820, 1830, 1840 or drawing battery from companion devices only when battery source of wireless device 1600 is below certain capacity (e.g., battery source is less than 20%).

1840 can also be a flat panel television. An adapter (not shown) can be used for connecting wireless device 1600 to existing third-party TVs and desktop monitors that do not already have an appropriate connector integrated.

It should be understood that the connector and connector receptacle can be in a different form. For instance, connectors for wireless device 1600 and companion devices can be such shown on FIG. 3A to 3K, not restricting just the slider connector shown on FIG. 3L.

In some embodiments, users can define or predefine when and how battery should be charging and/or powering a wireless device 1600 and companion devices 1810, 1820, 1830, and 1840. Companion devices 1810, 1820, 1830, 1840 may also consists an integrated wireless headsets 1220a & b as shown on FIG. 12B.

It should be understood that, in addition to fashioned digital bracelet 1710 shown on FIGS. 17B and 17C as well as companion devices 1810, 1820, 1830, 1840 shown herein, wireless device 1600 can also be incorporated with fashioned pendants, key chain tags, bag decoration tags, belt system, etc. Furthermore, wireless device 1600 are not restricted to be coupled with companion devices 1810, 1820, 1830, 1840 on the left corner such as shown on FIG. 18A—it can be coupled on anywhere of the device (e.g., middle, front, back, horizontal, etc.).

Figure 18B:
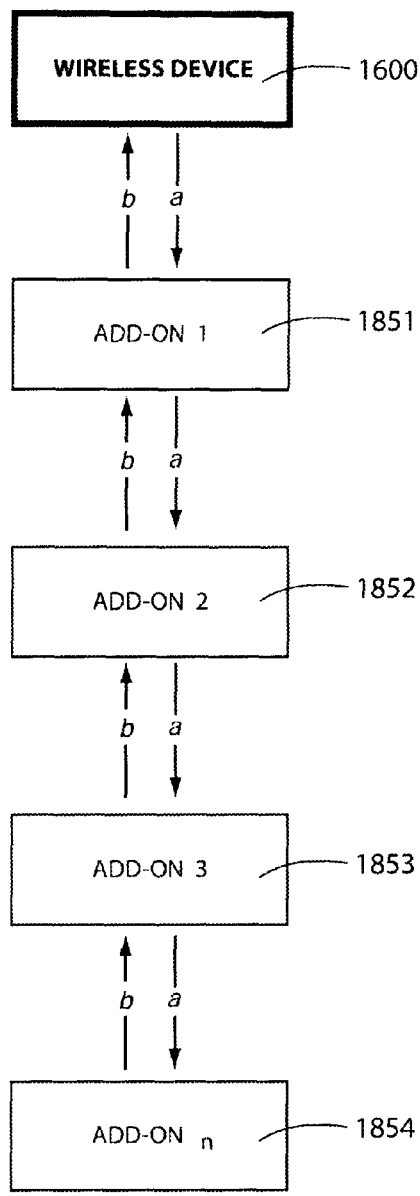
FIGS. 18B and 18C illustrate electrical signals and currents of the wireless device of FIGS. 16A and 16B and add-on peripherals.
Figure 18C:
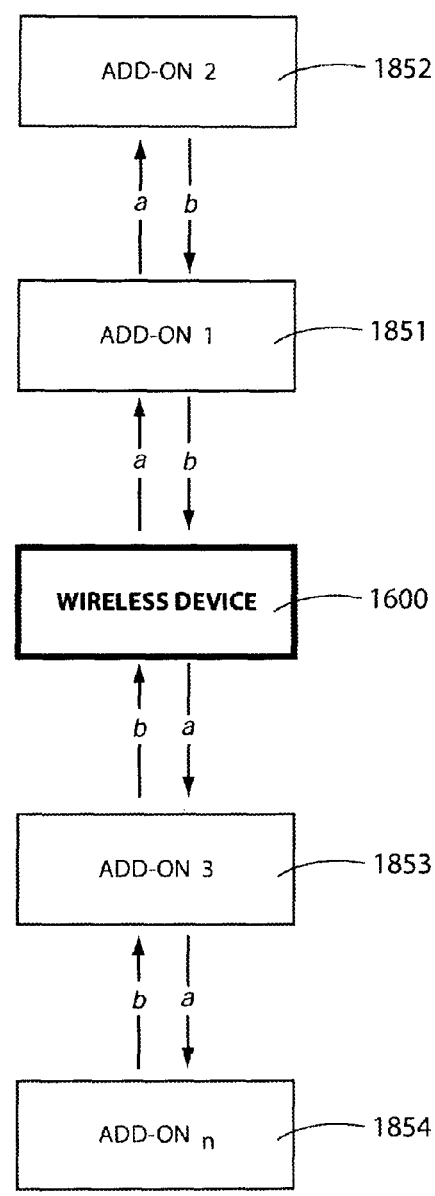

FIGS. 18B and 18C reveal electrical signals and currents of wireless device 1600 and add-on peripherals 1851, 1852, 1853, and 1854 where add-ons can be companion devices 1810, 1820, 1830, and 1840 as well. In accordance with the present application, wireless device 1600 and companion devices 1810, 1820, 1830, 1840 can be coupled, via a connector receptacle, with one or more add-on peripherals 1851, 1852, 1853, 1854 such as: additional battery unit, keyboards unit, wired or wireless headset unit, external speakers unit, external storage, special camera unit, flash light unit, scanner unit, printer unit, non-functional ornament unit, etc.

Electrical signals can be transmitted directly to and from any of the add-on units 1851, 1852, 1853, 1854 to the wireless device 1600 or transmitted to wireless device 1600 through one or more add-on units. For example, in one configuration in FIG. 18B, a wireless device 1600 is coupled with an external keyboard (add-on #1 1851) where add-on #1 1851 is coupled with a battery pack (add-on #2 1852) where add-on #2 1852 is coupled with an external special camera (add-on #3 1853) where add-on #3 1853 is coupled with a phone companion (add-on #n 1854) whereas battery pack 1852 still can charge and/or power the wireless device 1600 through the non-battery-operable keyboard unit 1851. In this same configuration, external camera 1853 draws power from the battery pack 1852 while phone companion 1854 uses its own battery source until it reaches below 10% before it taps into the battery pack 1852 for power while battery pack 1852 is charging wireless device 1600. If wireless device 1600 has 90% battery capacity, it can still draw power from the battery pack 1852 but not for charging, while phone companion 1854 can be charged by the same battery pack 1852 should its battery capacity become less than 10%.

In another configuration shown on FIG. 18C, wireless device 1600 is coupled with external storage (add-on #1 1851), where add-on #1 1851 coupled with battery pack (add-on #2 1852), where second connector of the wireless device 100 is coupled with another battery pack (add-on #3 1853,) where add-on #3 1853 is coupled with a tablet companion (add-on #n 1854).

Wireless device 1600 should be considered as a primary device for battery charging priority and it should be prioritized over any of the add-on peripherals 1851, 1852, 1853, 1854, unless wireless device 1600 has 90% or greater battery source capacity and battery source of add-on peripherals 1851, 1852, 1853, 1854 is 10% or less. In the same configuration, add-on peripherals for phone companion and tablet companion have the next priority (second priority) for battery charging over other add-on peripherals like camera, scanner, printer, non-functional ornament units, etc. For add-on peripherals (such as desktop monitor companion or TV companion) with plug-in power source, wireless devices and other coupled add-on peripherals (battery pack, wireless headsets, etc.) will automatically be charged and powered through the add-on peripheral with plug-in power source. Battery charging flow is described on FIG. 21B.

FIG. 19A-C illustrates a charging system in accordance with one embodiment of the present application. FIG. 19A shows an example of a charger 1900 with the main body 1906 with attached power cord 1908 or cable with a Universal Serial Bus (USB) plug for charging through USB ports. Main body 1906 houses charging circuitry and at least one male connector 1904 and one female port 1902 for charging wireless headsets 100, wireless terminal device 100, wireless device 1600, add-on peripherals, and any fashioned digital accessories with a female connector receptacle and male connector, respectively. In some embodiments, charger 1900 may comprise multiple male 1904 connectors and female ports 1902 for charging.

It should be understood that rechargeable batteries (described herein) integrated with the device 100, 1600, external battery pack, and other fashioned digital accessories are capable of bi-directional charging.

FIG. 19B exemplifies the electricity flow of the charging system in accordance with one embodiment of the present application. For example, device 1920 is plugged to the male connector 1904 of the charger 1906 for charging. Concurrently, the charger 1906 also charges multiple units via connector 1912 that is plugged in the female port 902 of the charger 1900. Electricity currents travels to the charging systems of the device 1922, wireless headset 1924, and external battery pack 1926 via the key ring 1910 by ways of respective connectors 1914, 1916, 1918.

FIG. 19C exemplifies another charging system using an external battery pack 1926 that is also an accessory attaching to the key ring 1910. Electric currents travels from battery 1926 to key ring 1910 via connector 1918 in turn charges device 1922 through connector 1914 and concurrently charges the headset 1924 through connector 1916.

Information of battery level of battery pack 1926, wireless headset 1924, and any other fashioned digital accessories that are attached to the device 1922 via the key ring 1910 will be sent to device 1922 for analysis and decision tree of how and the priority of digital accessories be charged. For instance, if battery level of wireless headset 1924 is greater than certain level (e.g., 90%) while battery level of device 1922 is less than certain level (e.g., 10%), battery pack 1926 will automatically dedicated to charge the device 1922 without charging the headset 1944 OR vice versa UNLESS otherwise assigned by user's preference.

FIG. 20A exemplifies various shapes of internal battery. For example, battery can be square 2002, rectangular 2004, oval 2006, circular 2008 or any other shape that may be apparent to a person of ordinary skill. It should be understood that batteries, in accordance with the present application, should not be limited to only these shapes—they can be any size and profiles deemed to fit the design of a particular fashion accessory or jewelry.

Internal rechargeable batteries can also be used in combination of shape and size. In one example, the necklet 2010, shown on FIG. 20B, houses one large battery 2012 with several smaller battery pack 2014 where they are connected via hardwires. In another embodiment, the necklet 2010 may house multiple batteries with identical size and shape and evenly distributed inside the necklet 2010. Still another embodiment, the internal battery can be shaped like the necklet 2010.

FIG. 20C shows necklace 2020 designed with a string of gems. The oval gems also house a rechargeable battery in the same oval shape proportionally. In this particular embodiment, there are two larger oval batteries 2022, numerous smaller oval batteries 2024 with a number of small circular batteries 2026 where they are all connected through wires 2028 that are wrapped with silver or the link. In another embodiment, the oval gems house rectangular-sized batteries that fit within the oval gems while the smaller circular 2026 may be omitted. Shapes, sizes, and profiles of gems can be varied and ornaments and design are not limited to gems—they can be silver, gold, or any other jewelry materials or in combination.

FIG. 20D shows a cross-sectional view of a necklace 2040 where a series of small round batteries 2044 are integrated. In one example, a series of circular rechargeable batteries 2044 are stringed by wires 2046, as shown on enlarged view 2042b of a small section 2042a of the necklace 2040, where negative is connected to positive of each battery. These rechargeable batteries can be shaped like a cell battery, stick, square, etc. Also it should be understood that these methods and systems to incorporate batteries into various fashion accessories and jewelry in accordance with the above described embodiments is not limited to only necklaces or necklets—they can apply to other fashion accessories and jewelry such as rings, belts, earrings, pendants, bracelets, handbags, tags, etc.

Figure 21A:
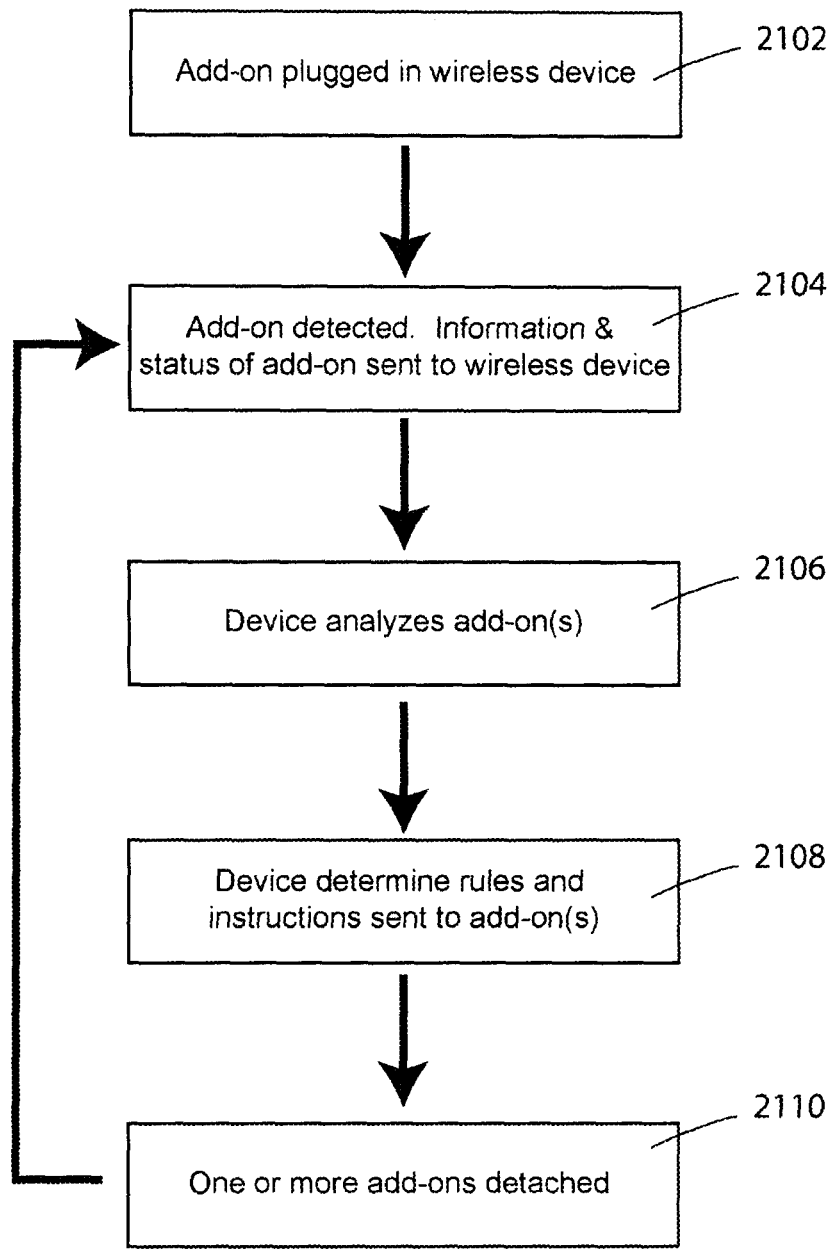
FIG. 21A illustrates a flow diagram of device and add-on behaviors when they are coupled.

FIG. 21A shows a flow diagram of device and add-on behaviors when they are coupled. For instance, when an add-on (e.g., companion device, external battery pack, etc.) is coupled with the device 2102, add-on is automatically detected and information of add-on will be collected and sent to device 2104, then device analyzes the information & status of each add-on 2106 before determine rules and sending these set of rules to add-on 2108. At any time, if additional add-on is plugged in, this step 2102 restarts. At any time should one or more add-ons are detached 2110, information & status of add-ons will be re-gathered and resend as shown, hence, the process jumps back to step 2104.

Figure 21B:
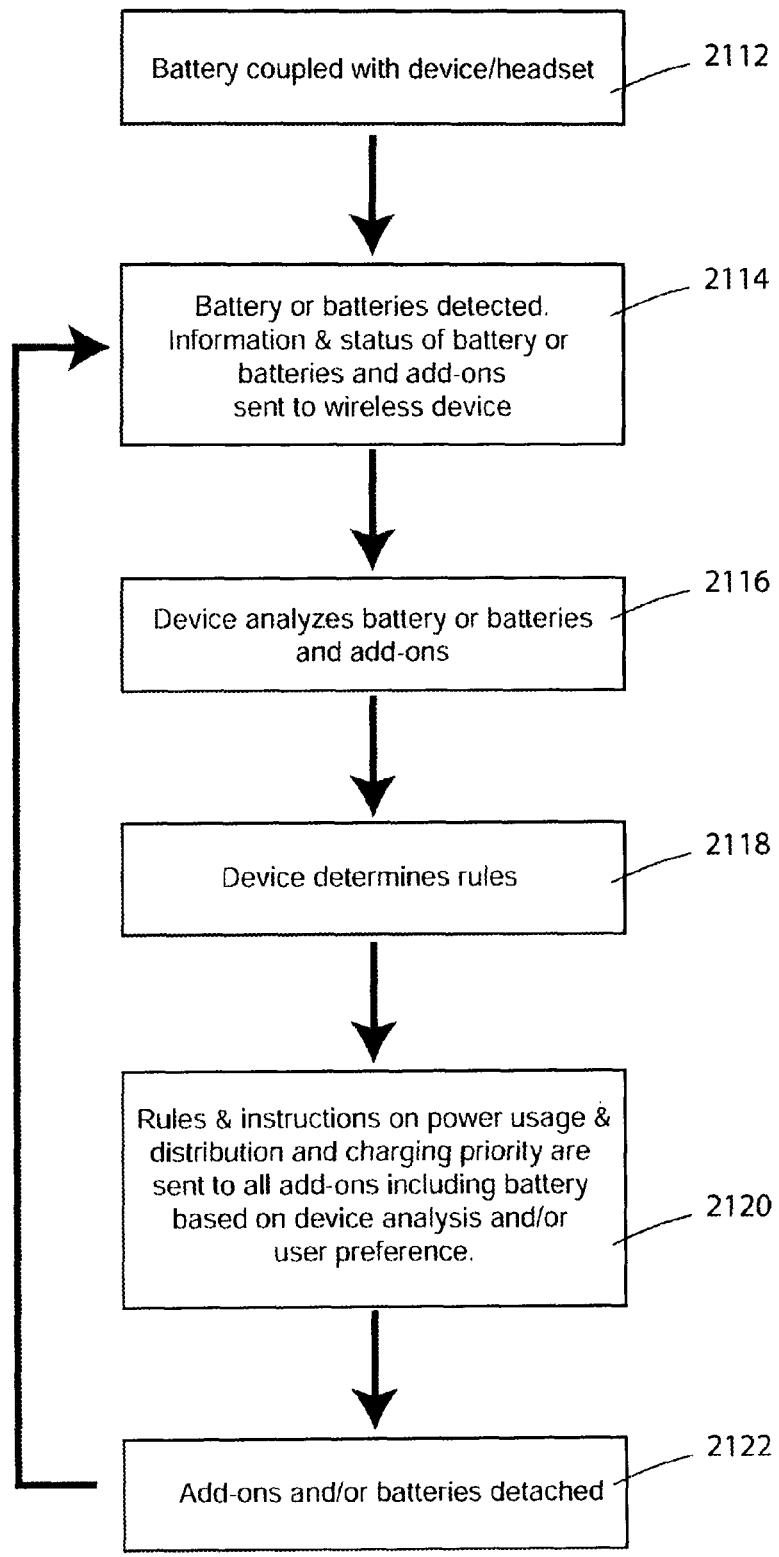
FIG. 21B illustrates a flow chart of powering & charging systems.

FIG. 21B shows a flow chart of powering & charging system. When a battery is attached to the device or headset or via any means 2112, battery or batteries as well as add-ons are automatically detected then information will be gathered and sent to device 2114, then device analyzes attached battery or batteries as well as any attached add-ons 2116 before setting rules 2118. After rules are determined, rules and instructions, on how power consumption and distribution should be as well as charging priority given data of battery at present stage and/or user preference, are sent to add-ons 2120. If at any time should a battery or any add-on is detached 2122, step 2114 will be restarted.

FIG. 22 shows the user interface system in accordance with the present application. Regardless if it's a wireless headset 100, wireless terminal 100, or wireless devices 1600, the user interface mapping applies to them—be it a fashion pendant, bracelet, or bag/keychain tag and with or without display. Below is an example system for controlling the device 100, 1600. Of course other systems may be developed by a person of ordinary skill with similar concepts discussed below while remaining within the scope of the present application.

The segments (A, B, C) and the corresponding touch positions (LF, RF, LS, and RS) also apply and relevant for digital bracelet 1600 when and after users centered the display. To center display on bracelet, use thumb to press the screen surface with index finger touching the back of the bracelet (the surface behind the display) on any segment of the bracelet. On all embodiments, the segregation of the three segments (A, B, C) could be dots or lines on both sides for tactile convenience.

Controlling Mobile Telephone/Device when Incoming Call is Waiting to be Answered:
  To pick up the incoming call: Squeeze LS1 and RS1 simultaneously for 2 seconds.
  To send to voice mail: Squeeze LS2 and RS2 simultaneously for 2 seconds.
  To silent ringer and/or disable vibration: Squeeze LS3 and RS3 simultaneously for 2 seconds OR shake headset/device back and forth several times.

Controlling Mobile Telephone/Device when Voice Call is Active:
  To increase voice volume: Lightly squeeze both LS1 and RS1 and stroke fingers downward motion toward to LS3 and RS3, respectively.
  To lower voice volume, lightly squeeze both LS3 and RS3 and stroke fingers upward motion toward to LS1 and RS3, respectively.
  To end the active phone call: Squeeze LS1 and RS1 simultaneously for 2 seconds.
  To mute the active phone call (where other party CANNOT hear you):
    Place one finger on LS1 while the other on RS3 then stroke the one that is placed on LS1 downward to LS3 concurrently stroke the finger that is placed on RS3 upward toward RS1.
  To un-mute the active phone calls (where other party CAN hear you):
    REVERSE THE PROCESS. Place one finger on LS3 while the other on RS1 then stroke the one that is placed on LS3 upward to LS1 concurrently stroke the finger that is placed on RS1 upward toward RS3.

Controlling Mobile Telephone/Device when Media (Audio/Video) is Playing:
  To stop/pause media playing: Double-tap LS1 and RS1 simultaneously.
  To skip back one track (REWIND): Double-tap LS2 & RS2 simultaneously.
  To skip one track forward (NEXT): Double-tap LS3 & RS3 simultaneously.

When Headset/Device is on Standby Mode:
  To activate voice command: Squeeze LS2 & RS2 simultaneously for 2 seconds—and hold while speaking the command toward microphone then release both fingers from LS2 & RS2.
  To response to a voice command: Squeeze and hold LS2 & RS2 simultaneously—and speak immediately.
  To access menu: Squeeze LS3 and RS3 simultaneously for 2 seconds Navigating/Viewing Content on Screen Display:
  To go back one page: Tap LS1 once OR flick LF2 upward toward LF1 (or flick RF2 upward toward RF1)
  To skip forward one page: Tap RS1 once OR flick LF2 downward toward LF3 (or flick RF2 downward toward RF3)
  To select the highlighted item on screen: Double-tap LS2 & RS2 simultaneously.
  To scroll page down: Squeeze LS1 & RS1 together and stroke downward motion toward LS3 & RS3 simultaneously.
  To scroll page up: Squeeze LS3 & RS3 together and stroke upward motion toward LS1 & RS1 simultaneously.
  To zoom in: Place one finger on LS1 while the other on RS3 then stroke the one that is placed on LS1 downward to LS3 concurrently stroke the finger that is placed on RS3 upward toward RS1. OR place side of index finger on RS2 (or LS2) with thumb smudges upward from RF2 (or LF2) to RF1 (or LF1).
  To zoom out: REVERSE THE PROCESS. Place one finger on LS3 while the other on RS1 then stroke the one that is placed on LS3 upward to LS1 concurrently stroke the finger that is placed on RS1 UPWARD toward RS3. OR place side of index finger on RS2 (or LS2) with thumb smudges DOWNWARD from RF2 (or LF2) to RF1 (or LF1).

With Content/Programs Active on Screen:
  To enter screensaver at any time: Drop wireless terminal from chest height down below waist OR shake device fast randomly several times.
  To entering menu/computing mode while on screensaver mode: Squeeze LS3 and RS3 simultaneously for 2 seconds.

Specific to Circular Bracelet with Closed-Loop
  To enter screensaver at any time: Drop wireless device down below waist OR shake device fast randomly several times.
  To center viewing area (section A to C, A and B, B and C, or B only) of the display screen on bracelet (any segment): Thumb presses the screen surface with index finger touching the back of the bracelet (the surface behind the display) on any segment of the bracelet.

To increase volume, place index finger on the back of bracelet (the surface behind the display) while thumb smear from RF2 (or LF2) UP towards RF1 (LF1)

To lower volume, place index finger on the back of bracelet (the surface behind the display) while thumb smear from RF2 (or LF2) DOWN towards RF3 (LF3).

To answer an incoming phone call: Squeeze both sides simultaneously (on the edge) of the bracelet (any segment) for 2 seconds OR pull out wireless earphone (if available on the embodiment).

To silent ringer and/or disable vibration while an incoming call has not been answered: Shake bracelet several times.

To end an active phone call: Squeeze both sides simultaneously (on the edge) of the bracelet (any segment) for 2 seconds OR insert wireless earphone back to integrated port (if available on the embodiment).

To mute the active phone call (where the other party CANNOT hear you):

Place thumb on one side of the bracelet (edge) with index finger on the other side of the bracelet then stroke one finger downward while the other finger stroke upward simultaneously.

To unmute the active phone call (where other party CAN hear you): REVERSE THE 'MUTE' PROCESS.

To active voice command: double tap on both sides (any segment) of the bracelet and squeeze for 2 seconds—and hold while speaking the command toward the microphone (or wireless earphone). Release fingers, when done speaking, for device to compute and response.

To response to a voice command: Within 2-3 seconds, squeeze and hold both sides (any segment) of the bracelet simultaneously and speak immediately. Release squeeze when done speaking and wait for device to compute and response.

To access menu: Triple tap both side of the bracelet (any segment) To zoom in while viewing content on display: Place one finger on LS1 while the other on RS3 then stroke the one that is placed on LS1 downward to LS3 concurrently stroke the finger that is placed on RS3 upward toward RS1. OR place side of index finger on RS2 (or LS2) with thumb smudges upward from RF2 (or LF2) to RF1 (or LF1).

To zoom out while viewing content on display: REVERSE THE PROCESS. Place one finger on LS3 while the other on RS1 then stroke the one that is placed on LS3 upward to LS1 concurrently stroke the finger that is placed on RS1 UPWARD toward RS3. OR place side of index finger on RS2 (or LS2) with thumb smudges DOWNWARD from RF2 (or LF2) to RF1 (or LF1).

Additional Embodiments and configurations are discussed below with respect to FIGS. 23A-30. Aspects of these embodiments may be similar to aspects of the embodiments discussed above and aspects of any of any of the embodiments discussed in the present application may be combined without departing from the scope of the present application.

As discussed above, smartphone wrist accessories began the process of establishing the 'wearable' trend. The ideal wearable device—at least for consumers—is something sleek, stylish, and comfortable—with the electronic package interchangeable where consumers can easily remove them and transfer them to another piece of jewelry or fashion accessory to maximize their investment in the digital communication apparatuses as with the embodiments described herein. As a result, benefits may be enjoyed by consumers as they are now able to maximize their investments and luxuriate in their digital jewelry and accessories, without having to purchase the electronics package separately for multiple accessory or jewelry items.

In an exemplary embodiment, a "Device Platform" which includes all the components and circuitry necessary for wireless computing and connectivity, but excluding the battery and display may be provided. Such components and circuitries may include, but are not limited to, a printed circuit board, memory, communication interface (e.g., Bluetooth, NFC, etc.), GPS, accelerometer, vibration motor, and processor for executing software that drives a user display interface and content on a screen (e.g., touch screen), and transmits data to and from interlinked wireless devices (e.g., smartphone) and/or the wireless network itself, when coupled with an add-on fashion accessory providing for a battery source.

Add-on accessories are a companion apparatus to the device platform. It can be, but not limited to, a digital pendant, necklet, bracelet, bangle, keychain tag, handbag decoration tag, etc. as discussed above. Add-on accessories are fabricated first for their design as a jewelry or fashion accessories—typically houses an internal rechargeable battery and receptacle connector to the device platform's connector and may or may not include a display. Generally, add-on accessories are not functional when not coupled with the device platform. However, in some embodiments where e-paper display technology (e.g., E-Ink) is employed, users may be able to use the add-on accessory's display to show a graphic image/pattern as a wallpaper for fashion or aesthetic reasons even with the device platform detached and/or without battery power. The equivalent of a PC opening screen with interchangeable wallpaper backgrounds can become an inherent part of the jewelry or accessory item design or look. The wearer could select a color of denim to match different denim outfits or upscale the jewelry or accessory item by selecting different colors and patterns such as pattern of her dress, gold or silver mesh or any combination of one or more precious or semi-precious stones in place of the denim wallpaper.

When the device platform is coupled with an add-on accessory, the users will have a fully functional wireless terminal device and are empowered to access and control their mobile phone easily and quickly without ever removing it—even from their pocket or handbag—whether it be a phone call, music playback, text messages, or social network alerts & updates. Embodiments may effectively allow a consumer to avoid missing a call or being the last to know about a Facebook update or important Tweet—because their phone was in their handbag or pocket for the previous two hours. Furthermore, in some embodiments of the present application, users may track calories burned, steps taken and other daily movements to monitor health activities—as well as loss prevention and recovery of mobile phone, accessories, and any apparatuses that are interlinked.

The device platform or electronics package is constructed in one or more segments or modules that are attached to a flexible strap. One aspect of the exemplary embodiment consists of four segments (or sections or modules) where all the components and circuitry for a fully functional computing capability are housed. The edges of the strap include magnets for convenient and easy removal and then attaching it to various digital fashion accessories having electrical contacts at one or more ends.

In another embodiment, straps may employ button-like, finger, or other methods for the device platform to adhere to an add-on accessory yet not restrict its use to only using magnets. A further exemplary embodiment comprises more than one set of electrical contacts (e.g., one connector on each end).

The flexible or semi-flexible strap can be a 'ribbon cable' shaped to any curvature (upward or downward; or any direction) or function as a straight/flat strap; therefore enabling the device platform to easily adapt and fit into or onto any shaped cavity (any arc or flat surface) required by the fashion or jewelry design.

The device platform itself is user interchangeable and adaptive, so that it may be easily removed and coupled with any companion digital fashion accessories (add-on accessories) in a manner referred to herein as "coupling". Coupling is defined herein to mean inserting or attaching the device platform to an add-on accessory (digital fashion accessory) so that the device platform is not visible—or at least partially covered by the fashion accessory for aesthetic reasons. Coupling is defined herein similar to "docking".

"Add-on Accessories" defined herein include, but are not limited to, digital bracelets, bangles, pendants, earrings, bag decoration tags, and key chain tags, etc.—and can be any form factor, size, finish, color, material, etc. "Add-on accessories" herein also may be referred to as "Fashion Accessories", "Digital Accessories", or "Companion Accessories"—and may include built-in display(s), battery, loud speakers, directional microphone, camera(s), sensors (e.g., touch, proximity, etc.), antennas, memory card slot, etc.

In accordance with an embodiment of the present application, digital fashion accessories such as bracelets, pendants, and tags may include a display and/or rechargeable battery. In some embodiments, fashion accessories also house components and mechanism for wireless charging and with additional antenna(s) integrated for enhanced wireless signals—and may employ more than one display (e.g., LCD, OLEO, e-paper, or combination of display technologies). Add-on accessories house a receptacle connector (electrical contacts) for mating with the device platform so power can be supplied from any add-on accessory's integrated rechargeable battery to the device platform as well as transmitting data to and from both coupled apparatuses (device platform and add-on accessory).

When a removable device platform is coupled with an add-on accessory, through electrical connections, the battery that is integrated with the add-on accessory powers its components (e.g., display, sensor, button, etc.) as well as the device platform itself—in turn, full computing functionality is therefore available and operable. Subsequently, information and user interface can be transmitted (through the same removable, coupled electrical contacts) to the display or displays of the attached add-on accessory. As a result, a fully functional 'Wireless Terminal Device' is transformed by coupling the device platform with an add-on accessory. In certain embodiments where one or more described components (e.g., display, camera(s), etc.) may be omitted on the add-on accessories, these add-on accessories are still fully functional for dedicated use situations and value propositions when coupled with the device platform.

The user interface may be controlled by a user interacting with the touch display, voice commands, or tactile surfaces of add-on accessories, as well as gestures (motion) control via accelerometer and/or other sensors should physical button(s) or other mechanism for controlling or navigating the user interface be completely absent from both the device platform and the add-on accessory or due to user preference.

The user can pair the wireless telephone and wireless terminal device by having them both in contact or close proximity physically. This can be done using NFC or equivalent technology, and is only required to be performed for the first time unless the wireless connection is broken or unpaired which then requires re-pairing. Once paired, wireless connections (e.g., Bluetooth) between wireless telephone and wireless terminal device are active—and users can start using the wireless terminal device to access and control their wireless telephone. Alternatively, the 'pairing' can be done via Bluetooth pairing or other means.

In some embodiments, the wireless terminal device can transmit data to and from wireless telephone via a Wi Fi network.

It should be understood, the device platform can also include the cellular transceiver and SIM card integrated—therefore it is a fully-functional wireless communication device with the capability of today's smartphones. Furthermore, in addition to digital fashion bracelets, the methods described for building an interchangeable and adaptive device platform can also be used in developing a similar device platform for other companion fashion accessories such as earrings, pendants, key chain tags, bag decoration tags, etc.) and not limited only to form factors of bracelets and bangles.

The exemplary embodiments may provide a new and improved method of designing and manufacturing wireless terminal devices (companion terminal devices)—by providing an interchangeable, versatile platform to facilitate the design and incorporation of digital communication functionality with fashion accessories and jewelry, without the need for extensive in-house technical know-how by fashion accessory and jewelry designers, even OEMs. The benefits include, but are not limited to: speed to market, reduced costs and technical risks, and digital accessories/jewelry can be designed with minimal or no technical expertise required.

Furthermore, device platform may also be easily user interchangeable with any compatible add-on accessories. No tools or cumbersome assembly and disassembly required to have a fully functional wireless terminal device. Advantageously, consumers can maximize their investment by leveraging the "same" interchangeable device platform for numerous bracelets, key chain tags, and bag decoration tags, with different form factor and designs. The same is true with device platforms for pendants and other add-on accessories. In one embodiment, an interchangeable device platform that is designed for a pendant can be coupled and operated with a variety of different pendants as well as other companion fashion accessories such as a brooch, bracelet or earrings.

The device platform can be both an interchangeable hardware package that can be removed and coupled with other multi-function companion fashion accessories, or it can be integrated and housed inside certain add-on accessories.

With reference to FIGS. 23A to 30, various embodiments will now be described in more detail. Examples are illustrated in the accompanying drawings. It is understood that the figures and the example embodiments to which they relate are not intended to limit the systems and methods describe herein to only the described embodiments or visual representations. To the contrary, it is intended to cover alternatives, modifications, and equivalents as may be included within the spirit and scope of the present application.

Figure 23A:
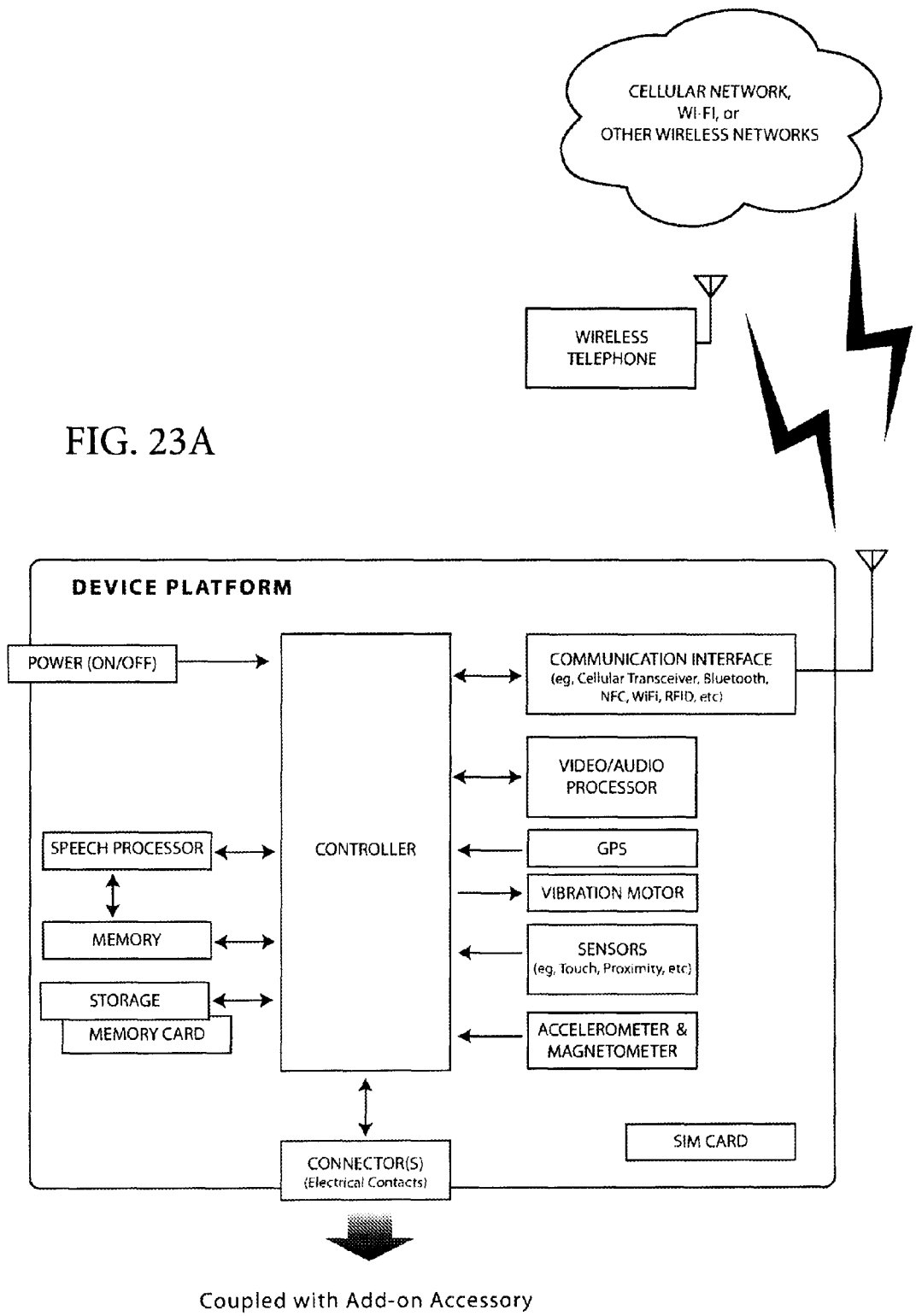
FIG. 23A shows a high level electronics block diagram of a device platform in accordance with one embodiment.

FIG. 23A shows a high level electronics block diagram of a device platform in accordance with one embodiment. This embodiment is designed to transmit digital data or a digital equivalent data language or format to and from wireless communication or computing devices (e.g., wireless telephones, tablets, Wi-Fi networks, etc.) using their existing wireless air-interface protocol. In another embodiment, the device platform may be equipped with a cellular transceiver and SIM card, therefore capable of a fully functional smartphone and capable of transmitting data to and from various cellular networks (e.g., 4G mobile networks) directly or other wireless networks (e.g., Wi-Fi).

In accordance with another embodiment, the device platform consists of, but is not limited to, a controller, memory (e.g., RAM and SSD/storage), video/audio processor, GPS, vibration motor, accelerometer, sensors (e.g., touch, etc.), various communication interfaces (e.g., Bluetooth, etc.) as well as a connector (e.g., electrical contracts) to transmit data and electrical signals or pulses to and from receptacle connectors of companion fashion accessories—while in some embodiments, the device platform may also include a rechargeable battery, power (ON/OFF) button or switch or a microphone for audible commands and instructions, memory card slot (for extra memory storage), and/or speech processor (for voice recognition, speech-to-text, etc.).

In addition to Bluetooth air-interface, the device platform also may consists of other wireless interfaces such as Near Field Communication (NFC), Wide Area Local Network IEEE 802.11 standards (e.g., Wi-Fi), Radio-frequency identification (RFID), cellular network transceiver, and functionally similar future protocols and air-interfaces.

Figure 23B:
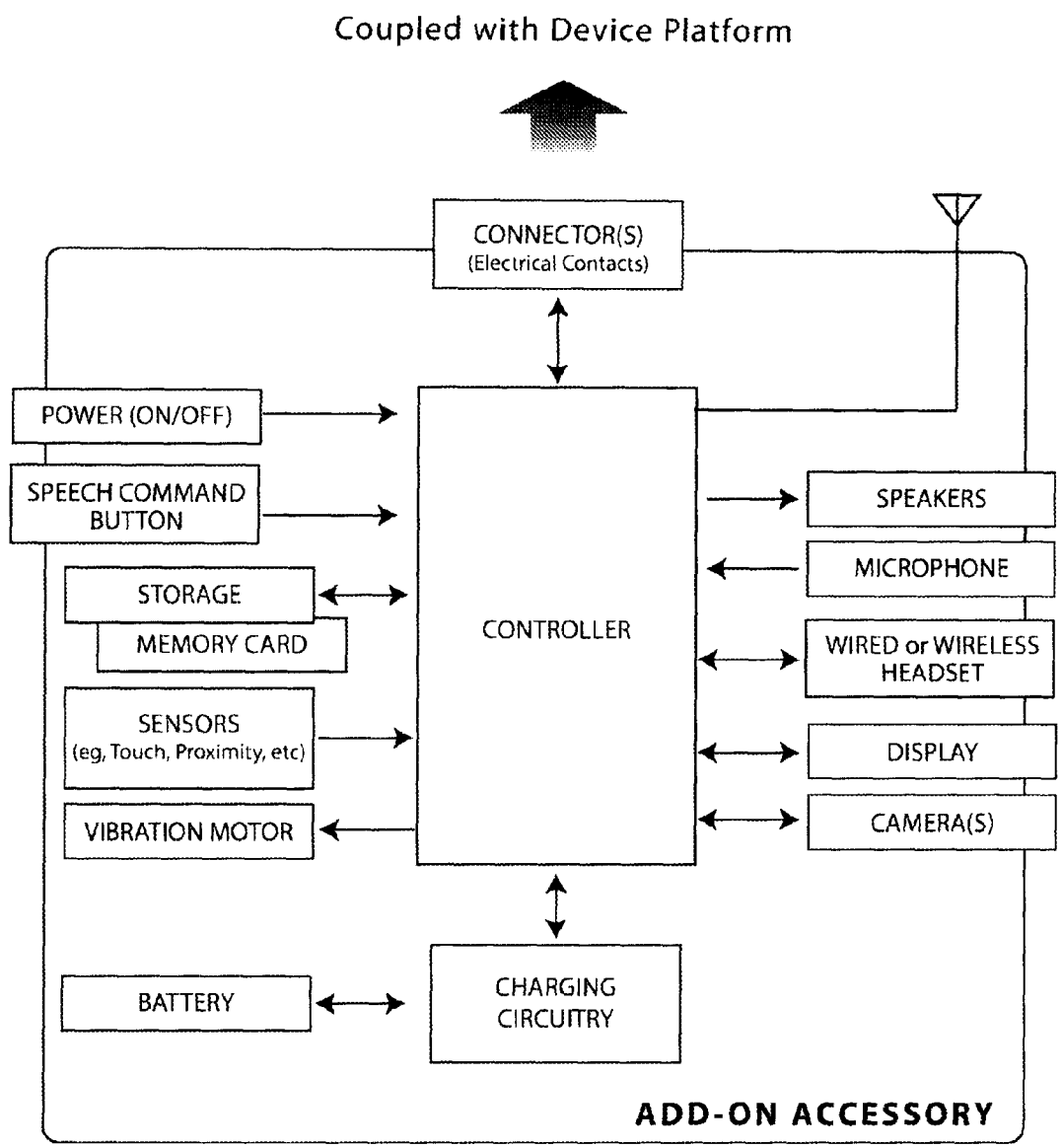
FIG. 23B illustrates a high level block diagram of an add-on accessory (companion fashion accessory).

FIG. 23B shows a high level block diagram of a typical add-on accessory (companion fashion accessory). Unlike any existing Bluetooth devices in the market today, add-on accessories in accordance with the systems and methods described herein may include a physical push-to-talk button, or a touch sensor to empower users to activate the integrated speech command function with device platform through the built-in speech processor. Touch sensors (single point or multi touch) may allow users to control the device platform without traditional buttons—and can be integrated to the fashion accessory itself, not limited to only on touch display (e.g., speech recognition).

In certain embodiments, add-on accessories such as digital bracelets and bag decoration tags may consist of a display or displays, whereas it can be a touch or non-touch LCD, OLED, or flexible e-paper, while some other embodiments may comprise of a combination of these display technologies (e.g., part OLED and part e-paper) in accordance with the systems and methods described herein.

Further in accordance with an embodiment, add-on accessories could house an internal rechargeable battery equipped with a connector for hardwired charging, and/or a mechanism for wireless charging. Such charging circuitry is capable of bi-directional charging & discharging—simply put, when add-on accessories are connected to a charging connector or placed on a charging unit (through electrical contacts or wirelessly), it also charges device platform or any other hardware coupled with add-on accessory, should a rechargeable battery not be present.

Wireless ear sets (for example, Bluetooth headsets with or without microphone) for listening to audio content transmitted from user's wireless communication device and/or device platform, may be integrated with certain embodiments of companion digital bracelets, pendants, keychain tags, bag decoration tags, earrings, etc.—as well as companion accessories may include but not limited to: one or more cameras, memory card reader/writer, loud speakers, directional microphone, plug (e.g., 3.5 mm jack for wired headset with microphone or mini-USB) for audio, data, and/or charging, and sensors (e.g., touch, proximity, audible etc.). Add-on accessories may also have an additional vibration motor and antenna integrated for stronger vibration and enhanced wireless communication signals of the coupled device platform—in some embodiments, the vibration motor and antenna may be omitted in device platforms.

In addition to fashion and new future form factors, companion fashion accessories are essentially digital peripherals that provide a user interface for the device platform and, in general, may not be able to operate independently when decoupled from device platform therewith. According to another embodiment, device platforms may be built-in and not detachable from add-on accessories.

Although many details for the hardware design in accordance with the systems and methods may not been described herein in great detail (e.g., DSP, clock battery, etc.) on the attached high level block diagram, and some functional components may be omitted here, persons of ordinary skill in the art will realize the minimum components and requirements for building a wireless computing device/computer as related to the systems and methods described herein.

FIG. 24 Illustrates various views of the device platform.

In accordance with an exemplary embodiment, the device platform consists of computing components segmented into several sections; therefore each section comprises a printed circuit board (PCB) which may or may not itself be flexible and not rigid, or fully integrated chips with a sheath casing adhered to a flexible strap which enables the device platform to be bent in various directions. Straps can be made of silicone, polymer, other rubber-like or any materials that are heat-resistant and may be bent more or less. In a different embodiment, a rigid strap may be used for a particular form factor including a fixed curvature.

It should be understood that the device platform can be segmented into various numbers of sections and not restricted to the four sections illustrated herein. Furthermore, the size (length, height, width) of the device platform may also vary—any variations would be within the spirit and scope of the present application. "Section" is defined as a "Module" described above.

On one end of the module mounted strap, a connector is built-in and is linked to the circuitry of the device platform. Connectors may comprise eight, fourteen or any number of electrical contacts (pins) which are required to carry a variety of data and sustainable by the supply power. Connectors can be magnetized, plug-like, or take any other form-factor or mechanism used for easy and repeated coupling/docking. With such a connector, a large amount of functionality can be achieved.

In other embodiments, the connector may be integrated on both ends of the device platform or provided a different methods for insertion and removable of the electric contacts of the device platform, to and from receptacle electric contacts of companion accessories.

Along both sides of the device platform, the strap might consist of magnets so when it's placed near the orifice of a companion fashion accessory, the magnetized strap will snap onto or into the companion accessory. Instantly the male connector (electrical contracts) of the device platform is coupled with the receptacle (female) connector (electrical contacts) of the companion accessory, therefore data and electrical current transmission between the device platform and coupled companion accessory is now possible. It may be designed so that no tools are required for inserting or removing the device platform so that the device platform is easily interchangeable from one piece of accessory to another by the user. Connectors of the device platform and add-on accessories can be male & female, female & male, male & male, female & female, or any variation so long as they can be mated/coupled.

The flexible strap with or without the magnets on it may allow for an easy snap coupling of the device platform with the companion fashion accessories for a snug fit. In the case of a digital bracelet or bangle, the flexible strap may also allow a concave shape for a comfortable and an uninterrupted experience when users are wearing it on their hands or body. The various modules or packages can also be connected by a ribbon cable or comparable direct solder-to-trace technique.

In addition to magnets, other methods and mechanisms may be used to secure the device platform inside or onto companion fashion accessories.

Figure 25A:
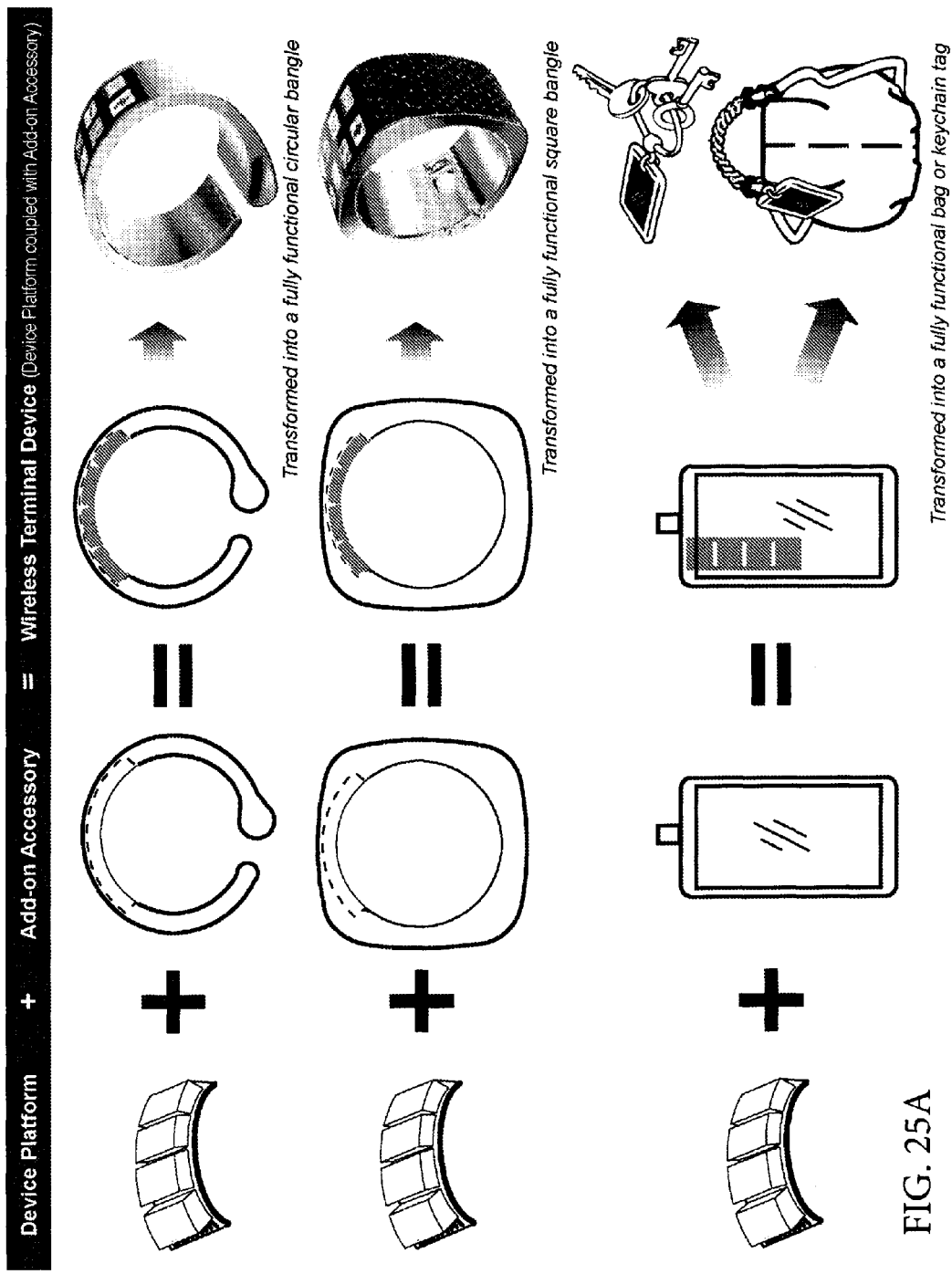
FIG. 25A illustrates several embodiments of systems incorporating the device platform of FIG. 23A.

FIG. 25A exemplifies various embodiments of the systems and methods described herein. A fully functional fashion accessory, also referred to as a 'Wireless Terminal Device', requires a device platform coupling with a digital companion accessory.

For example, when the device platform is coupled with a circular open bangle, as shown in the top embodiment shown in FIG. 25A, a fully functional digital bangle is ready for use provided the bangle's internal battery is not fully discharged and connector and receptacle connectors are in contact without any obstruction.

The "same" device platform can be easily decoupled from the circular bangle (by pulling the device platform's strap away from a dimple of the inner side of companion accessory) and then insert it to the square bangle for another full function fashion accessory, as shown in the middle embodiment of FIG. 25A.

Digital bangles/bracelets can be any size, thickness, or form factor and not limited to only the square and circular open form factors shown here. The body of the bangles/bracelets can be rigid or flexible. It should also be noted that the device platform can be interchanged from one companion accessory to another so long as the companion accessories have the compatible connector and orifice—even though companion devices have different curvature surfaces. For instance, the "same" device platform that was used in the square and circular open bangles can be inserted in compatible keychain tags and bag decoration tags, for another form of full functional fashion accessory, as shown in the lower embodiment of FIG. 25A.

Such a versatile and interchangeable device platform may be an advantage for both jewelry and fashion accessory makers, as well as to consumers.

Figure 25B:
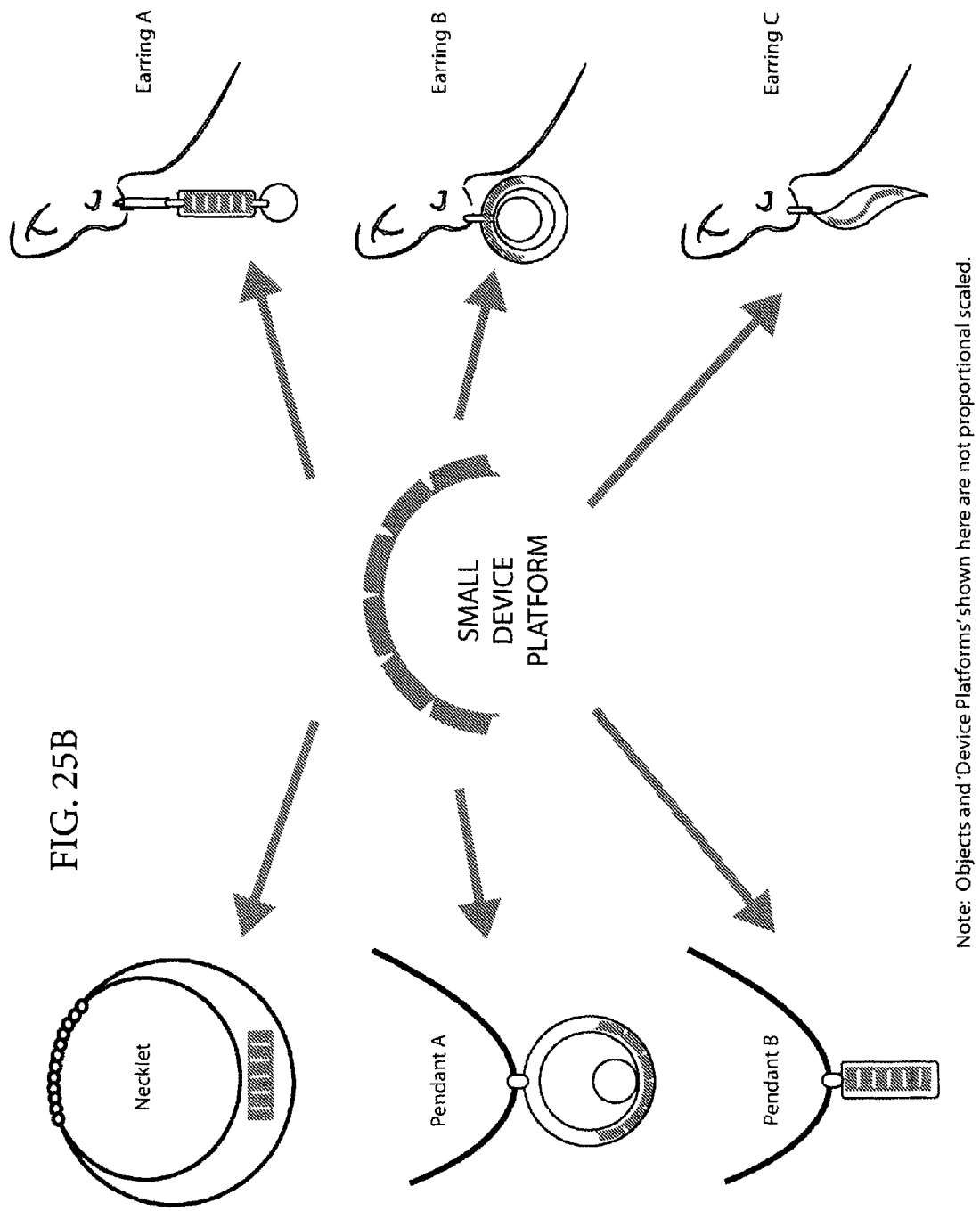
FIG. 25B illustrates a device platform similar to the device platform of FIG. 23A, which can be employed with smaller fashion accessories.

FIG. 25B illustrates the similar device platform which can be employed with smaller fashion accessories like earrings and pendants. The methods of building a smaller device platform is essentially the same as building the device platform shown and used in FIG. 3A.

One "small" device platform can be incorporated and used in numerous digital fashion accessories. For example, the 'same' small device platform can be used, for example, on a necklet, pendant A and pendant B—and can also be adapted to ear ring A, B, and C, as illustrated.

The "same" smaller device platform can also be incorporated to endless add-on accessories, so long as the add-on accessories provide a compatible connector and/or orifice for the smaller device platform to be inserted/housed—regardless of the form factor, design style, with or without display, type of fashion accessories, etc.

All pendants and earrings house a retractable ear set and when coupled with the small device platform, they transform to fully functional wireless headsets—yet still look like elegantly designed fashion jewelry or accessory. In some embodiments, pendants may be designed for use with a wired headset with or without wireless head set integrated.

The methods and systems for developing device platforms for digital bracelets and hand bag decoration tags can also be employed to earrings, pendants and other fashion accessories with smaller device platforms. Such smaller device platform may or may not be equipped with reduced functionality. For instance, digital accessories such as earrings and certain pendants do not have a display; therefore a video processor may or may not be built in on such small device platforms.

Figure 26:
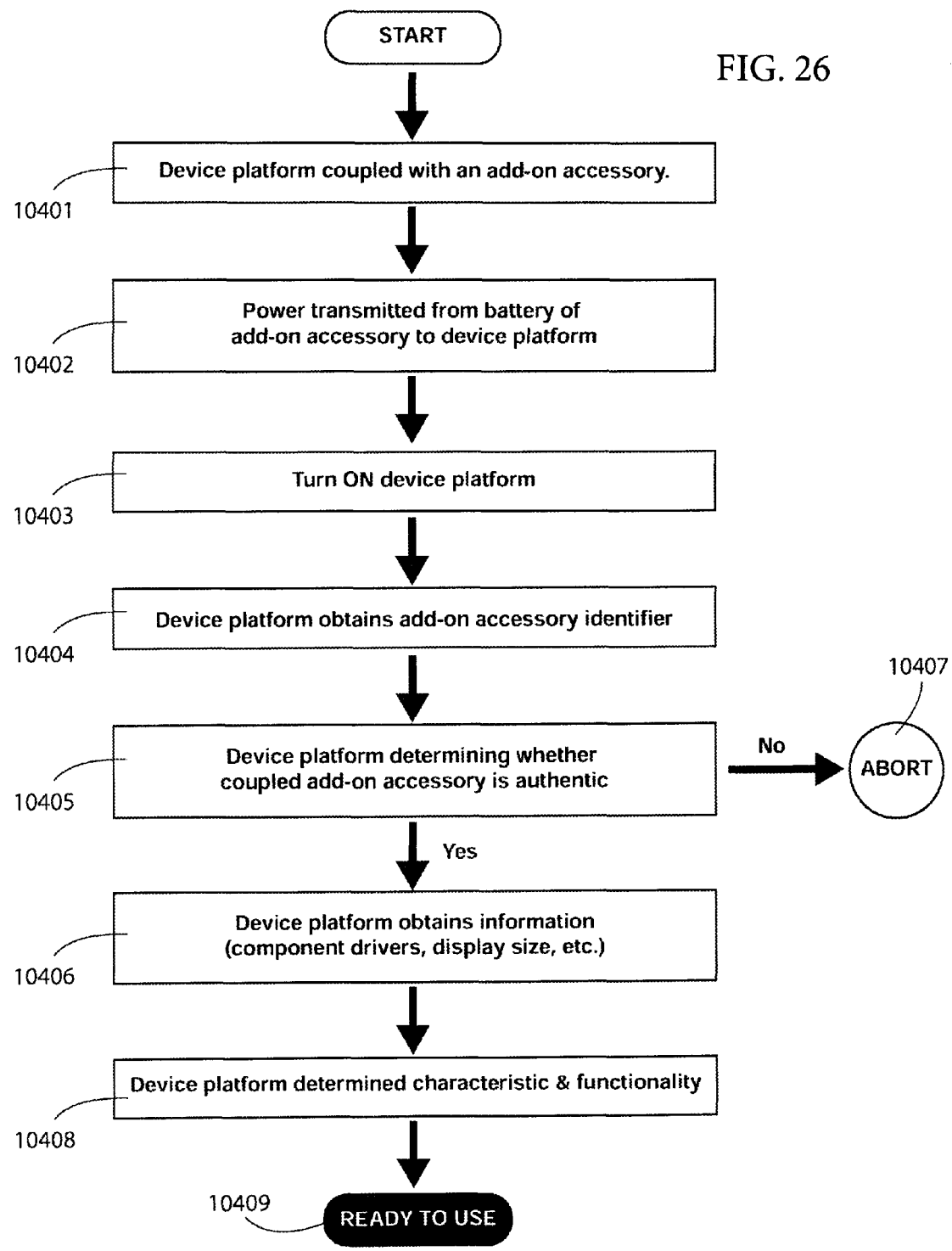
FIG. 26 illustrates a simplified flow chart of the functional operation of the device platform when coupled with an add-on accessory in accordance with an embodiment.

FIG. 26 is a simplified flow chart illustration of the functional operation of the device platform when coupled with an add-on accessory in accordance with an embodiment. When both of these apparatuses are coupled, they become a fully functional wireless terminal device.

To use the wireless terminal device, users need:

10401) To couple the device platform with the desired add-on accessory whether it be a square bangle, oval bracelet, pendant, handbag decoration tag, etc.

10402) After both the device platform is coupled with an add-on accessory, now power from one or more built-in battery of the add-on accessory supplies and powers the device platform.

10403) User now can turn on the wireless terminal device (either by pushing a button or via other means such as voice command or touch/motion sensor on add-on accessory or directly on device platform).

10404) Data now can be transmitted to and from the device platform and add-on accessory through the same coupled connectors that transmit power currents, the device platform obtains add-on accessory identifiers.

10405) The device platform determines whether coupled add-on accessory is authentic. If NO (authentication fails) pairing occurs, then the operation is aborted (10407) and the wireless terminal device can be made non-functional. If YES (authentication passes), Device platform obtains information (10406) about coupled add-on accessory (such as component drivers like speaker(s), microphone, proximity and other sensors, together with display type & size, number of displays, etc. if present)

10408) Device platform then determines which characteristics and what functionality can be used with a particular coupled add-on accessory based on information obtained during prior steps.

10409) Now the add-on accessory is authenticated and the wireless terminal device is fully functional and ready to use.

User can access and control the wireless terminal device via the touch screen interface or through other touch mechanism. Furthermore, user also can use voice commands to call for certain actions.

Should users need to recharge the internal rechargeable battery of any add-on accessory, users can attached it with compatible charging adapter or place it on a wireless charging platform—with or without the device platform actually coupled.

Figure 27A:
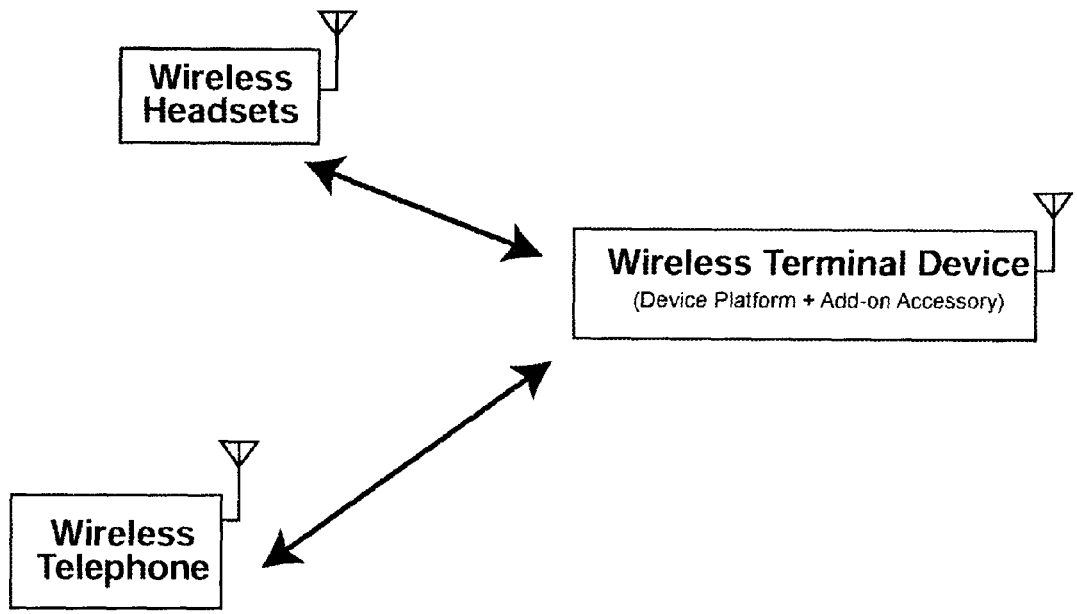
FIGS. 27A and 27B illustrate link relationships between a wireless terminal device, a wireless headset, and a wireless telephone.
Figure 27B:
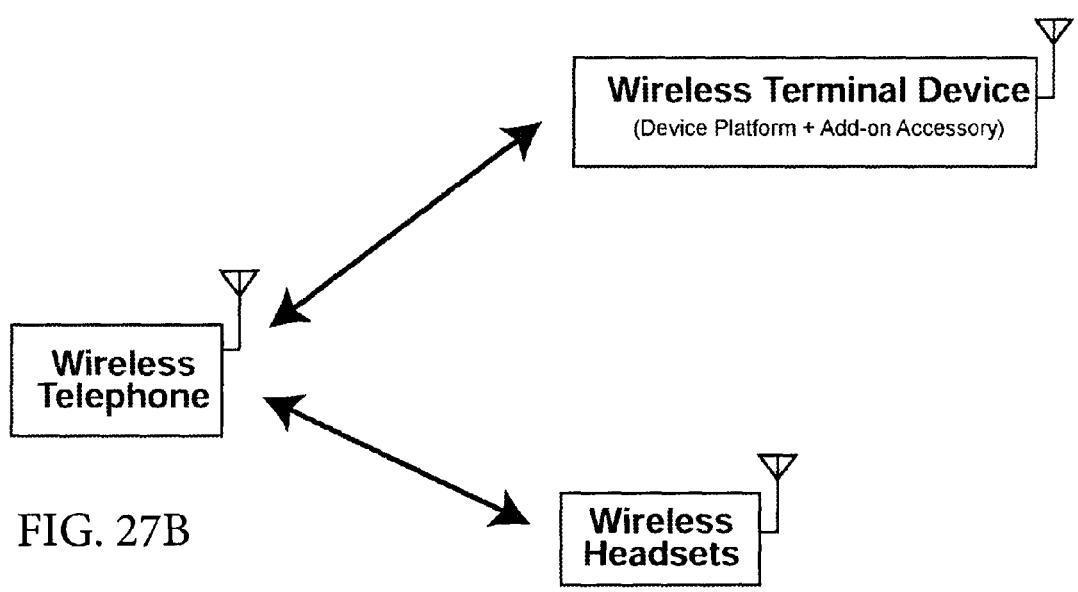

FIGS. 27A and 27B show link relationships between wireless terminal device, wireless headset, and wireless telephone. Wireless terminal device is when an add-on accessory is coupled with a device platform and transformed into a fully functional but specifically featured hardware device.

FIG. 27A illustrates potential communication links between wireless telephone, wireless terminal devices (add-on accessory device platform), and wireless headset where wireless terminal device is the central hub. The wireless telephone can transmit data to and from the wireless terminal device—in turn the wireless terminal device can also wirelessly communicate with integrated or 3rd party wireless headset (e.g., Bluetooth headsets). User may use a wireless headset to control and access certain functions of the wireless telephone via a wireless terminal device. For instance, user could activate or end a phone call by pushing a button on the wireless headset or speaking a command. Furthermore, user could select certain applications directly from the wireless headset.

FIG. 27B shows link connections between wireless telephone, wireless terminal device (add-on accessory device platform), and wireless headset where wireless telephone is the central hub. Wireless telephone can transmit data to and from wireless terminal device- and simultaneously communicates with wireless headsets.

In this configuration, users may utilize the wireless headset with the wireless telephone, with or without the presence of a wireless terminal device.

It should be noted that the configuration shown on FIG. 27A may be easily reconfigured to FIG. 27B and vice versa. This can be done by pairing the wireless headset either directly with the wireless telephone or wireless terminal device.

While embodiments of communication links are wireless signals, wired and physical connections may be employed in other embodiments. Furthermore, a wireless terminal device may be equipped with a cellular receiver, Wi-Fi or other wireless interfaces to communicate directly with the cellular, Wi-Fi or other wireless networks with or without the presence of a wireless telephone.

FIG. 28A-30 illustrates various alternative designs and embodiments of the present design in a bracelet/bangle form factor.

Figure 28A:
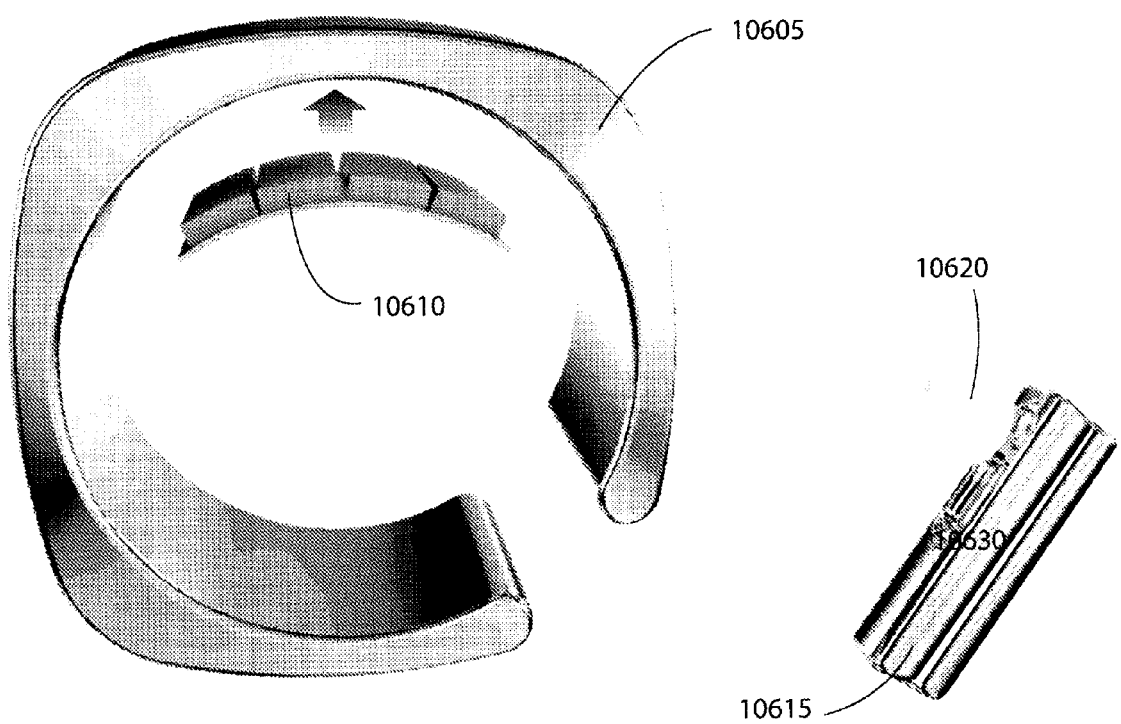
FIGS. 28A-30 illustrates various alternative designs and embodiments of in a bracelet/bangle form factor.

FIG. 28A illustrates a straight view of a square bangle 10605 with integrated removable wireless ear set 10615 detached (with retractable ear bud 10620 ejected) while a device platform 10610 about to be inserted into the add-on accessory (square bangle) 10605.

Figure 28B:
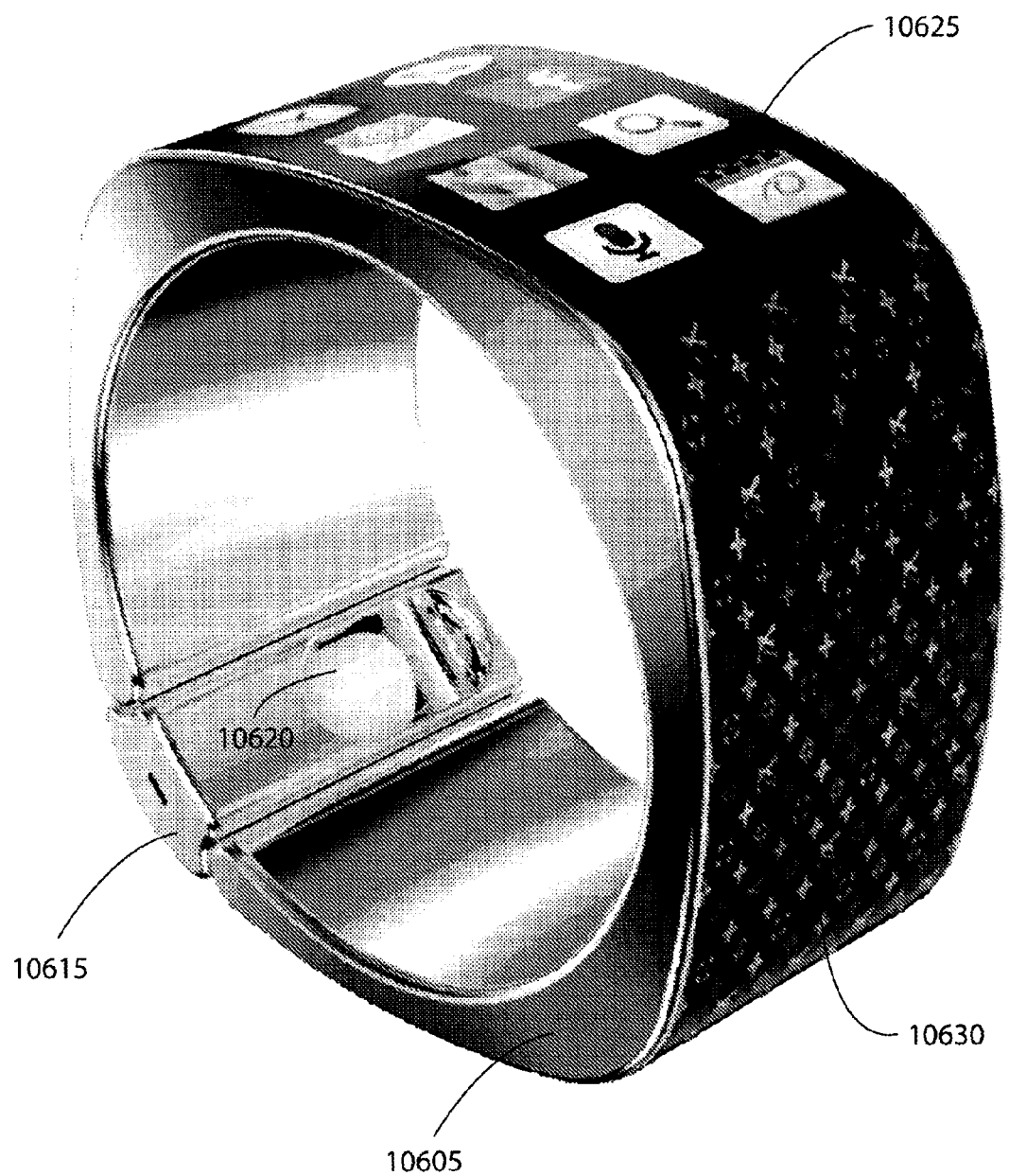

FIG. 28B shows a perspective view of the same square bangle with the wireless ear set coupled to the bangle. Moreover, this drawing also exemplifies a user-interface on one of the four displays (top screen 10625) while the other display (front screen 10630) shows an illustrative Louis Vuitton pattern used as a wallpaper.

Figure 29:
Figure 30:
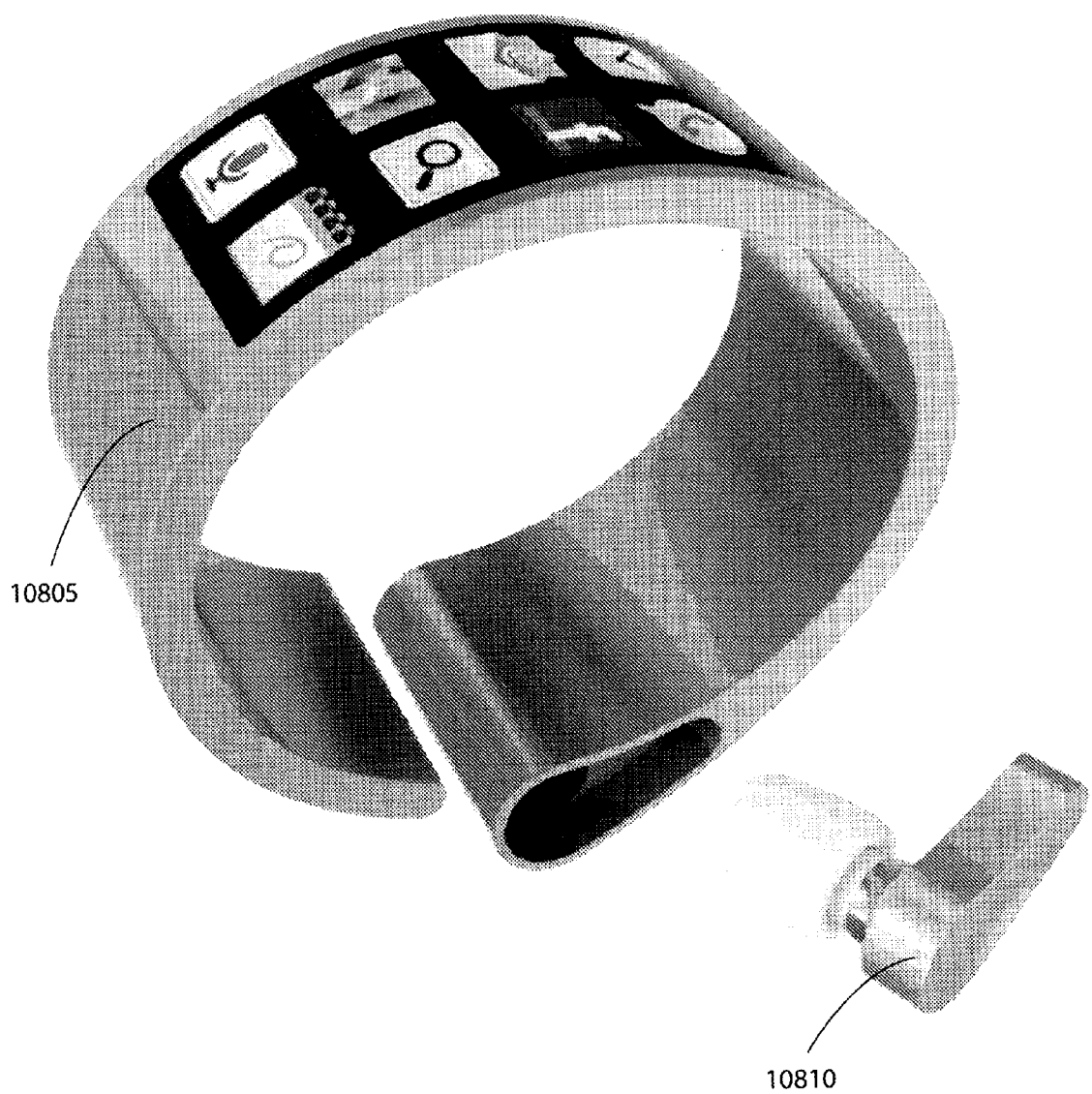

In accordance with an embodiment, an oval form factor of the bangle 10705 without integrated wireless ear set is shown on FIG. 29 while another circular but open bangle 10805 with a smaller form factor wireless ear set 10810 illustrates another embodiment shown on FIG. 30.

It should be understood that companion accessories can be of any form factor, any size, built with any materials, and can have different shapes and curvatures—while digital bangles can be open or close, square or round, etc. But all variations may be coupled with the same device platform whereas its flexible strap allows the adaptive characteristics. Therefore such a device platform not only can be coupled and used with bracelets/bangles, it can be removed, coupled and used with keychain tags, bag decoration tags, certain pendants, and other compatible companion accessories.

In so far as the description above and the accompanying drawings disclose any additional subject matter that is not within the scope of the single claim below, the inventions are not dedicated to the public and the right to file one or more applications to claim such additional inventions is reserved.

Although a very narrow claim is presented herein, it should be recognized that the scope of this application is much broader than presented by the single claim. It is intended that broader claims will be submitted in one or more future or continuation applications that claim the benefit of priority from this application.

The present application has been described with reference to certain preferred and alternative embodiments that are intended to be exemplary only and not limiting to the full scope of the present application.

I claim:

1. A wearable communication device comprising:
a bracelet comprising an integrated first power source;
a telecommunications device comprising a transceiver configured to allow wireless communication,
wherein the telecommunications device is configured to couple and decouple with the bracelet, and
wherein the telecommunications device is configured receive power from the first power source when coupled with the bracelet;
wherein the integrated power source comprises at least one battery disposed within a portion of the bracelet; and
wherein the at least one battery comprises a series of round batteries strung together by a wire and disposed within a portion the bracelet.

2. The wearable communication device of claim 1, wherein the telecommunications device further comprises a second power source,
wherein the telecommunications device is configured to receive power from the second power source when the telecommunications device is decoupled from the bracelet, and
wherein the telecommunications device is configured to charge the second power source using the first power source when the telecommunications device is coupled to the bracelet.

3. The wearable communication device of claim 1, wherein the transceiver of the telecommunications device comprises a cellular chip configured to communicate with a cellular network.

4. The wearable communication device of claim 1, wherein the transceiver of the telecommunications device comprises a Bluetooth chip configured to communicate with another Bluetooth device.

5. The wearable communication device of claim 4, wherein the Bluetooth device is a cellular communications device and wherein Bluetooth chip is configured to interface with the mobile communications device to communicate with a cellular network.

6. The wearable communication device of claim 1, wherein at least one of the bracelet and the telecommunications device comprises a display screen.

7. The wearable communication device of claim 6, wherein the bracelet further comprises a display screen formed on a surface of the bracelet.

8. The wearable communication device of claim 7, wherein the bracelet comprises a plurality of display screens formed on a plurality of surfaces of the bracelet.

9. The wearable communication device of claim 7, wherein the display screen is a touch screen configured to receive user input.

10. The wearable communication device of claim 6, wherein the display screen is a touch screen configured to receive user input.

11. The wearable communication device of claim 1, wherein at least one of the bracelet and the telecommunications device includes at least one earphone.

12. The communications device of claim 11, wherein the telecommunications device comprises at least one earphone.

13. The communications device of claim 12, wherein the at least one earphone is configured to be retractable into a cavity formed on the telecommunications device.

14. The communications device of claim 13, wherein the at least one earphone comprises a spring member configured to extend the at least one earphone from the cavity when a release mechanism on the telecommunications device is activated.

15. The wearable communication device of claim 11, wherein the at least one earphone is configured to be retractable into a cavity.

16. The wearable communication device of claim 15, wherein the at least one earphone comprises a spring member configured to extend the at least one earphone from the cavity when a release mechanism is activated.

17. The wearable communication device of claim 1, wherein the at least one battery has at least one of a square shape, a rectangular shape, a circular shape, and an oval shape.

18. The wearable communication device of claim 1, wherein the at least one battery comprises a plurality of batteries shaped and sized to fit within the bracelet.

19. The wearable communication device of claim 1, wherein the bracelet comprises a receptacle connector configured to receive and couple with the telecommunications device.

20. The wearable communication device of claim 19, wherein receptacle connector is formed on a side of the bracelet, and
wherein the telecommunications device is configured to be inserted into the receptacle connector.

21. The wearable communication device of claim 1, wherein the bracelet is formed with a gap forming a discontinuity along the length of the bracelet; and
wherein the telecommunications device is configured to fit into the gap in the bracelet and close the discontinuity along the length of the bracelet.

22. The wearable communication device of claim 20, wherein a first connector is formed on a portion of the bracelet proximate to the gap; and
wherein a second connector is formed on the telecommunications device, and the second connector is formed to interface with the first connector when the telecommunications device in inserted into the gap in the bracelet.

23. The wearable communications device of claim 1, further comprises a connector configured to couple and decouple the telecommunications device to the bracelet.

24. The wearable communications device of claim 23, wherein the connector is configured to transmit power from the first power source to the telecommunications device when coupled to the bracelet.

25. The wearable communications device of claim 23, wherein the connector is configured to transmit signals between the bracelet and the telecommunications device.

26. The wearable communications device of claim 1, further comprising a charging member configured to connect to at least one of the bracelet and the telecommunications device and charge the first power source.

27. The wearable communications device of claim 26, wherein the charging member is configured to connect between the telecommunications device and the bracelet.

28. The wearable communications device of claim 26, wherein the charging member is configured to connect to a wall socket to charge the first power source.

29. The wearable communications device of claim 1, wherein the telecommunications device comprises at least one a modular platform configured to conform to a curvature of the bracelet.

30. The wearable communications device of claim 1, further comprising a plurality of wearable accessories including the bracelet, each of the plurality of wearable accessories having a first power source; and
wherein the telecommunications device is configured to selectably be coupled and decoupled with any one of the plurality of wearable accessories including the bracelet interchangeably.

31. A wearable communication device comprising:
a bracelet comprising an integrated first power source;
a telecommunications device comprising a transceiver configured to allow wireless communication,
wherein the telecommunications device is configured to couple and decouple with the bracelet, and
wherein the telecommunications device is configured receive power from the first power source when coupled with the bracelet;
wherein the integrated power source comprises at least one battery disposed within a portion of the bracelet;
wherein bracelet comprises at least one gem, wherein the at least one battery is sized and shaped to be housed within the at least one gem.

* * * * *